US006430119B1

(12) United States Patent
Okada et al.

(10) Patent No.: US 6,430,119 B1
(45) Date of Patent: Aug. 6, 2002

(54) OPTICAL DISK DRIVE APPARATUS CAPABLE OF SEARCHING AN OPTIMUM TARGET POSITION

(75) Inventors: Yuu Okada, Moriguchi; Katsuya Watanabe, Nara; Tetsuya Shihara, Moriguchi; Akihiko Nishioka, Katano; Koujiro Okamoto, Suita, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/568,186

(22) Filed: May 9, 2000

(30) Foreign Application Priority Data

May 10, 1999 (JP) .......................................... 11-128192
May 31, 1999 (JP) .......................................... 11-152551
May 17, 1999 (JP) .......................................... 11-135287

(51) Int. Cl.[7] .............................................. G11B 21/08
(52) U.S. Cl. ................................. 369/30.11; 369/30.12
(58) Field of Search ............................ 369/30.11, 30.1, 369/30.12, 30.13, 30.18, 32.01, 44.34, 44.28, 44.27, 44.29

(56) References Cited

U.S. PATENT DOCUMENTS 4,692,915 A * 9/1987 Moriya et al. ................ 369/53
4,707,648 A * 11/1987 Minami ...................... 318/640
5,090,003 A 2/1992 Watanabe et al. ........ 369/44.34
5,257,250 A * 10/1993 Moriya et al. ........... 369/44.25
5,663,942 A * 9/1997 Ishibashi et al. .............. 369/47

FOREIGN PATENT DOCUMENTS

JP 2001-52351 A * 2/2001 ................ 369/30.1

* cited by examiner

*Primary Examiner*—Tan Dinh
(74) *Attorney, Agent, or Firm*—Renner, Otto, Boisselle & Sklar

(57) ABSTRACT

An optical disk apparatus includes a converging section for converging a light beam toward an information carrier; a moving section for moving the light beam converged by the converging section in a direction perpendicular to a surface of the information carrier; a light detector for detecting the light beam reflected by the information carrier; a convergence state detecting section for generating a convergence state signal representing a convergence state of the light beam at a convergence point on the information carrier and outputting a reproduction signal from the information carrier, based on the output from the light detector; a focus controller for driving the moving section to make the convergence state constant based on the convergence state signal and a prescribed target position; a reproduction quality signal detector for detecting a reproduction quality signal representing a quality of the reproduction signal based on the reproduction signal; a reproduction quality signal measuring section for changing the target position and measuring a value of the reproduction quality signal corresponding to each of the changed target positions; a reproduction quality signal characteristic determining section for determining a characteristic of the reproduction quality signal based on the value of the reproduction quality signal corresponding to each of the changed target positions; and a target position searching section for searching for an optimum target position of the focus controller for optimizing the value of the reproduction quality signal based on a determination result of the reproduction quality signal characteristic determining section.

48 Claims, 34 Drawing Sheets

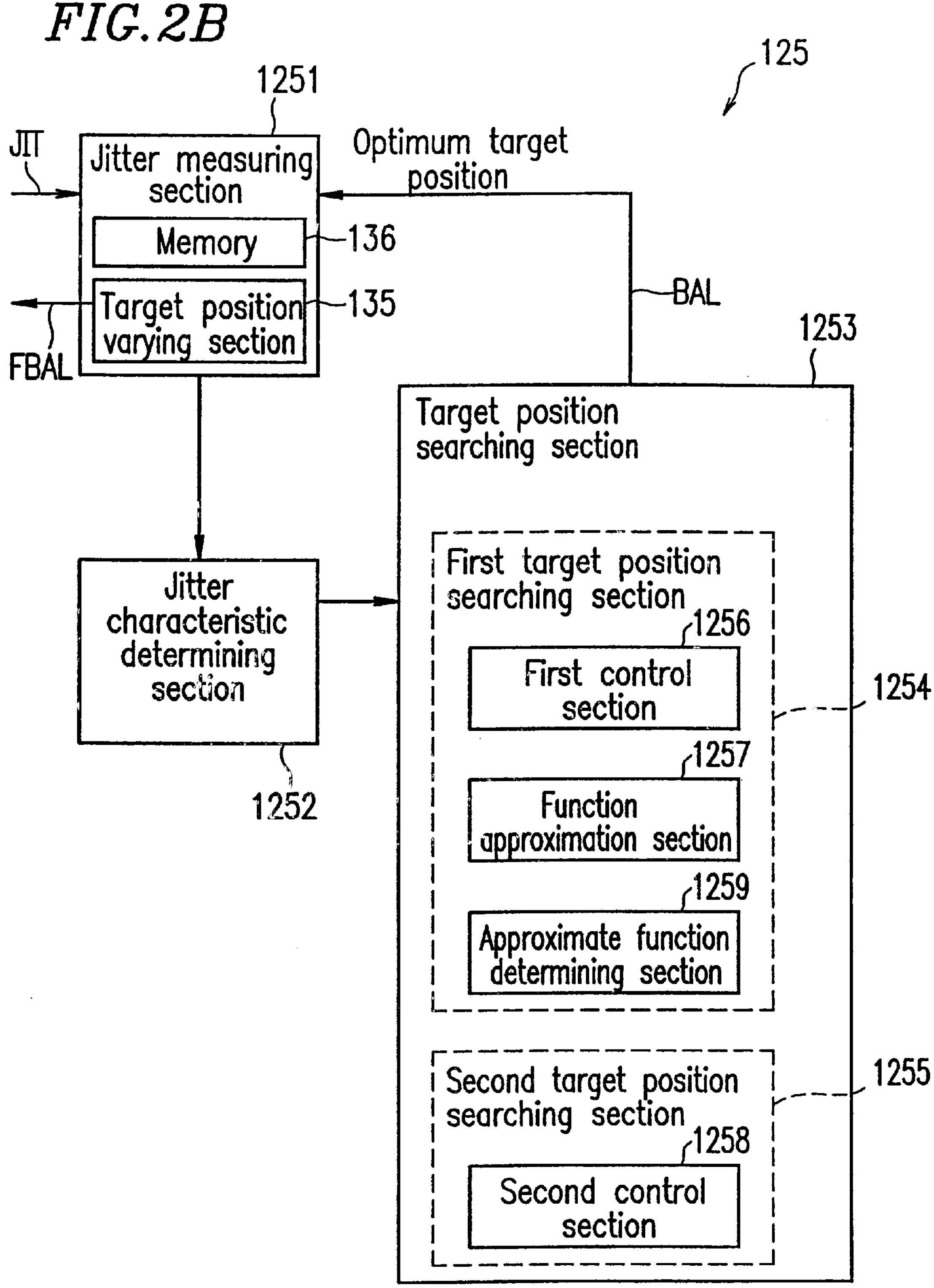
FIG.2B
125
1251
JIT
Jitter measuring section
Memory
136
Target position varying section
135
FBAL
Optimum target position
BAL
1253
Target position searching section
First target position searching section
1256
First control section
1254
1257
Function approximation section
1259
Approximate function determining section
Jitter characteristic determining section
1252
Second target position searching section
1255
1258
Second control section START
Jitter measured
S401
Minimum point determinable?
S402
YES
NO
S403
Function approximation
S404
Minimum point obtained
S405
Target position set
END
S406
Jitter measured after changing the target position at different steps
S407
Minimum point determinable?
YES
NO
S408
Center point of the flat range obtained
S409
Target position set
END

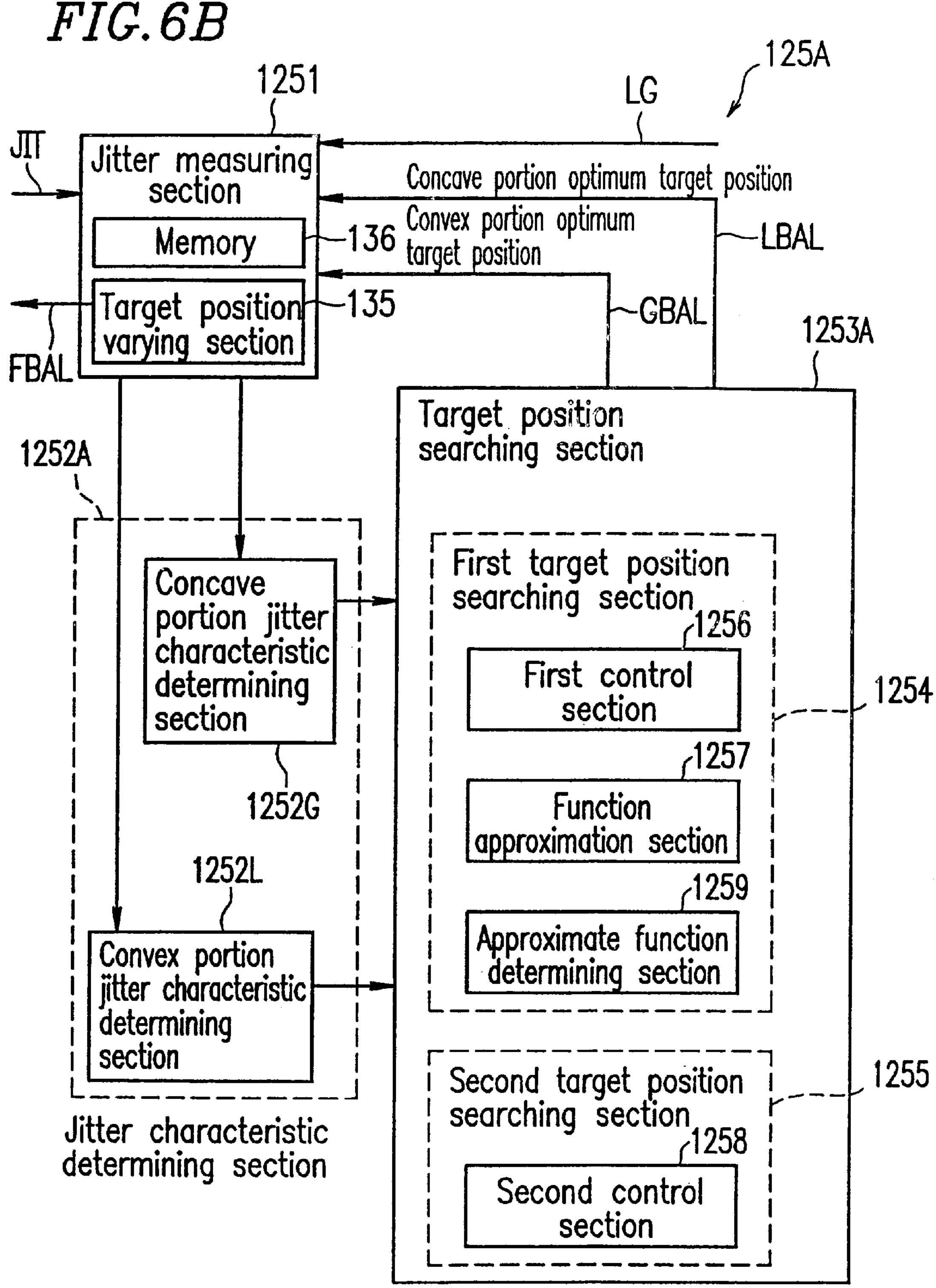
FIG. 6B
125A
1251
LG
JIT
Jitter measuring section
Concave portion optimum target position
Memory
136
Convex portion optimum target position
LBAL
Target position varying section
135
GBAL
FBAL
1253A
Target position searching section
1252A
Concave portion jitter characteristic determining section
First target position searching section
1256
First control section
1254
1257
1252G
Function approximation section
1252L
1259
Approximate function determining section
Convex portion jitter characteristic determining section
Second target position searching section
1255
1258
Jitter characteristic determining section
Second control section

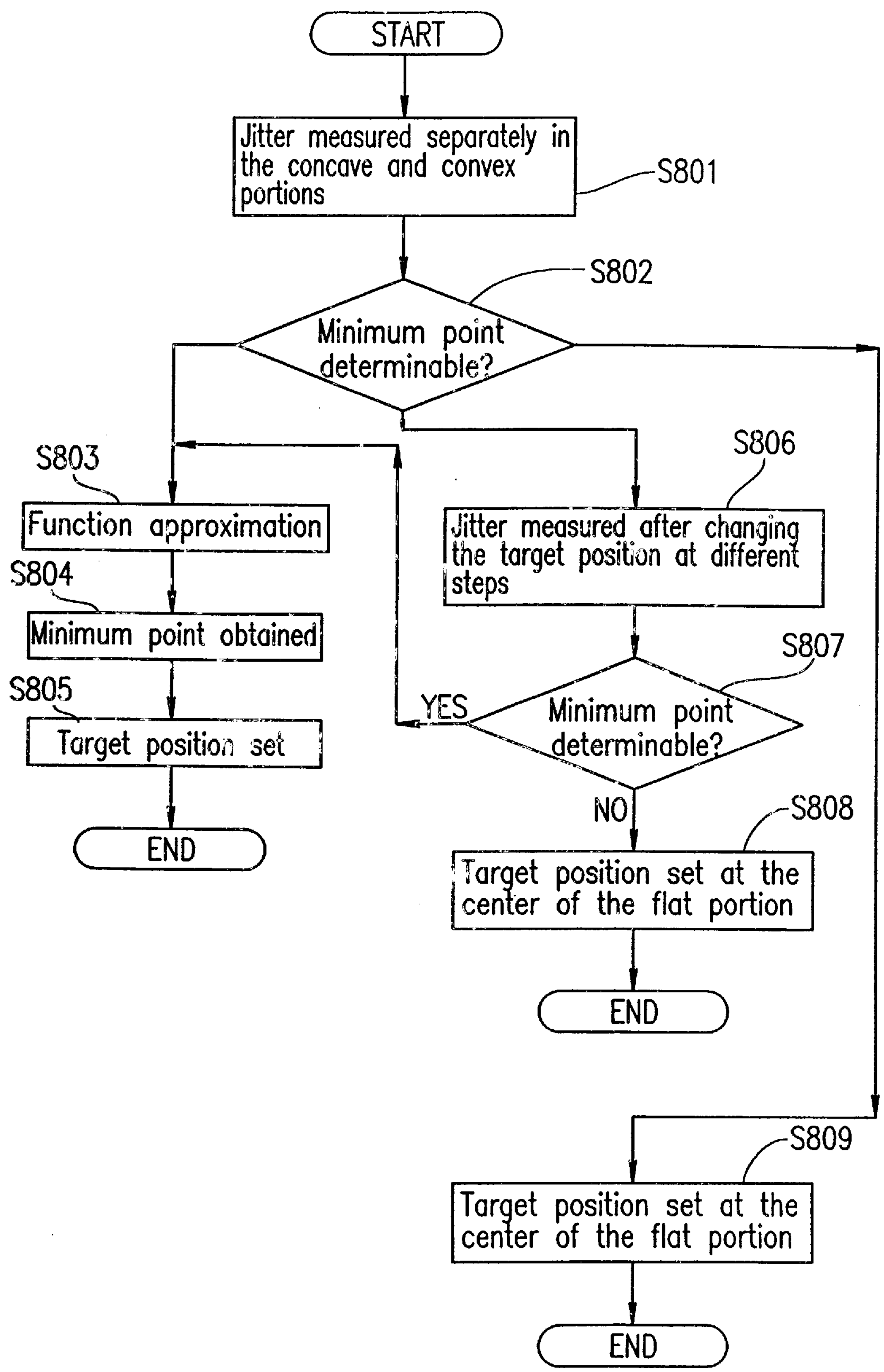
FIG. 8B
START
Jitter measured separately in the concave and convex portions
S801
S802
Minimum point determinable?
S803
Function approximation
S804
Minimum point obtained
S805
Target position set
END
S806
Jitter measured after changing the target position at different steps
S807
Minimum point determinable?
YES
NO
S808
Target position set at the center of the flat portion
END
S809
Target position set at the center of the flat portion
END

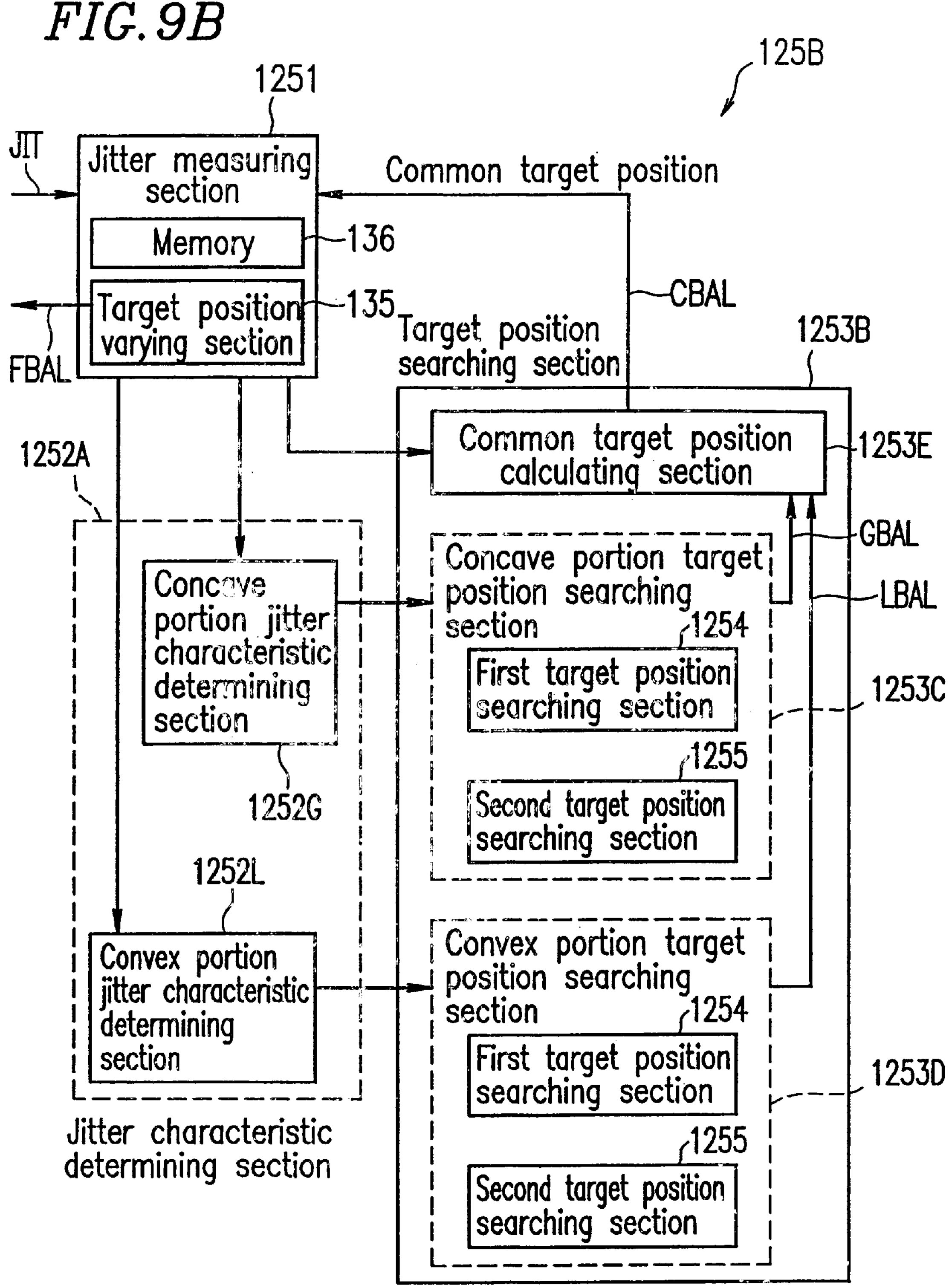
FIG. 9B
125B
1251
JIT
Jitter measuring section
Memory
136
Target position varying section
135
FBAL
Common target position
CBAL
Target position searching section
1253B
Common target position calculating section
1253E
GBAL
LBAL
1252A
Concave portion jitter characteristic determining section
1252G
Concave portion target position searching section
1254
First target position searching section
1253C
1255
Second target position searching section
1252L
Convex portion jitter characteristic determining section
Convex portion target position searching section
1254
First target position searching section
1253D
1255
Second target position searching section
Jitter characteristic determining section

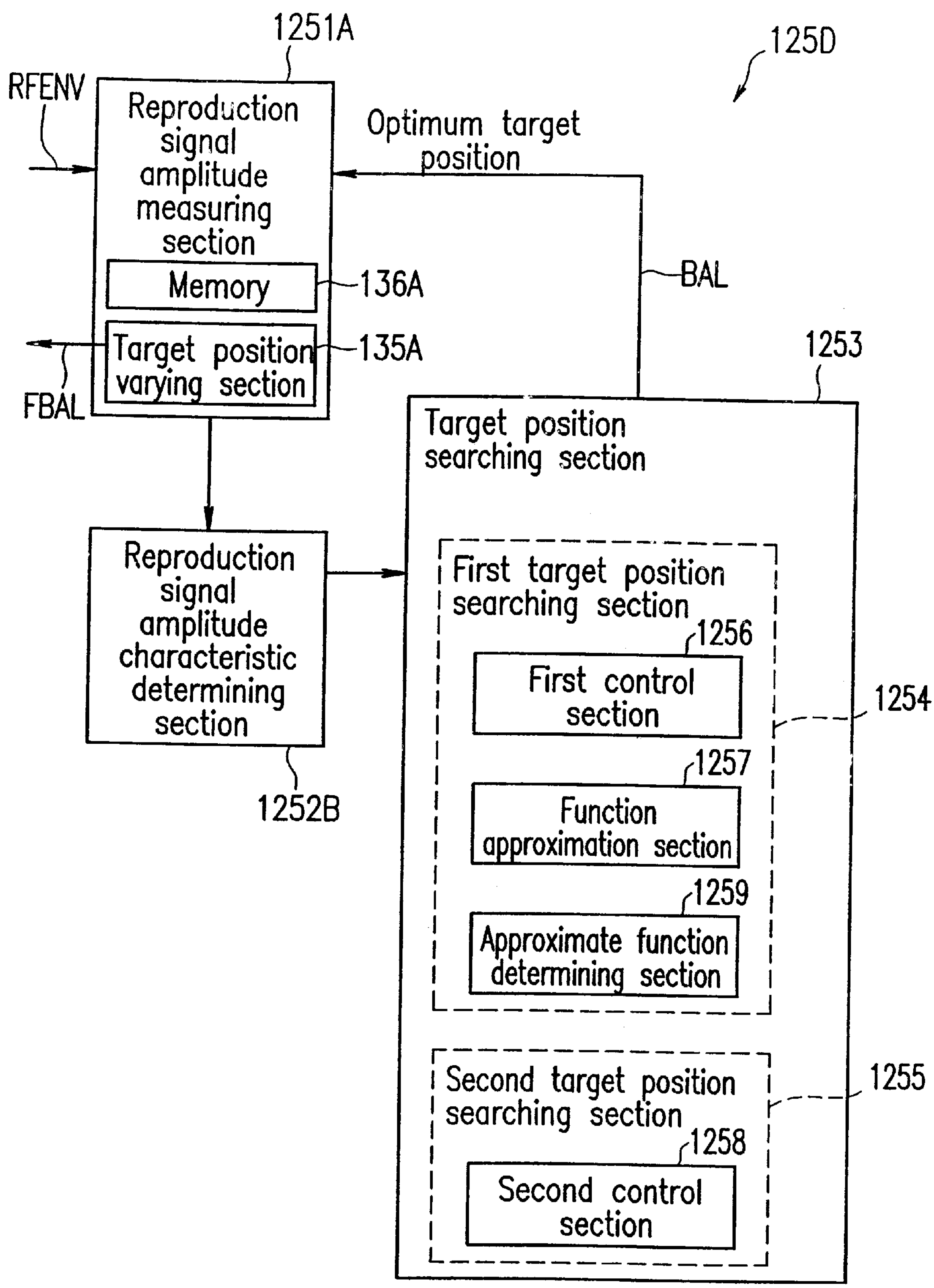
FIG. 13B
1251A
125D
RFENV
Reproduction signal amplitude measuring section
Optimum target position
Memory
136A
BAL
Target position varying section
135A
1253
FBAL
Target position searching section
Reproduction signal amplitude characteristic determining section
First target position searching section
1256
First control section
1254
1257
1252B
Function approximation section
1259
Approximate function determining section
Second target position searching section
1255
1258
Second control section

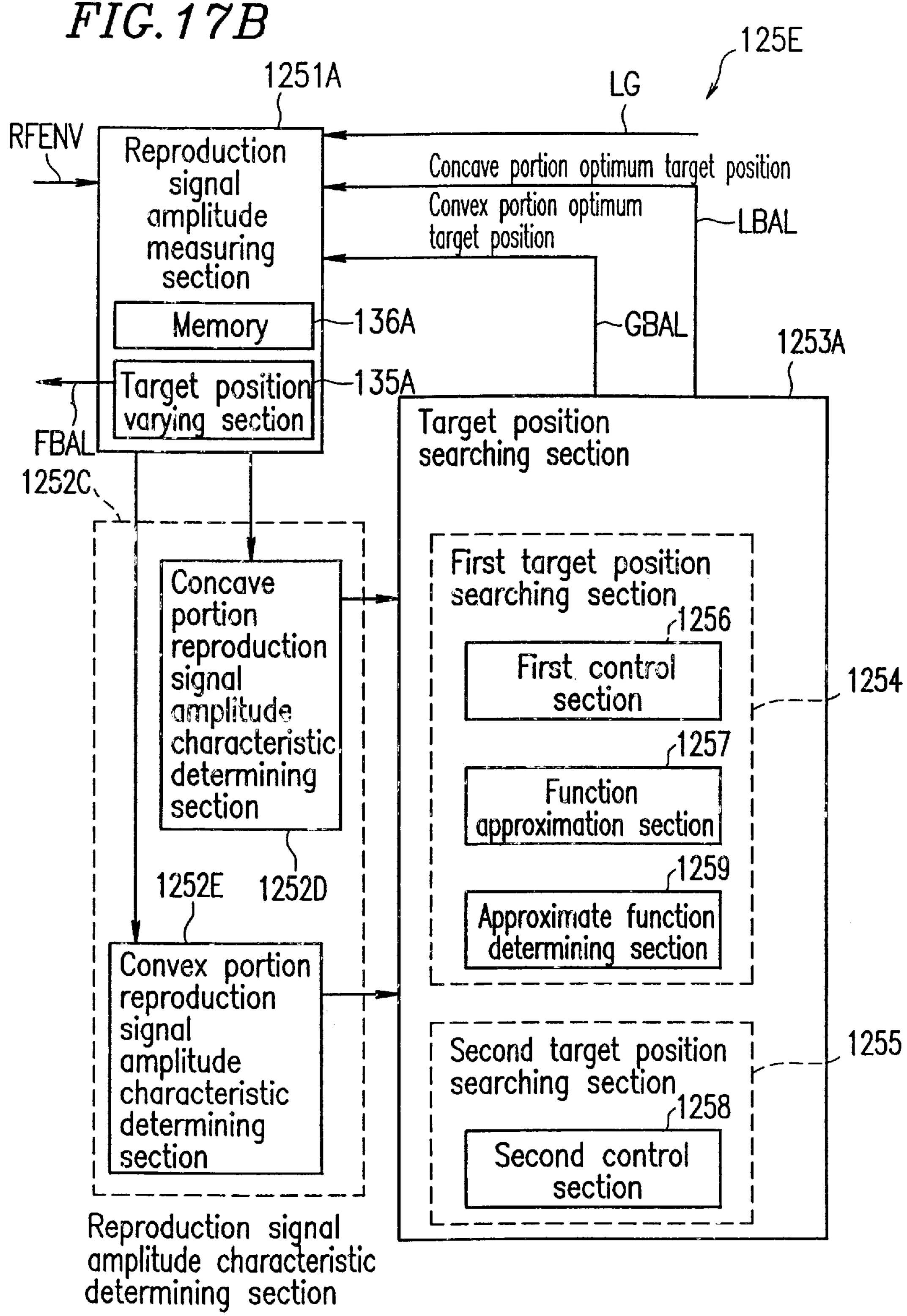
FIG. 17B
125E
1251A
LG
RFENV
Reproduction signal amplitude measuring section
Concave portion optimum target position
Convex portion optimum target position
LBAL
Memory
136A
GBAL
1253A
Target position varying section
135A
FBAL
1252C
Target position searching section
Concave portion reproduction signal amplitude characteristic determining section
First target position searching section
1256
First control section
1254
1257
Function approximation section
1259
Approximate function determining section
1252E
1252D
Convex portion reproduction signal amplitude characteristic determining section
Second target position searching section
1255
1258
Second control section
Reproduction signal amplitude characteristic determining section y
Reproduction signal amplitude
M
C
B
D
A
E
y=ax3+bx2+cx+d
1901
0
XM
x
Target position y
Jitter
y=ax3+bx2+cx+d
1902
A
B
M
C
D
E
x
0
XM
Target position M2
2101
Reproduction signal amplitude
Target position
2102

M3
2103
Reproduction signal amplitude
Target position

M5
2104
Reproduction signal amplitude
Target position
2105

FIG. 23A PRIOR ART
Target position
FL
FG
Time
Land
t23
Groove
Land
FIG. 23B PRIOR ART
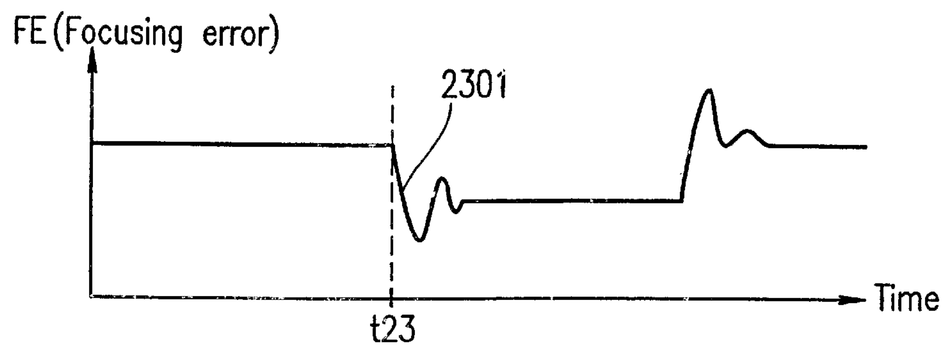
FIG. 23C PRIOR ART
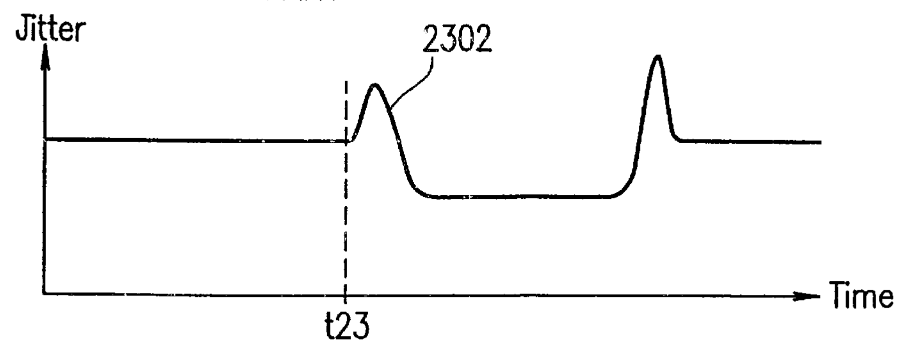
FIG. 23D PRIOR ART
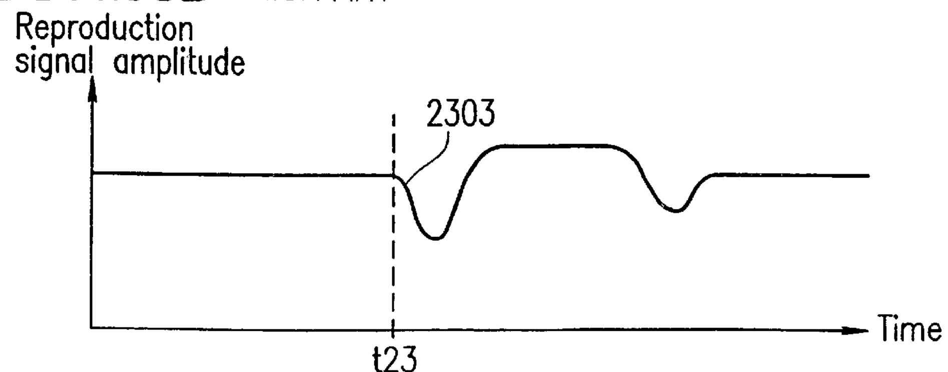

OPTICAL DISK DRIVE APPARATUS CAPABLE OF SEARCHING AN OPTIMUM TARGET POSITION

BACKGROUND OF THE INVENTION

1. Field of the Invention

The present invention relates to an optical disk apparatus for optically recording a signal on an information carrier using a light source such as, for example, laser and reproducing the recorded signal; and specifically to an optical disk apparatus including a focus controller for controlling a light beam directed onto the information carrier to constantly be in a prescribed convergence state.

2. Description of the Related Art

In this specification, the term "reproduction quality signal" is defined as a signal representing the quality of a reproduction signal. The reproduction quality signal includes a jitter and a reproduction signal amplitude. The term reproduction signal amplitudes is defined as an amplitude of the reproduction signal. The term "reproduction signal amplitude measurement signal" is defined as a signal representing the reproduction signal amplitude and is measured by a reproduction signal amplitude measuring section.

The characteristics expressed by the terms "flat bottomed curve" and "flat topped curve" are also expressed as "flat".

The term "optimum target position" is defined as a target position of a jitter characteristic at which the jitter is substantially minimum and a target position of a reproduction signal amplitude characteristic where the reproduction signal amplitude is substantially maximum.

One type of conventional optical disk apparatus, as described in, for example, Japanese Laid-Open Publication No. 2-135024, approximates a reproduction signal amplitude of a reproduction signal, changing relative to the target position of a focus control system, to a function for adjusting the target position so as to substantially maximize the reproduction signal amplitude. FIG. 18A is a block diagram illustrating a structure of a conventional optical disk apparatus 1800.

The optical disk apparatus 1800 includes an optical system 131 for directing light to form a beam spot (or beam) 111 on a disk 101, a disk motor 102 for rotating the disk 101 at a prescribed rotation rate, a light detector 109, preamplifiers 120A through 120D, a matrix calculator 121, a focus controller 132, a reproduction signal processing section 130, a DSP 1801, and a moving device 133. The optical system 131 includes a light source 103, a coupling lens 104, a polarization beam splitter 105, a polarization hologram device 106, a converging lens 107, and a collecting lens 108. The focus controller 132 includes a focus balance circuit 122 and a low pass filter (LPF) 123. The DSP 1801 includes a reproduction signal amplitude measuring section 1802, a target position searching section 1803, and a filter calculating circuit 134. The moving device 133 includes a focus actuator 127 and a focus driving circuit 126. The light detector 109 includes four light detecting sections 109A through 109D.

A light beam 110 emitted by the light source 104 is collimated by the coupling lens 104, and the collimated light is then reflected by the polarization beam splitter 105, passes through the polarization hologram device 106, and is converged by the converging lens 107 to form the beam spot 111 on an information track of the disk 101. The beam spot 111 reflected by the disk 101 passes through the converging lens 107, the polarization hologram device 106, and the polarization beam splitter 105, and is input to the light detector 109 through the collecting lens 108.

Outputs A through D from the four light detecting sections 109A through 109D are respectively input to preamplifiers 120A through 120D and processed with current-voltage conversion, and then are input to the matrix calculator 121. The matrix calculator 121 outputs a reproduction signal RF by adding all the outputs A through D ((A+D)+(B+C)), outputs a convergence state signal FS by (A+D)−(B+C), and outputs a phase difference tracking error signal (not shown) by comparing the phases of the signals (A+D) and (B+C). The reproduction processing circuit 130 detects an envelope of the reproduction signal RF and generates a reproduction signal amplitude measurement signal RFENV.

The focus control will be described. The focus balance circuit 122 subtracts a target position signal FBAL from the convergence state signal FS or adjusts a gain balance and thus inputs a focusing error signal FE to the filter calculation circuit 134 in the DSP 1801 through the LPF 123. The low pass filter 123 generates a focusing error signal FE by an astigmatic method based on the differential signal DS. The filter calculating circuit 134 executes filter calculations such as A/D conversion, addition, multiplication, and shift processing to the focusing error signal FE, and outputs a focus driving signal FOD. The focus driving circuit 126 current-amplifies the focus driving signal FOD. The focus actuator 127 drives the converging lens 107 so as to move the beam spot 111 in a direction perpendicular to the surface of the disk 101 based on the current-amplified focus driving signal FOD. Thus, the light beam on the disk 101 is controlled to be in a prescribed convergence state.

Measurement of the reproduction signal amplitude will be described. The reproduction signal processing section 130 generates a reproduction signal amplitude measurement signal RFENV based on the reproduction signal RF. The reproduction signal amplitude measuring section 1802 measures the level of the reproduction signal amplitude measurement signal RFENV by receiving the reproduction signal amplitude measurement signal RFENV by a built-in A/D converter (not shown) and performing digital sampling.

A method for adjusting the target position by the DSP 1801 shown in FIG. 18A will be described in detail with reference to FIGS. 18A and 18B. FIG. 18B shows a third-order function curve 1901 which approximates the relationship between the reproduction signal amplitude and the target positions, the relationship being obtained when the target position for focus control is moved step by step at a prescribed interval. Axis X represents the target position, and axle Y represents the reproduction signal amplitude. The reproduction signal amplitude measuring section 1802 moves through points A, B, C, D and E, which are provided at a prescribed interval, and measures the level of the reproduction signal amplitude measurement signal RFENV at each of the target positions. In order to enhance the precision of approximation, the reproduction signal amplitude measuring section 1802 measures the level of the reproduction signal amplitude measurement signal RFENV at the target positions interposing maximum point M on the reproduction signal amplitude characteristic.

Next, the relationship between the target position x and the reproduction signal amplitude y is approximated by function y=f(x). The reproduction signal amplitude characteristic is asymmetrical with respect to maximum point M as shown in FIG. 18B. In order to guarantee a sufficient approximation precision to the asymmetrical characteristic, approximation needs to be done with a third- or higher order function. By contrast, an excessively high order function complicates the calculation for approximation. Accordingly, the third-order function $$f(x)=ax^3+bx^2+cx+d \quad (1)$$

is optimum for approximating the reproduction signal amplitude characteristic.

There are various methods of approximation. For example, a least square method is usable. From equation (1), $$ax^3+bx^2+cx+d-y=0 \quad (2)$$

is obtained. When target position xj and reproduction signal amplitude yj are actually substituted into equation (2), the value of 0 is not obtained by the influence of noise, a measuring error, or the like, and the following value is obtained.

$$a(xj)^3+b(xj)^2+cxj+d-yj=vj \quad (2)'$$

When the values of a, b, c and d are set so that the total sum of the squares of vj, i.e., $$\sum_{j=1}^{N}(vj)^2$$

becomes minimum (N is a prescribed number of samples which is set), the curve 1901 represented by equation (1) passes through a position substantially close to the values actually measured by the reproduction signal amplitude measuring section 1802 (points A through E) as shown in FIG. 18B. Thus, a prescribed function y=f(x) can be calculated which approximates the relationship between the target position x and the reproduction signal amplitude y.

The reproduction signal amplitude measuring section 1802 stores a prescribed sample numbers N of target positions and reproduction signal amplitudes, and then executes the calculation so that the total sum of the squares of vj becomes minimum, thus to obtain approximate function y=f(x) The target position searching section 1803 calculates target XM corresponding to point M at which the reproduction signal amplitude y is maximum, i.e., maximum point M at function y=f(x). Target position XM at maximum point M is the optimum target position for focus control.

Then, a method for obtaining the maximum point will be described in detail. In the case of a third-order function, one maximum point and one minimum point are generally existent. The values on the x-coordinate of the maximum point and the minimum point are obtained as follows:

By differentiating the third-order function represented by equation (3), equation (4) is obtained.

$$y=ax^3+bx^2+cx+d \quad (3)$$

$$y'=3ax^2+2bx+c \quad (4)$$

The values on the x-coordinate of the maximum point and the minimum point are the values of x in equation (4) when y'=0. Accordingly, by solving equation (5) using the quadratic formula, x1 and x2 are obtained as follows.

$$\mathbf{x1}=[-b+\{(\mathbf{b2}-3ac)\}1/2]/(3a) \quad (6)$$

$$\mathbf{x2}=[-b-\{(\mathbf{b2}-3ac)\}1/2]/(3a) \quad (6A)$$

Either one of x1 or x2 is the maximum point or the minimum point, and the other of x1 and x2 is the remaining of the maximum point or the minimum point. Due to the characteristic of the third-order function, when there are both the maximum point and the minimum point, the value of y of the maximum point is necessarily larger than the value of y of the minimum point. Accordingly, when x1 and x2 above are substituted into the original third-order function to obtain y1 and y2, and the values of y1 and y2 are compared, it can be determined which one of (x1, y1) or (x2, y2) corresponds to the maximum point. For example, when y1>y2, x1 corresponding to y1 is the x-coordinate of the maximum point. After the reproduction signal amplitude measuring section 1802 obtains the approximate function, the target position searching section 1803 can obtain the values of x of the maximum point and the minimum point by executing the calculation represented by equations (6) and (6A). By comparing the values of y obtained based on the values of x, the value of x of the maximum point can be obtained.

As described above, in the conventional art, after the value of x of the maximum point is obtained, the reproduction signal amplitude measuring section 1802 outputs the value of x to the focus balance circuit 122 an the target position variable signal FBAL so as to optimize the convergence state of the light beam on the recording medium 101, i.e., the target position of focus control.

With reference to FIGS. 19A and 19B, an optical disk apparatus for approximating the jitter, which changes with respect to the target position, to the function and adjust the target position so as to substantially minimize the jitter will be described.

FIG. 19A is a block diagram of an optical disk apparatus 1800A. Identical elements previously discussed with respect to FIG. 18A bear identical reference numerals and the descriptions thereof will be omitted.

The optical disk apparatus 1800A shown in FIG. 19A is different from the optical disk apparatus 1800 in FIG. 18A in that the optical disk apparatus 1800A includes a jitter detector 124 and a DSP 1801A. The DSP 1801A includes a jitter measuring section 1802A, a target position searching section 1803A, and a filter calculating circuit 134.

FIG. 19B shows a third-order function curve 1902 which approximates the relationship between the jitter and the target position. Referring to FIGS. 19A and 19B, the jitter measuring section 1802A, like the reproduction signal amplitude measuring section 1802, moves the target position from point A to point B, C, D and E. The jitter measuring section 1802A measures a jitter signal JIT at each of the target positions. The target position searching section 1803A, like the target position searching section 1803 in FIG. 18A, approximates the relationship between the target position x and the jitter y with function $y=ax^2+bx^2+cx+d$, and thus obtains minimum point M and optimum target position XM. The target position searching section 1803 in FIG. 18A obtains the optimum target position based on the maximum value of the reproduction signal amplitude, whereas the target position searching section 1803A in FIG. 19A obtains the optimum target position based on the minimum value of the jitter.

According to the above-mentioned conventional art, the optimum target position at which the jitter is substantially minimum or the reproduction signal amplitude is substantially maximum is obtained in the following manner. The results of sampling is approximated to function 2001 (FIG. 20A) or 2101 (FIG. 21A), and minimum point M1 of the function 2001 or maximum point M2 of the function 2101 is obtained. An optimum target position 2002 corresponding to minimum point M1 of the function 2001 or an optimum target position 2102 corresponding to maximum point M2 of the function 2101 is obtained. Such conventional art has the following problems.

(1) As shown in FIGS. 20B and 21B, when a waveform equivalent circuit (equalizer; not shown) built in the reproduction signal processing section 130 has a characteristic which is excessively over-equalized (emphasized) or defocused due to the optical aberration or the like to be more influenced by crosstalk, a jitter characteristic 2003 and a reproduction signal amplitude characteristic 2103 exhibit a flat bottomed curve or a flat topped curve, i.e., the jitter or reproduction signal amplitude changes little in the vicinity of the point of inflection M2 or M3 with respect to the target position.

In order to specify the point of inflection M2 or M3, the number of points of measurement of the jitter or reproduction signal amplitude can be increased in order to improve the measuring precision. However, an increased number of points of measurement extends the time period for measurement.

Even when the optimum target position at which the jitter is minimum or the reproduction signal amplitude is maximum can be specified by increasing the number of points of measurement, the following problem is still involved. When the jitter characteristic or the reproduction signal amplitude characteristic are steep on one of the sides interposing the maximum or minimum point as a characteristic 2004 (FIG. 20C) or 2104 (FIG. 21C) and an optimum target position 2005 corresponding to minimum point M4 or an optimum target position 2105 corresponding to maximum point M5 is set, the margin on the one side is very small. In a worst case, the focus control is destabilized during the adjustment.

(2) In the case of an optical disk, such as a DVD-RAM disk, having a convex land track and a concave groove track which have information recorded therein, the jitter or reproduction signal amplitude characteristic with respect to the target position is significantly different between the land track and the groove track due to factors such as, for example, optical aberration and beam profile. For example, as shown in FIG. 22, a jitter characteristic 2201 of the land track exhibits a flat bottomed curve with little change in the vicinity of point of inflection ML. A jitter characteristic 2202 of the groove track exhibits a sharp inverted parabolic curve with respect to point of inflection MG at the center. Accordingly, the optimum target position needs to be set independently for the land track and the groove track.

It is not problematic to set optimum target positions FL and FG independently for the land track and the groove track. When, an shown in FIG. 23A, the difference between the optimum target positions FL and FG is large, a undulated focusing error response 2301 (FIG. 23B), a undulated jitter response 2302 (FIG. 23C), or a undulated reproduction signal amplitude response 2303 (FIG. 23D) occurs immediately after time t23 when the land track is switched to the groove track. As a result, information in a sector immediately after switching cannot be reproduced.

In the case where the deviation from the recorded layer perpendicular to the reference plane is large, the optimum target position changes during one rotation. Accordingly, the optimum target position based on the jitter or reproduction signal amplitude of one rotation may undesirably have an error with respect to the actual optimum target position. Due to the error, information stored in a portion where the deviation from the recorded layer perpendicular to the reference plane is largest cannot be reproduced.

SUMMARY OF THE INVENTION

An optical disk apparatus according to the present invention includes a converging section for converging a light beam toward an information carrier, a moving section for moving the light beam converged by the converging section in a direction perpendicular to a surface of the information carrier; a light detector for detecting the light beam reflected by the information carrier; a convergence state detecting section for generating a convergence state signal representing a convergence state of the light beam at a convergence point on the information carrier and outputting a reproduction signal from the information carrier, based on the output from the light detector; a focus controller for driving the moving section to make the convergence state constant based on the convergence state signal and a prescribed target position; a reproduction quality signal detector for detecting a reproduction quality signal representing a quality of the reproduction signal based on the reproduction signal; a reproduction quality signal measuring section for changing the target position and measuring a value of the reproduction quality signal corresponding to each of the changed target positions; a reproduction quality signal characteristic determining section for determining a characteristic of the reproduction quality signal based on the value of the reproduction quality signal corresponding to each of the changed target positions; and a target position searching section for searching for an optimum target position of the focus controller for optimizing the value of the reproduction quality signal based on a determination result of the reproduction quality signal characteristic determining section.

In one embodiment of the invention, the reproduction quality signal characteristic determining section determines, based on the value of the reproduction quality signal measured by the reproduction quality signal measuring section, whether or not the reproduction quality signal has a substantially maximum or minimum value in a prescribed range of the target positions. The target position searching section includes a first target position searching section for searching for the optimum target position when the reproduction quality signal has one of a parabolic characteristic or an inverted parabolic characteristic having the maximum or minimum value in the prescribed range, and a second target position searching section for searching for the optimum target position when the reproduction quality signal has a flat characteristic not having the maximum or minimum value in the prescribed ranges In one embodiment of the invention, the first target position searching section includes a first control section for moving the target position in a direction in which a quality represented by the reproduction quality signal is presumed to be improved while searching for the optimum target position. The second target position searching section includes a second control section for moving the target position in a prescribed direction.

In one embodiment of the invention, the first target position searching section includes a function approximation section for finding an approximate function for approximating the relationship between the target position and the reproduction quality signal, and determines the optimum target position based on the approximate function. The second target position searching section determines the optimum target position by finding a center point in a portion of the prescribed range, in which a change in the value of the reproduction quality signal is restricted at a prescribed level or less.

In one embodiment of the invention, the second target position searching section restricts the portion to a prescribed area or less.

In one embodiment of the invention, the first target position searching section includes an approximate function determining section for obtaining an approximation degree between the approximate function obtained by the function approximation section and a prescribed shape of the characteristic of the reproduction quality signal. When the approximation degree is a prescribed level or more, the first target position searching section obtains the target position at which the value of the reproduction quality signal measured by the reproduction quality signal measuring section is substantially maximum or minimum as the optimum target position, without using the approximate function.

In one embodiment of the invention, when the reproduction quality signal characteristic determining section determines that the reproduction quality signal has a flat characteristic not having a substantially maximum or minimum value, the reproduction quality signal measuring section changes the target position with narrower steps and measures a value of the reproduction quality signal corresponding to each of the changed target positions.

In one embodiment of the invention, the information carrier includes a concave information track having a concave shape and a convex information track having a convex shape. The reproduction quality signal characteristic determining section includes a concave portion reproduction quality signal characteristic determining section for determining the characteristic of the reproduction quality signal based on the value of the reproduction quality signal corresponding to each of the target positions changed in the concave information track, and a convex portion reproduction quality signal characteristic determining section for determining the characteristic of the reproduction quality signal based on the value of the reproduction quality signal corresponding to each of the target positions changed in the convex information track. The target position searching section searches for a concave optimum target position at which the reproduction quality signal has an optimum value based on a determination result of the concave portion reproduction quality signal characteristic determining section, and also searches for a convex optimum target position at which the reproduction quality signal has an optimum value based on a determination result of the convex portion reproduction quality signal characteristic determining section.

In one embodiment of the invention, the concave portion reproduction quality signal characteristic determining section determines, based on the value of the reproduction quality signal in the concave information track measured by the reproduction quality signal measuring section, whether or not the reproduction quality signal in the concave portion has a substantially maximum or minimum value in a prescribed range of the target positions. The convex portion reproduction quality signal characteristic determining section determines, based on the value of the reproduction quality signal in the convex information tract measured by the reproduction quality signal measuring section, whether or not the reproduction quality signal in the convex portion has a substantially maximum or minimum value in a prescribed range of the target positions. The target position searching section includes a first target position searching section for searching for the optimum target position when the reproduction quality signal has one of a parabolic characteristic and an inverted parabolic characteristic having the maximum or minimum value in the prescribed range, and a second target position searching section for searching for the optimum target position when the reproduction quality signal has a flat characteristic not having the maximum or minimum value in the prescribed range.

In one embodiment of the invention, the first target position searching section includes a first control section for moving the target position in a direction in which a quality represented by the reproduction quality signal is presumed to be improved while searching for the optimum target position. The second target position searching section includes a second control section for moving the target position in a prescribed direction.

In one embodiment of the invention, the first target position searching section includes a function approximation section for finding an approximate function for approximating the relationship between the target position and the reproduction quality signal, and determines the optimum target position based on the approximate function. The second target position searching section determines the optimum target position by finding a center point in a portion of the prescribed range, in which a change in the value of the reproduction quality signal is restricted at a prescribed level or less.

In one embodiment of the invention, the target position searching section includes a concave portion target position searching section for searching for a concave portion optimum target position at which the reproduction quality signal has an optimum value based on a determination result of the concave portion reproduction quality signal characteristic determining section, a convex portion target position searching section for searching for a convex portion optimum target position at which the reproduction quality signal has an optimum value based on a determination result of the convex portion reproduction quality signal characteristic determining section, and a common target position calculating section for calculating a common target position usable in the concave information track and the convex information track, based on the concave portion optimum target position and the convex portion optimum target position.

In one embodiment of the invention, the common target position calculating section calculates a center position between the concave portion optimum target position and the convex portion optimum target position as the common optimum target position.

In one embodiment of the invention, the common target position calculating section determines the common optimum target position based on a value of the reproduction quality signal corresponding to the concave portion optimum target position and a value of the reproduction quality signal corresponding to the convex portion optimum target position.

In one embodiment of the invention, when either one of the concave portion reproduction quality signal characteristic determining section and the convex portion reproduction quality signal characteristic determining section determines that the reproduction quality signal has one of a parabolic characteristic and an inverted parabolic characteristic having a substantially maximum or minimum value in the prescribed range, the common target position calculating section determines the optimum target position found by the target position searching section corresponding is to the reproduction quality signal characteristic determining section which determined that the reproduction quality signal has one of the parabolic characteristic and the inverted parabolic characteristic, as the common optimum target position.

In one embodiment of the invention, the common target position calculating section compares a first reproduction quality signal measured by the reproduction quality signal measuring section when the target position is moved from the concave portion optimum target position and a second reproduction quality signal measured by the reproduction quality signal measuring section when the target position is moved from the convex portion optimum target position. When the first reproduction quality signal does not have a better characteristic than that of the second reproduction quality signal, the common target position calculating section determines the concave optimum target position as the common optimum target position; and when the first reproduction quality signal has a better characteristic than that of the second reproduction quality signal, the common target position calculating section determines the convex optimum target position as the common optimum target position.

In one embodiment of the invention, the reproduction quality signal includes jitter. The reproduction quality signal detector includes a jitter detector for detecting a jitter based on the reproduction signal. The reproduction quality signal measuring section includes a jitter measuring section for measuring a jitter value corresponding to each of the changed target positions. The reproduction quality signal characteristic a determining section includes a jitter characteristic determining section for determining a characteristic of the jitter based on the jitter value. The target position searching section searches for an optimum target position at which the jitter has a substantially minimum value based on a determination result of the jitter characteristic determining section.

In one embodiment of the invention, the jitter characteristic determining section determines, based on the jitter value measured by the jitter measuring section, whether or not the jitter has a substantially minimum value in a prescribed range of the target positions. The target position searching section includes a first target position searching section for searching for the optimum target position when the jitter has an inverted parabolic characteristic having the minimum value in the prescribed range, and a second target position searching section for searching for the optimum target position when the jitter has a flat bottomed curve characteristic not having the minimum value in the prescribed range.

In one embodiment of the invention, the first target position searching section includes a first control section for moving the target position in a direction in which the jitter is presumed to be decreased while searching for the optimum target position. The second target position searching section includes a second control section for moving the target position in a prescribed direction.

In one embodiment of the invention, the first target position searching section includes a function approximation section for finding an approximate function for approximating the relationship between the target position and the jitter value, and determines the optimum target position based on the approximate function. The second target position searching section determines the optimum target position by finding a center point in a portion of the prescribed range, in which a change in the jitter value is restricted at a prescribed level or less.

In one embodiment of the invention, the second target position searching section restricts the portion to a prescribed area or less.

In one embodiment of the invention, when the jitter characteristic determining section determines that the jitter has a flat bottomed curve characteristic not having a substantially minimum value, the jitter measuring section changes the target position with narrower steps and measures a jitter value corresponding to each of the changed target positions.

In one embodiment of the invention, the first target position searching section includes an approximate function determining section for obtaining an approximation degree between the approximate function obtained by the function approximation section and a prescribed shape of the characteristic of the jitter. When the approximation degree is a prescribed level or more, the first target position searching section obtains the target position at which the jitter value measured by the jitter measuring section is substantially minimum as the optimum target position, without using the approximate function.

In one embodiment of the invention, the information carrier includes a concave information track having a concave shape and a convex information track having a convex shape. The jitter characteristic determining section includes a concave portion jitter characteristic determining section for determining the characteristic of the jitter based on the jitter value corresponding to each of the target positions changed in the concave information track, and a convex portion jitter characteristic determining section for determining the characteristic of the jitter based on the jitter value corresponding to each of the target positions changed in the convex information track. The target position searching section searches for a concave optimum target position at which the jitter has an optimum value based on a determination result of the concave portion jitter characteristic determining section, and also searches for a convex optimum target position at which the jitter has an optimum value based on a determination result of the convex portion jitter characteristic determining section.

In one embodiment of the invention, the concave portion jitter characteristic determining section determines, based on the jitter value in the concave information track measured by the jitter measuring section, whether or not the jitter in the concave portion has a substantially minimum value in a prescribed range of the target positions. The convex portion jitter characteristic determining section determines, based on the jitter value in the convex information track measured by the jitter measuring section, whether or not the jitter in the convex portion has a substantially minimum value in a prescribed, range of the target positions. The target position searching section includes a first target position searching section for searching for the optimum target position when the jitter has an inverted parabolic characteristic having the minimum value in the prescribed range, and a second target position searching section for searching for the optimum target position when the jitter has a flat bottomed curve characteristic not having the minimum value in the prescribed range.

In one embodiment of the invention, the first target position searching section includes a first control section for moving the target position in a direction in which the jitter is presumed to be decreased while searching for the optimum target position. The second target position searching section includes a second control section for moving the target position in a prescribed direction.

In one embodiment of the invention, the first target position searching section includes a function approximation section for finding an approximate function for approximating the relationship between the target position and the jitter, and determines the optimum target position based on the approximate function. The second target position searching section determines the optimum target position by finding a center point in a portion of the prescribed range, in which a change in the jitter value is restricted at a prescribed level or less.

In one embodiment of the invention, the target position searching section includes a concave portion target position searching section for searching for a concave portion optimum target position at which the jitter has an optimum value based on a determination result of the concave portion jitter characteristic determining section, a convex portion target position searching section for searching for a convex portion optimum target position at which the jitter has an optimum value based on a determination result of the convex portion jitter characteristic determining section, and a common target position calculating section for calculating a common target position usable in the concave information track and the convex information track, based on the concave portion optimum target position and the convex portion optimum target position.

In one embodiment of the invention, the reproduction quality signal includes a reproduction signal amplitude measurement signal. The reproduction quality signal detector includes a reproduction signal processing section for detecting a reproduction signal amplitude based on the reproduction signal. The reproduction quality signal measuring section includes a reproduction signal amplitude measuring section for measuring a reproduction signal amplitude value corresponding to each of the changed target positions. The reproduction quality signal characteristic determining section includes a reproduction signal amplitude characteristic determining section for determining a characteristic of the reproduction signal amplitude based on the reproduction signal amplitude value. The target position searching section searches for an optimum target position at which the reproduction signal amplitude has a maximum value based on a determination result of the reproduction signal amplitude characteristic determining section.

In one embodiment of the invention, the reproduction signal amplitude characteristic determining section determines, based on the reproduction signal amplitude measured by the reproduction signal amplitude measuring section, whether or not the reproduction signal amplitude has a substantially maximum value in a prescribed range of the target positions. The target position searching section includes a first target position searching section for searching for the optimum target position when the reproduction signal amplitude has a parabolic characteristic having the maximum value in the prescribed range, and a second target position searching section for searching for the optimum target position when the reproduction signal amplitude has a flat topped curve characteristic not having the maximum value in the prescribed range.

In one embodiment of the invention, the first target position searching section includes a first control section for moving the target position in a direction in which the reproduction signal amplitude is presumed to be increased while searching for the optimum target position. The second target position searching section includes a second control section for moving the target position in a prescribed direction.

In one embodiment of the invention, the first target position searching section includes a function approximation section for finding an approximate function for approximating the relationship between the target position and the reproduction signal amplitude value, and determines the optimum target position based on the approximate function. The second target position searching section determines the optimum target position by finding a center point in a portion of the prescribed range, in which a change in the reproduction signal amplitude value is restricted at a prescribed level or less.

In one embodiment of the invention, the second target position searching section restricts the portion to a prescribed area or less.

In one embodiment of the invention, when the reproduction signal amplitude characteristic determining section determines that the reproduction signal amplitude has a flat topped curve characteristic not having a substantially maximum value, the measuring section changes the target position with narrower steps and measures a reproduction signal amplitude value corresponding to each of the changed target positions.

In one embodiment of the invention, the first target position searching section includes an approximate function determining section for obtaining an approximation degree between the approximate function obtained by the function approximation section and a prescribed shape of the characteristic of the reproduction signal amplitude. When the approximation degree is a prescribed level or more, the first target position searching section obtains the target position at which the reproduction signal amplitude value measured by the reproduction signal amplitude measuring section is substantially maximum as the optimum target position, without using the approximate function.

In one embodiment of the invention, the information carrier includes a concave information track having a concave shape and a convex information track having a convex shape. The reproduction signal amplitude characteristic determining section includes a concave portion reproduction signal amplitude characteristic determining section for determining the characteristic of the reproduction signal amplitude based on the reproduction signal amplitude value corresponding to each of the target positions changed in the concave information track, and a convex portion reproduction signal amplitude characteristic determining section for determining the characteristic of the reproduction signal amplitude based on the reproduction signal amplitude value corresponding to each of the target positions changed in the convex information track. The target position searching section searches for a concave optimum target position at which the reproduction signal amplitude has an optimum value based on a determination result of the concave portion reproduction signal amplitude characteristic determining section, and also searches for a convex optimum target position at which the reproduction signal amplitude has an optimum value based on a determination result of the convex portion reproduction signal amplitude characteristic determining section.

In one embodiment of the invention, the concave portion reproduction signal amplitude characteristic determining section determines, based on the reproduction signal amplitude value in the concave information track measured by the reproduction signal amplitude measuring section, whether or not the reproduction signal amplitude in the concave portion has a substantially maximum value in a prescribed range of the target positions. The convex portion reproduction signal amplitude characteristic determining section determines, based on the reproduction signal amplitude value in the convex information track measured by the reproduction signal amplitude measuring section, whether or not the reproduction signal amplitude in the convex portion has a substantially maximum value in a prescribed range of the target positions. The target position searching section includes a first target position searching section for searching for the optimum target position when the reproduction signal amplitude has a parabolic characteristic having the maximum value in the prescribed range, and a second target position searching section for searching for the optimum target position when the reproduction signal amplitude has a flat topped curve characteristic not having the maximum value in the prescribed range.

In one embodiment of the invention, the first target position searching section includes a first control section for moving the target position in a direction in which the reproduction signal amplitude is presumed to be increased while searching for the optimum target position and the second target position searching section includes a second control section for moving the target position in a prescribed direction.

In one embodiment of the invention, the first target position searching section includes a function approximation section for finding an approximate function for approximating the relationship between the target position and the reproduction signal amplitude, and determines the optimum target position based on the approximate function. The second target position searching section determines the optimum target position by finding a center point in a portion of the prescribed range, in which a change in the reproduction signal amplitude value is restricted at a prescribed level or less.

In one embodiment of the invention, the target position searching section includes a concave portion target position searching section for searching for a concave portion optimum target position at which the reproduction signal amplitude has an optimum value based on a determination result of the concave portion reproduction signal amplitude characteristic determining section, a convex portion target position searching section for searching for a convex portion optimum target position at which the reproduction signal amplitude has an optimum value based on a determination result of the convex portion reproduction signal amplitude characteristic determining section, and a common target position calculating section for calculating a common target position usable in the concave information track and the convex information track, based on the concave portion optimum target position and the convex portion optimum target position.

In one embodiment of the invention, the optical disk apparatus further includes a recording distinguishing section for distinguishing whether or not information is recorded on the information carrier based on the. reproduction quality signal detected by the reproduction quality signal detector, wherein the reproduction quality signal measuring section changes the target position based on a distinguishment result of the recording distinguishing section.

In one embodiment of the invention, when the recording distinguishing section distinguishes that the information is recorded on the information carrier, the reproduction quality signal measuring section changes the target position.

In one embodiment of the invention, the information carrier includes a concave information track having a concave shape and a convex information track having a convex shape. The reproduction quality signal measuring section changes the target position in the concave information track a first number of times, the first number corresponding to a first sample number which represents the number of samples of the reproduction quality signal measured in the concave information track. and changes the target position in the convex information track a second number of times, the second number corresponding to a second sample number which represents the number of samples of the reproduction quality signal measured in the convex information track. The first sample number and the second sample number are substantially equal to each other.

In one embodiment of the invention, the information carrier includes a concave information track having a concave shape and a convex information track having a convex shape. The reproduction quality signal measuring section changes the target position in the concave information track a first number of times, the first number corresponding to a first sector number which represents the number of sectors of the reproduction quality signal measured in the concave information track, and changes the target position in the convex information track a second number of times, the second number corresponding to a second sector number which represents the number of sectors of the reproduction quality signal measured in the convex information track. The first sector number and the second sector number are substantially equal to each other.

In one embodiment of the invention, when reproduction of desired information results in failure, the reproduction quality signal measuring section changes the target position in the vicinity of the information track on which the desired information which was not reproduced is recorded.

In one embodiment of the invention, the information carrier includes a first division section and a second division section obtained by dividing one rotation of track, the reproduction quality signal measuring section changes the target position in the first division section, measures a value of a first division section reproduction quality signal corresponding to each of the target positions changed in the first division section, changes the target position in the second division section, and measure a value of a second division section reproduction quality signal corresponding to each of the target positions in the second division section. The reproduction quality signal characteristic determining section determines a characteristic of the first reproduction quality signal based on the value of the first division section reproduction quality signal, and determines a characteristic of the second reproduction quality signal based on the value of the second division section reproduction quality signal. The target position searching section searches for a first optimum target position at which the first reproduction quality signal has an optimum value based on a determination result of the characteristic of the first reproduction quality signal obtained by the reproduction quality signal characteristic determining section, and searches for a second optimum target position at which the second reproduction quality signal has an optimum value based on a determination result of the characteristic of the second reproduction quality signal obtained by the reproduction quality signal characteristic determining section.

In one embodiment of the invention, the target position searching section determines the optimum target position based on an average value of the first optimum target position and the second optimum target position.

In one embodiment of the invention, the reproduction quality signal measuring section smoothes the first optimum target position and the second optimum target position with a prescribed time constant and outputs the smoothing result to the focus controller.

Thus, the invention described herein makes possible the advantages of providing (1) an optical disk apparatus for guaranteeing stable focus control and reproduction signal performance by executing an optimum method of target position search based on the characteristic of the reproduction quality signal and thus finding the optimum target position quickly with high precision; and (2) an optical disk apparatus for setting an optimum target position for a medium, such as a DVD-RAM disk, having a convex land track and a concave groove track even when the jitter or reproduction signal amplitude characteristic is significantly different between the land track and the groove track due to factors such as, for example, optical aberration and bean profile.

These and other advantages of the present invention will become apparent to those skilled in the art upon reading and understanding the following detailed description with reference to the accompanying figures.

BRIEF DESCRIPTION OF THE DRAWINGS

FIG. 2B is a view showing a structure of a DSP of the optical disk apparatus in the first example;

FIG. 6B is a view showing a structure of a DSP of the optical disk apparatus in second example;

FIG. 8B is a flowchart illustrating an operation for searching for a target position in the second example;

FIG. 9B is a view showing a structure of a DSP of the optical disk apparatus in the third example;

FIG. 13B is a view showing a structure of a DSP of the optical disk apparatus in the sixth example;

FIG. 17B is a view showing a structure of a DSP of the optical disk apparatus in the seventh example;

FIG. 23A is a graph illustrating switching of the target position between a land track and a groove track in the conventional example;

FIG. 23B is a graph illustrating a focusing error response waveform when the target position is switched between a land track and a groove track in the conventional example;

FIG. 23C is a graph illustrating a jitter response waveform when the target position is switched between a land track and a groove track in the conventional example; and FIG. 23D is a graph illustrating a reproduction signal amplitude response waveform when the target position is switched between a land track and a groove track in the conventional example.

DESCRIPTION OF THE EMBODIMENTS

Hereinafter, the present invention will be described by way of illustrative examples with reference to the accompanying drawings.

EXAMPLE 1

Figure 1:
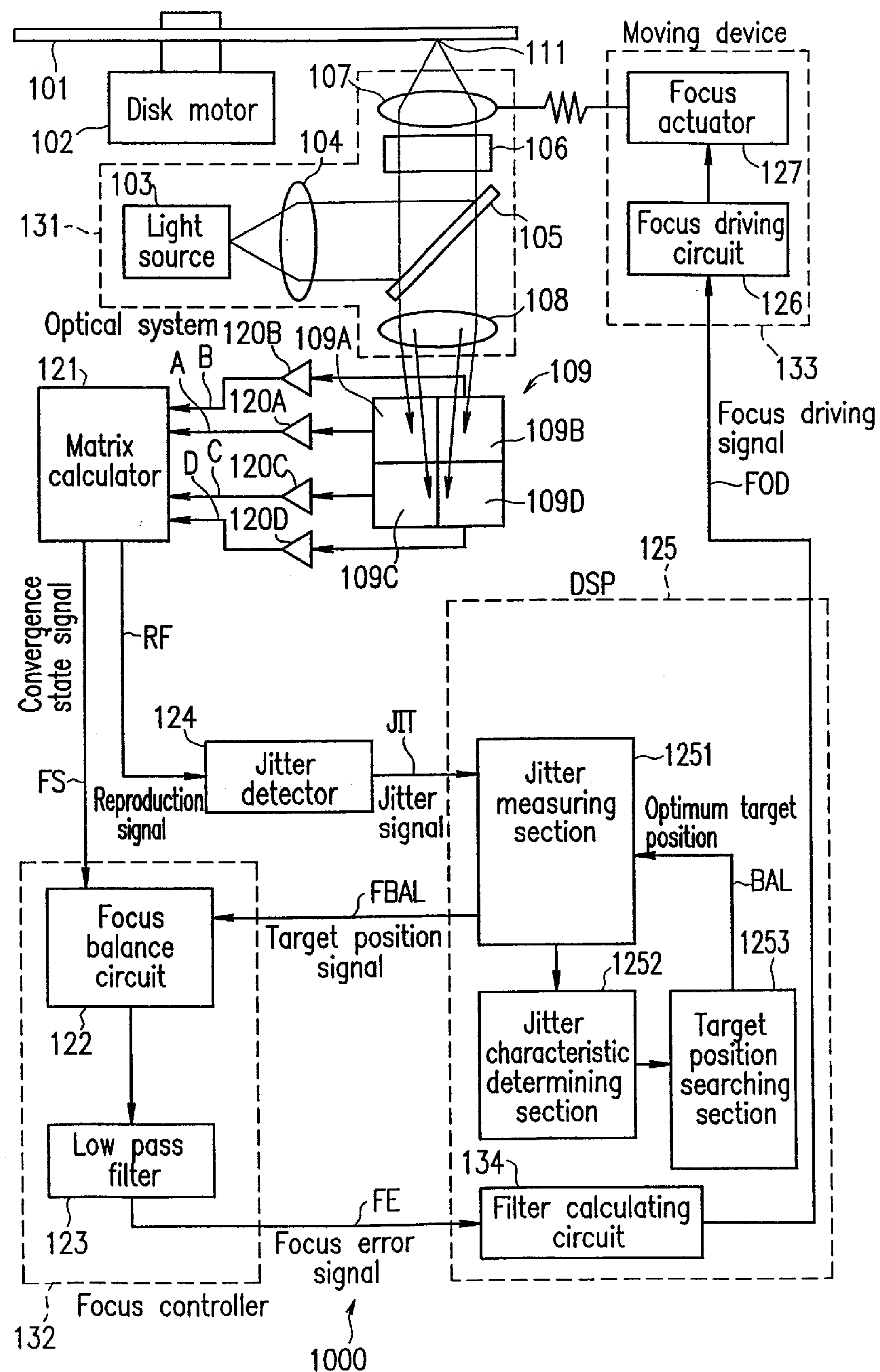
FIG. 1 is a view showing a structure of an optical disk apparatus in a first example according to the present invention.
Figure 18A:
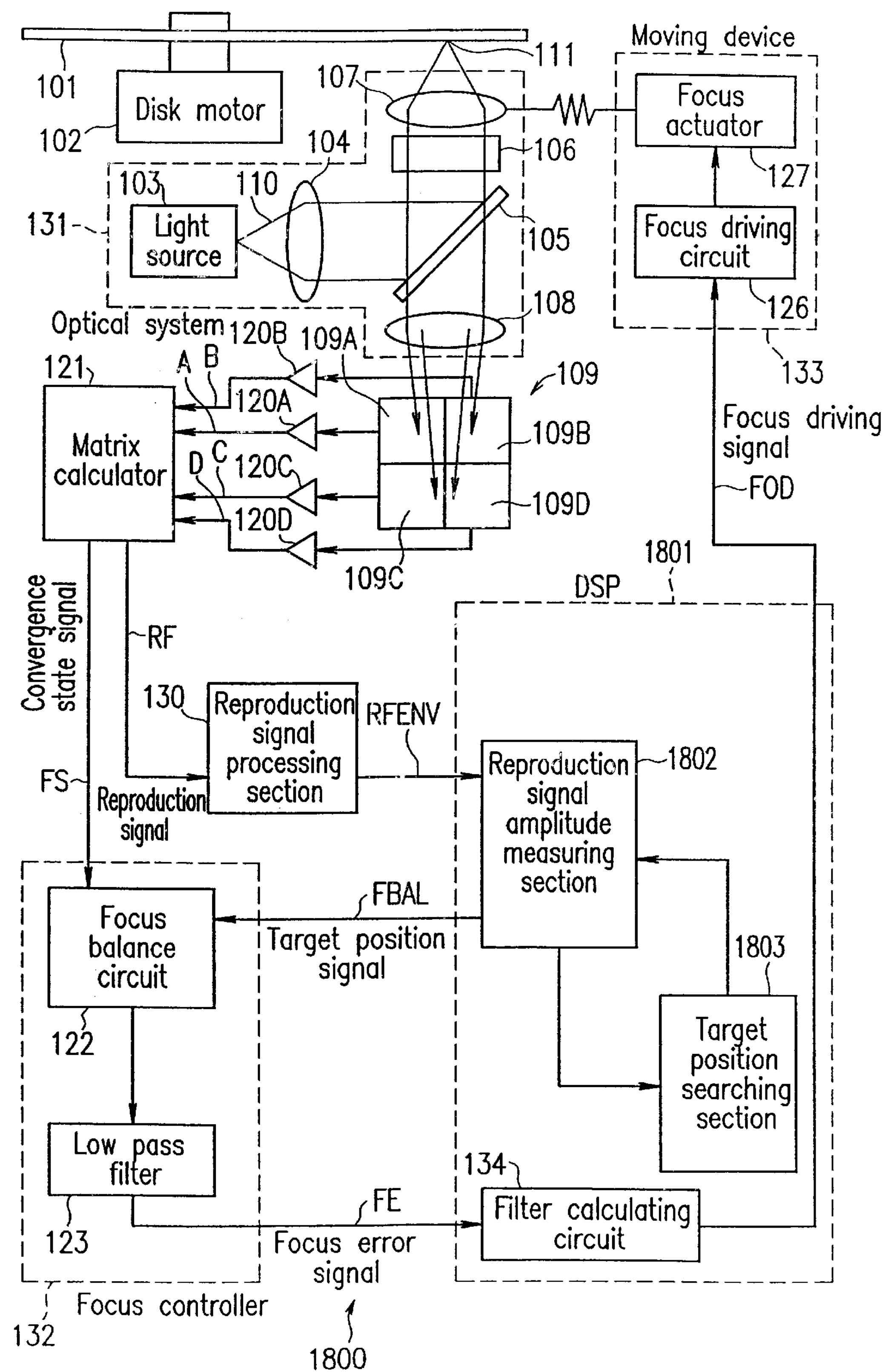
FIG. 18A is a view showing a structure of a conventional optical disk apparatus.
Figure 18B:
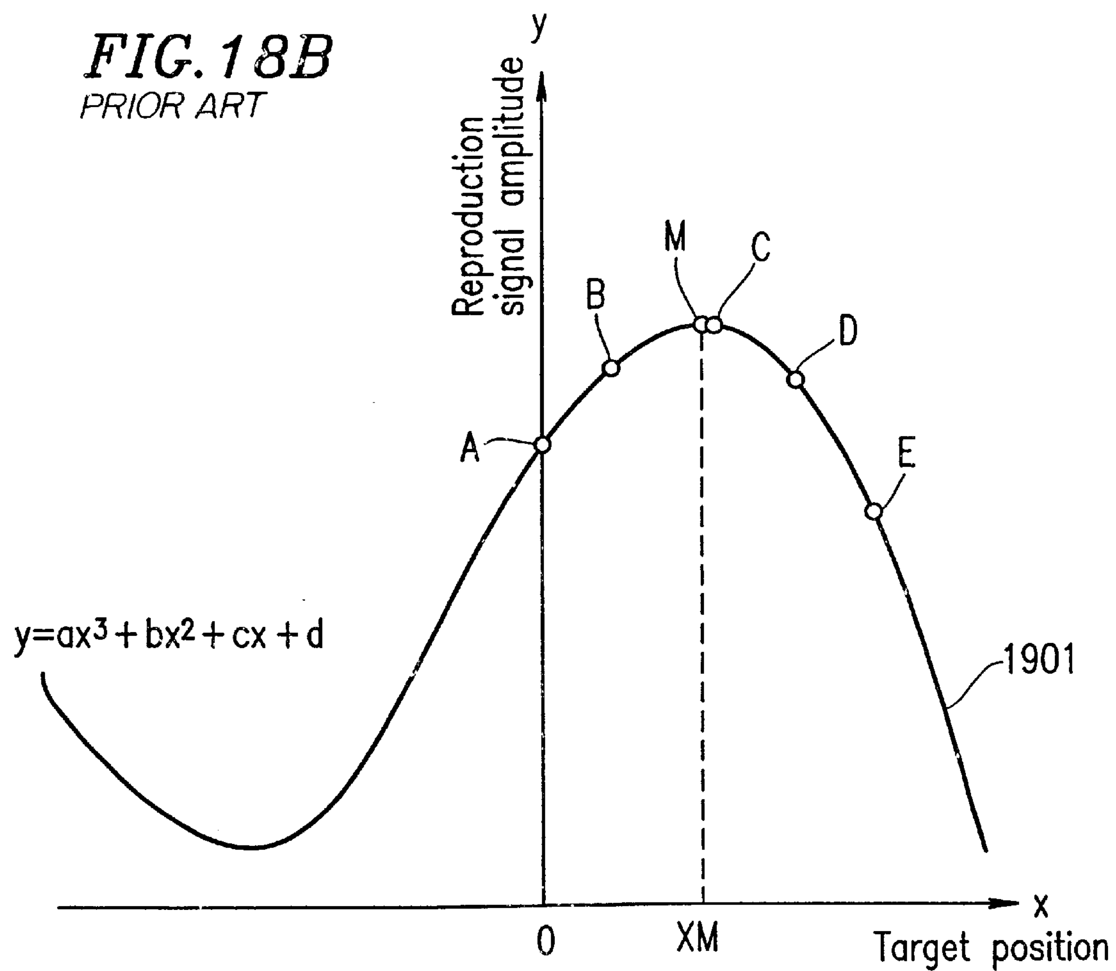
FIG. 18B is a graph illustrating a conventional operation for searching for a target position.
Figure 19A:
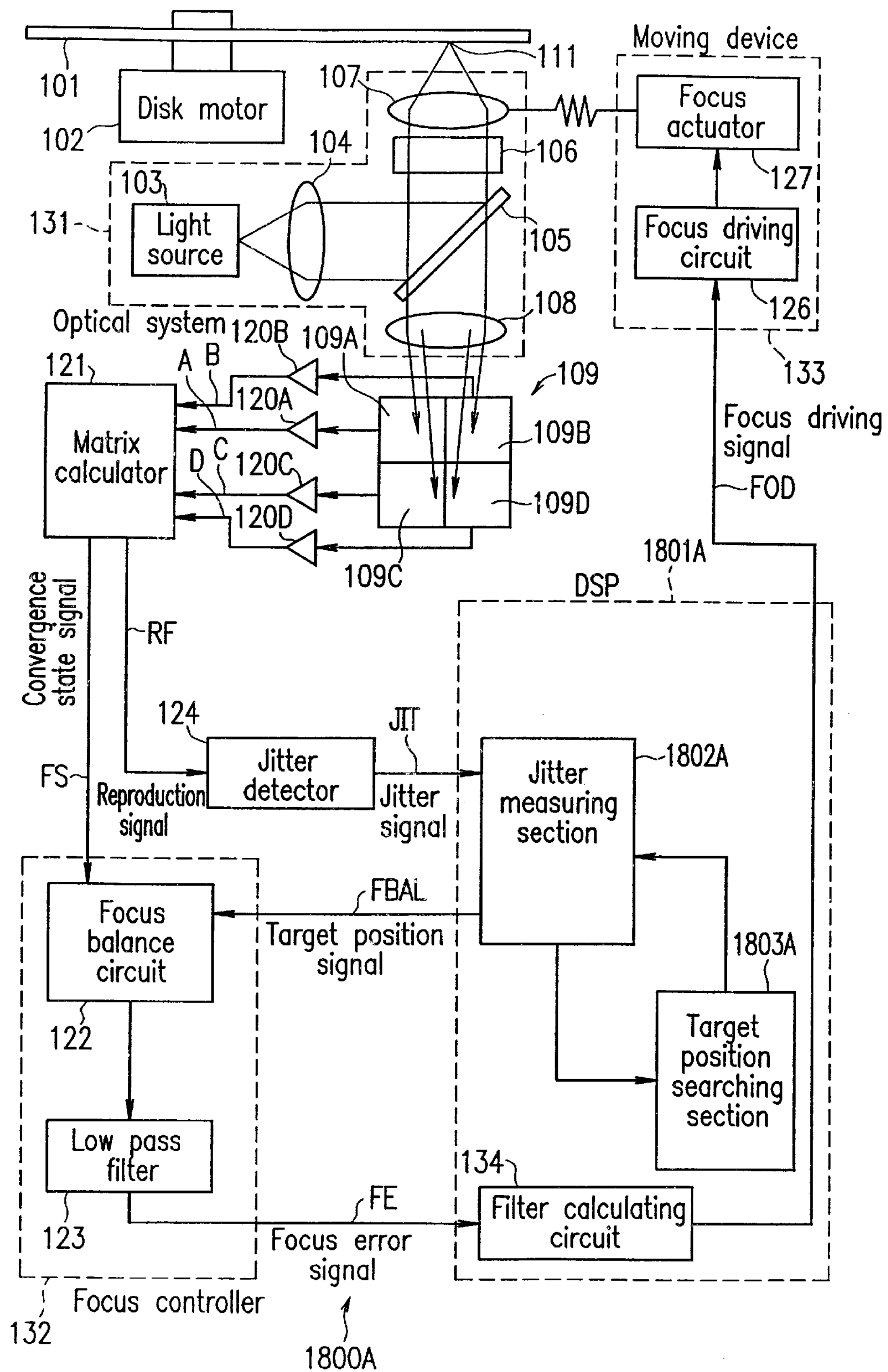
FIG. 19A is a view showing a structure of another conventional optical disk apparatus.
Figure 19B:
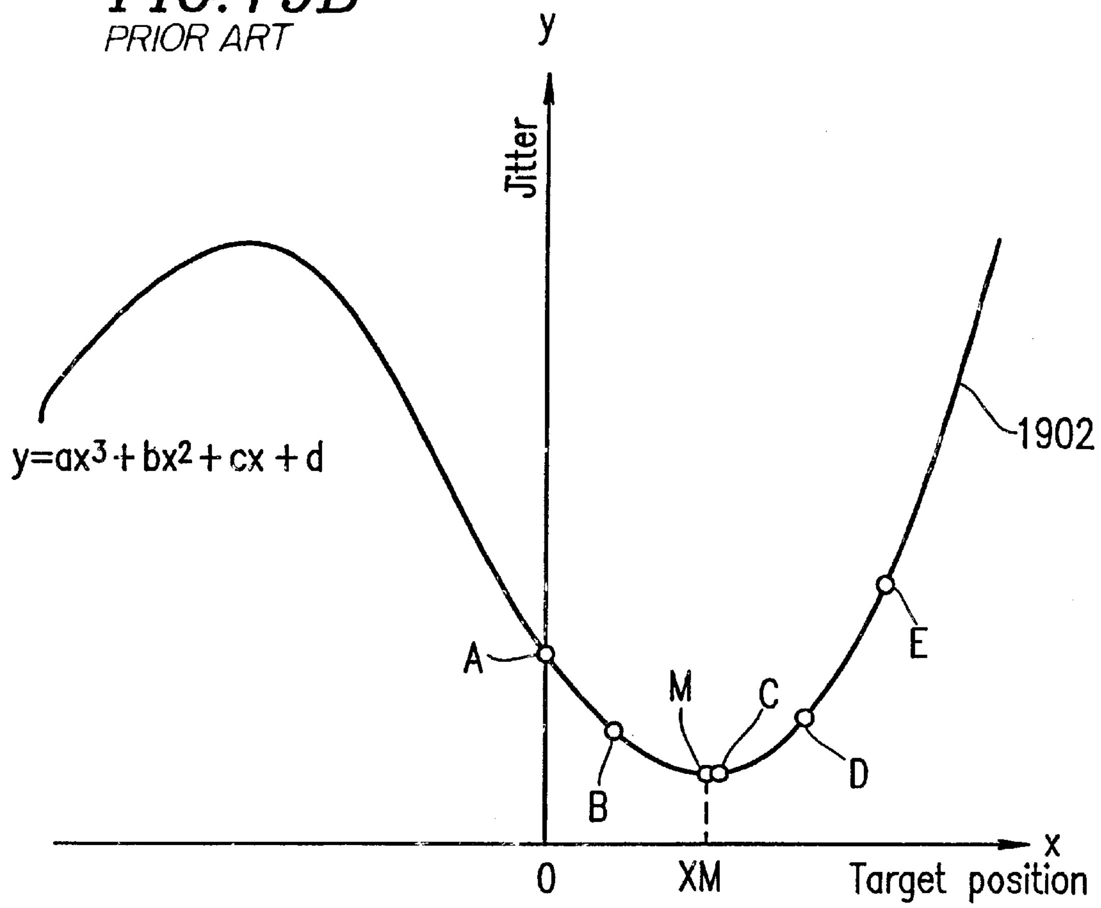
FIG. 19B is a graph illustrating another conventional operation for searching for a target position.
Figure 20A:
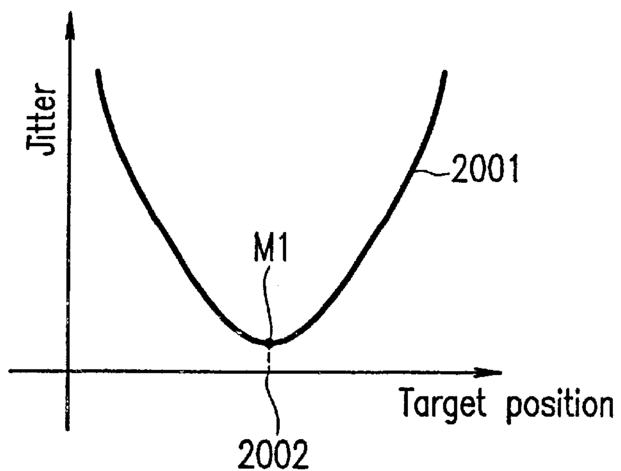
FIGS. 20A through 20C are graphs illustrating fitter characteristics with respect to a target position in the conventional example.
Figure 20B:
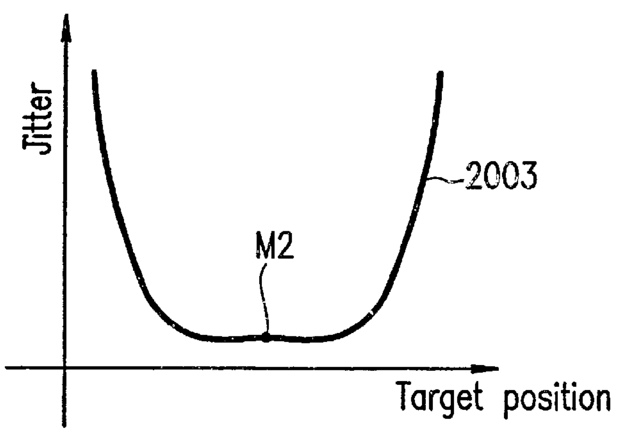
Figure 20C:
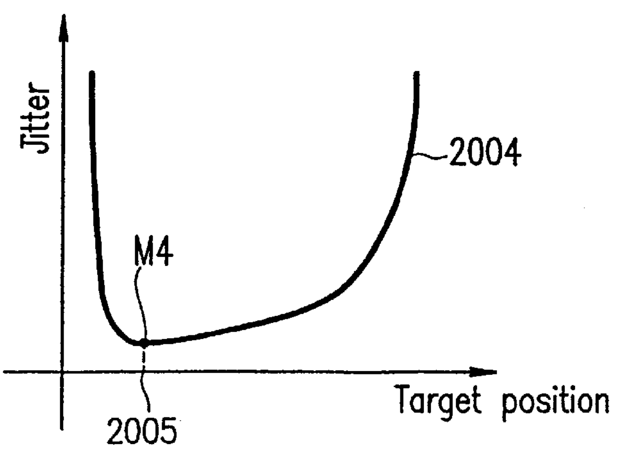
Figure 21A:
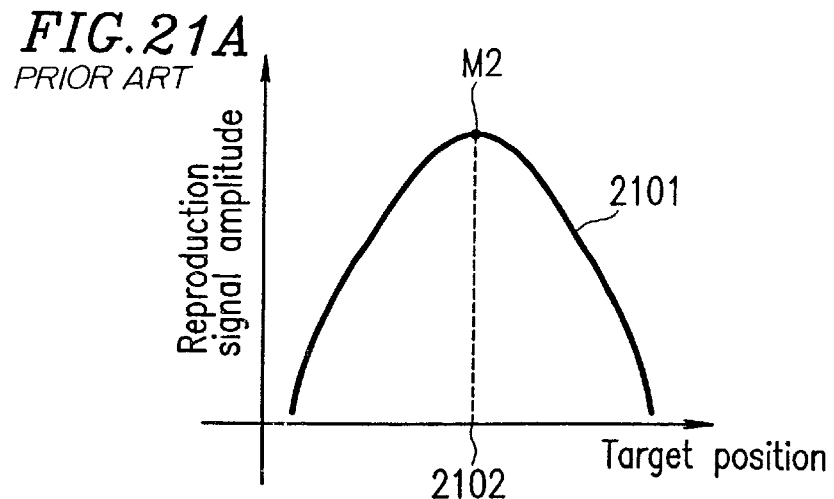
FIGS. 21A through 21C are graphs illustrating reproduction signal amplitude characteristics with respect to a target position in the conventional example.
Figure 21B:
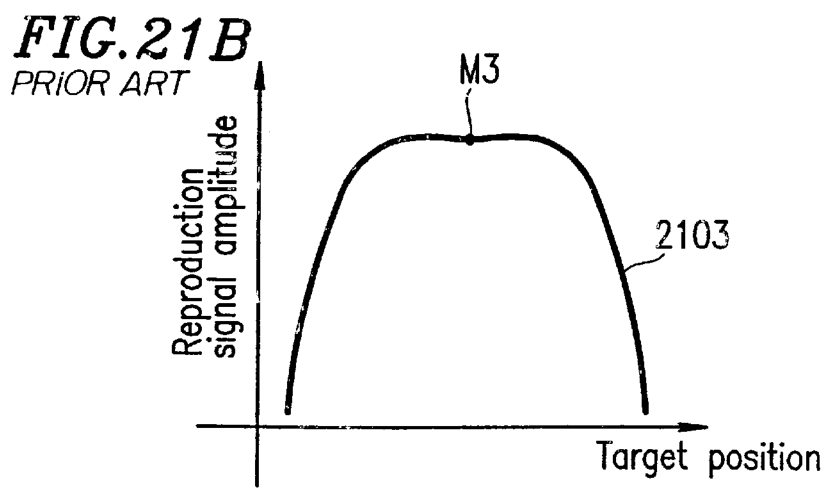
Figure 21C:
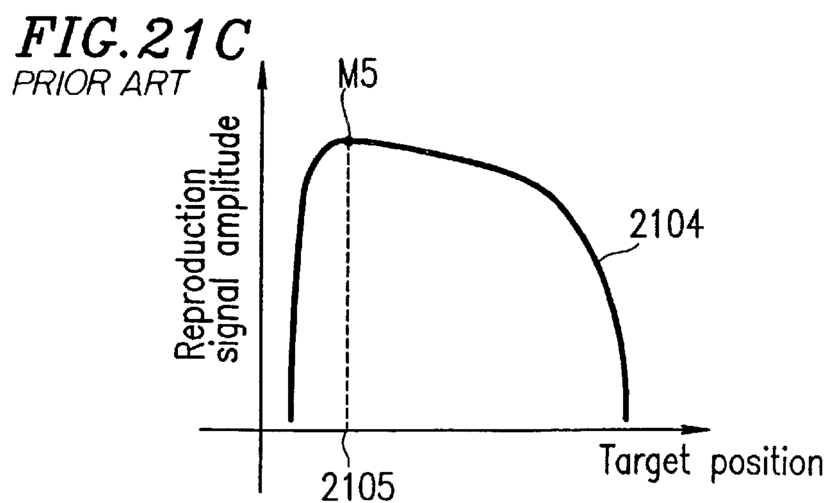
Figure 22:
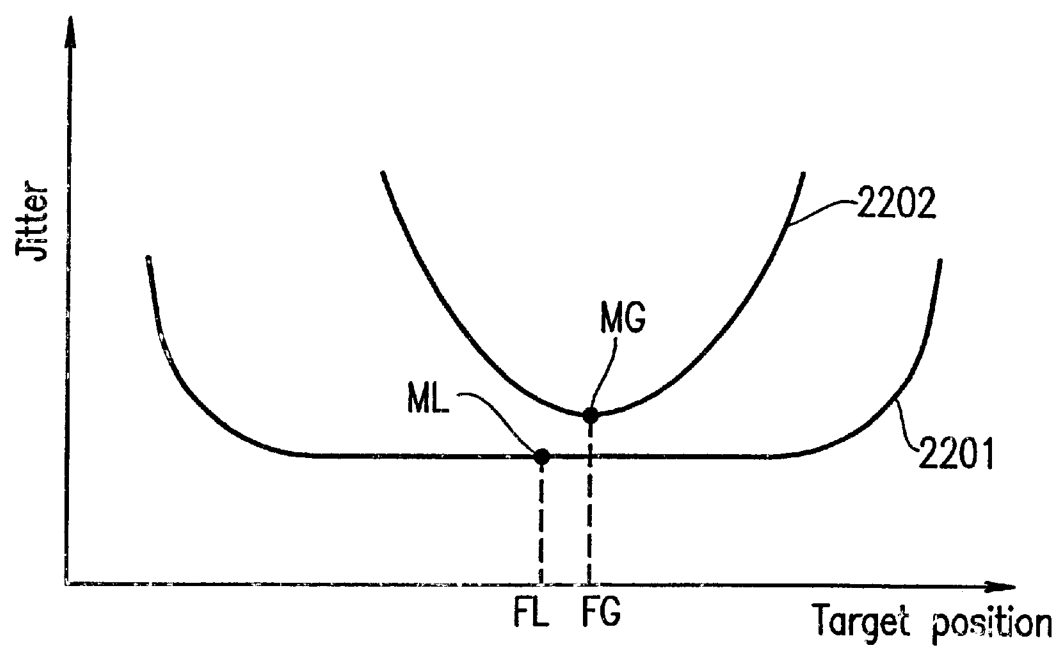
FIG. 22 is a graph illustrating jitter characteristics with respect to target positions in a land track and a groove track of an optical disk in the conventional example.

FIG. 1 is a block diagram of an optical disk apparatus 1000 in a first example according to the present invention. Identical elements previously discussed with respect to FIG. 18A bear identical reference numerals and the descriptions thereof will be omitted.

The optical disk 1000 includes an optical system 131 for directing light to form a beam spot 111 on a disk 101, a disk motor 102 for rotating the disk 101 at a prescribed rotation rate, a light detector 109, preamplifiers 120A through 120D, a matrix calculator 121, a focus controller 132, and a moving device 133. The optical system 131 includes a light source 103, a coupling lens 104, a polarization beam splitter 105, a polarization hologram device 106, a converging lens 107, and a collecting lens 108. The focus controller 132 includes a focus balance circuit 122 and a low pass filter 123. The moving device 133 includes a focus actuator 127 and a focus driving circuit 126. The light detector 109 includes four light detecting sections 109A through 109D.

The optical disk apparatus 1000 further includes a reproduction signal processing section 130, a jitter detector 124 and a DSP 125. The DSP 125 includes a jitter measuring section 1251, a jitter characteristic determining section 1252, a target position searching section 1253, and a filter calculating circuit 134.

A light beam 110 emitted by the light source 104 is collimated by the coupling lens 104, and the collimated light is then reflected by the polarization beam splitter 105, passes through the polarization hologram device 106, and is converged by the converging lens 107 to form the beam spot 111 on an information track of the disk 101. The beam spot 111 reflected by the disk 101 passes through the converging lens 107, the polarization hologram device 106, and the polarization beam splitter 105, and is input to the light detector 109 through the collecting lens 108.

Outputs A through D from the four light detecting sections 109A through 109D are respectively input to preamplifiers 120A through 120D and processed with current-voltage conversion, and then are input to the matrix calculator 121. The matrix calculator 121 outputs a reproduction signal RF by adding all the outputs A through D ((A+D)+(B+C)), outputs a convergence state signal PS by (A+D)−(B+C), and outputs a phase difference tracking error signal (not shown) by comparing the phases of the signals (A+D) and (B+C). The jitter detector 124 generates a jitter signal JIT based on the reproduction signal RF.

The focus control will be described. The focus balance circuit 122 subtracts a target position signal FBAL from the convergence state signal FS or adjusts a gain balance, and thus inputs an focusing error signal FE to the filter calculating circuit 134 through the low pass filter 123. The low pass filter 123 generates a focusing error signal FE by an astigmatic method based on the differential signal DS. The filter calculating circuit 134 executes filter calculations such as, for example, A/D conversion, addition, multiplication, and shift processing to the focusing error signal FE, and outputs a focus driving signal FOD. The focus driving circuit 126 current-amplifies the focus driving signal FOD. The focus actuator 127 drives the converging lens 107 so as to move the beam spot 111 in a direction perpendicular to the surface of the disk 101 based on the current-amplified focus driving signal FODS. Thus, the light beam on the disk 101 is controlled to be a prescribed convergence state.

Measurement of the jitter will be described. The jitter detector 124 generates a jitter signal JIT based on the reproduction signal RF. The jitter measuring section 1251 measures the level of the jitter signal JIT by receiving the jitter signal JIT by a built-in A/D converter (not shown) and performing digital sampling.

Figure 2A:
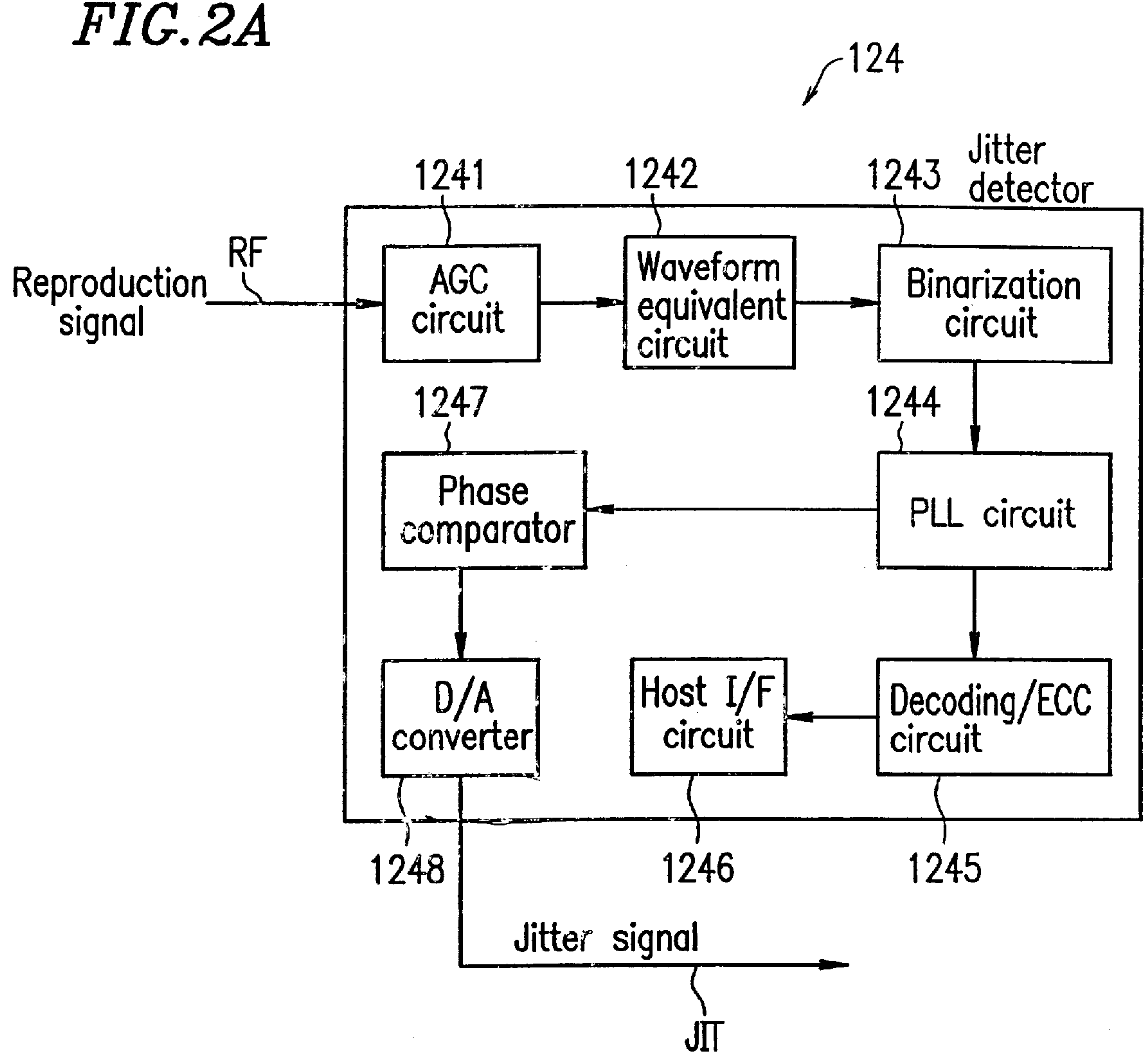
FIG. 2A is a view showing a structure of a jitter detector of the optical disk apparatus in the first example.

FIG. 2A is a block diagram illustrating a structure of the jitter detector 124 in more detail. With reference to FIGS. 1 and 2A, the reproduction signal RF input from the matrix calculator 121 has an amplitude thereof made constant by an AGC circuit 1241. Then, the reproduction signal RF is processed with a waveform equivalent circuit 1242 for emphasizing the frequency of the signal band and cutting the noise component, and then is input to a binarization circuit 1243. The binarized data signal is input to a PLL circuit 1244 to be processed with frequency control and phase control so as to match the synchronization clock for data extraction. Then, the resultant data signal is output to a phase comparator 1247 and a decoding/ECC circuit 1245. The data signal is decoded and error-corrected by the decoding/ECC circuit 1245 and is output to a host as reproduction information through a host I/F circuit 1246.

The phase comparator 1247 outputs phase error data corresponding to the jitter to a D/A converter 1248 based on the data signal. The D/A converter 1245 converts the phase error data into a voltage and outputs the voltage to the jitter measuring section 1251 as the jitter signal JIT. The jitter measuring section 1251 detects the level of the jitter signal JIT. The jitter signal JIT is in proportion to the actual jitter; i.e., the voltage level of the jitter signal JIT decreases when the jitter decreases, and the voltage level of the jitter signal JIT increases when the jitter increases.

With reference to FIG. 2B, a structure of the DSP 125 will be described in detail. The jitter measuring section 1251 includes a memory 136 and a target position varying section 135. The target position searching section 1253 includes a first target position searching section 1254 and a second target position searching section 1255. The first target position searching section 1254 includes a first control section 1256, a function approximation section 1257 and an approximate function determining section 1259. The second target position searching section 1255 includes a second control section 1258.

Figure 3A:
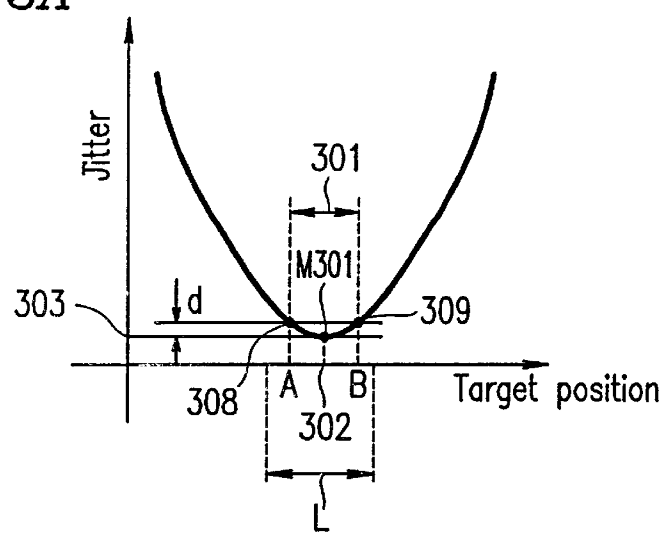
FIGS. 3A through 3C are graphs illustrating jitter characteristics with respect to a target position in the first example.
Figure 3B:
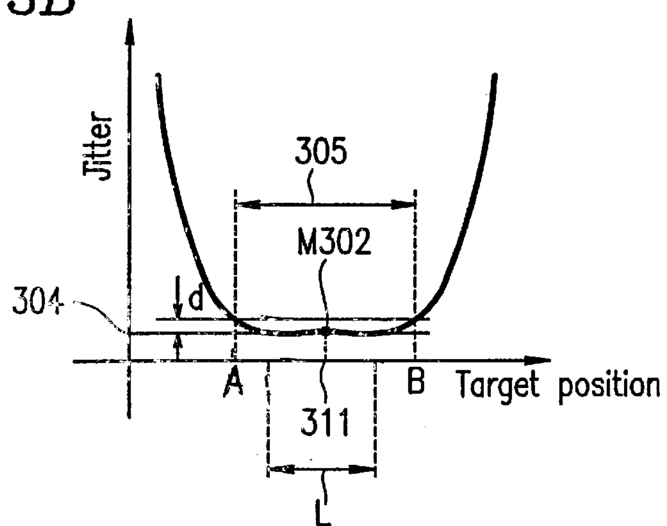
Figure 3C:
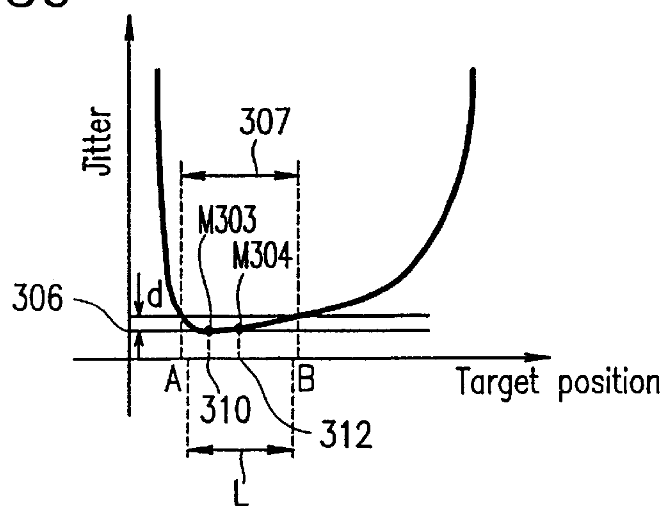
Figure 4:
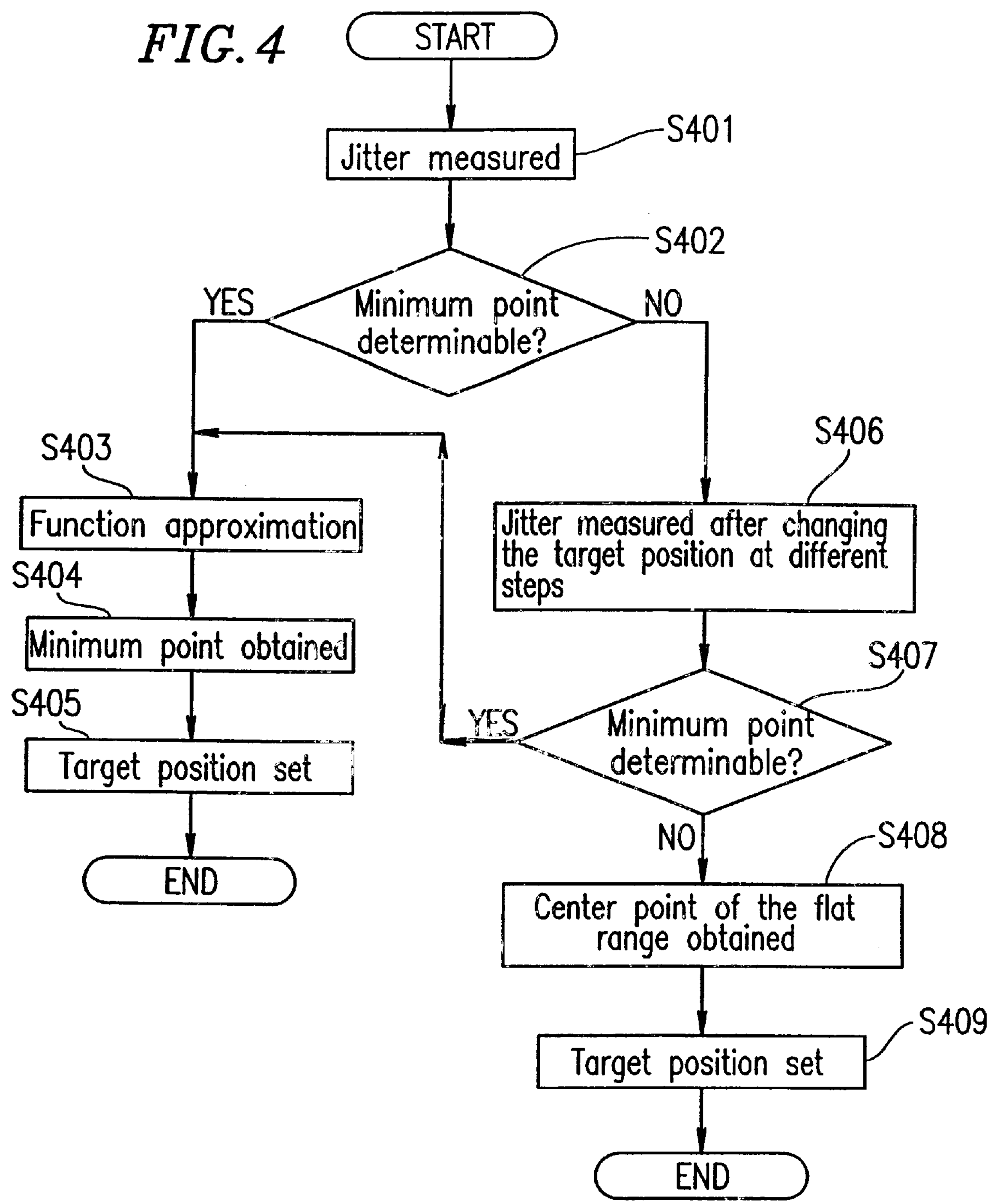
FIG. 4 is a flowchart illustrating an operation for searching for a target position in the first example.

FIGS. 3A through 3C show the relationship between the target position for focus control and the jitter. FIG. 4 is a flowchart for illustrating an operation of the optical disk apparatus 1000.

With reference to FIG. 4 and also FIGS. 1, 2B, 3A through 3C, the operation of the optical disk apparatus 1000 will be described.

In step S401, the target position varying section 135 of the jitter measuring section 1251 outputs the target position signal FBAL to the focus balance circuit 122 to vary the target position for focus control. Specifically, the target position varying section 135 changes the target position by a prescribed distance. The jitter measuring section 1251 measures each jitter signal JIT at this point, and stores each target position and the jitter for each target position in table form in a built-in memory 136.

In step S402, the jitter characteristic determining section 1252 determines, based on the jitter measurement data stored in the memory 136, whether or not the optimum target position can be determined uniquely. Various methods of determination are conceivable. An exemplary method will be described.

In FIG. 3A, a target position range 301, in which the jitter value fulfills the conditions of being a prescribed dispersion d or less from a minimum value 303, is a prescribed value L or less. In this case, the jitter characteristic is determined to be sharp, by which the optimum target position 302 at which the jitter is minimum can be uniquely determined. In FIGS. 3B and 3C, target position ranges 305 and 307, in which the jitter value fulfills the conditions of being a prescribed dispersion d or less from minimum values 304 and 306 respectively, exceeds the prescribed value L. In this cases the jitter characteristic is determined to exhibit a flat bottomed curve, by which the optimum target position cannot be uniquely determined.

When the optimum target position can be uniquely determined due to the jitter characteristic shown in FIG. 3A ("YES" in step S402), the first target position searching section 1254 detects a center point M301 between points 308 and 309 utilizing the jitter characteristic of the inverted parabolic curve (second-order function) to obtain the optimum target position 302, which is to be found. In order to improve the precision, the function approximation section 1257 performs function approximation of the relationship of the jitter Y relative to the target position X (step S403). The first control section 1256 moves the target position in a direction in which the jitter is decreased to detect the minimum point of the approximate function (step S404). Thus, the optimum target position 302 can be obtained (step S405).

When the relationship between the target position and the jitter is flat in the vicinity of minimum point M302 as shown in FIG. 3B, it is difficult to obtain the optimum target position with high precision even by using the above-mentioned method. When the precision is poor, an end of the flat portion may be undesirably set as the optimum target position. When minimum point M303 is in the vicinity of the end of the flat portion as shown in FIG. 3C, an optimum target position 310 is near the end of the flat portion (near point A). In this case, even when the target position is slightly dispersed, the jitter is drastically increased. Thus, focus control is destabilized. When the jitter characteristics shown in FIGS. 3B and 3C are obtained, the jitter characteristic determining section 1252 determines that the jitter characteristic exhibits a flat bottomed curve, by which the optimum target position cannot be determined ("No" in step S402).

When it is determined that the minimum point cannot be determined, the jitter measuring section 1251 measures the jitter signal JIT in the vicinity of minimum point M302 or M303 with the target positions being changed at narrower steps by the target position varying section 135 (section S406). Then, the jitter characteristic determining section 1252 again determines whether or not the optimum target position can be determined in the same method as used in step S402 (step S407).

When it is determined that the optimum target position cannot be determined due to the flat shape of the jitter characteristic ("No" in step S407), the second target position searching section 1255 extracts the target position range 305 or 301 in which the jitter does not drastically change, and obtains a target position 311 or 312 corresponding to a center point M302 or M304 in the range 305 or 307 as the optimum target position (step S408 and S409). Thus, the positive and negative defocus margins can be equal to each other, which realizes stable focus control.

The first target position searching section 1254 desirably searches for the optimum target position in the following manner.

Figure 5A:
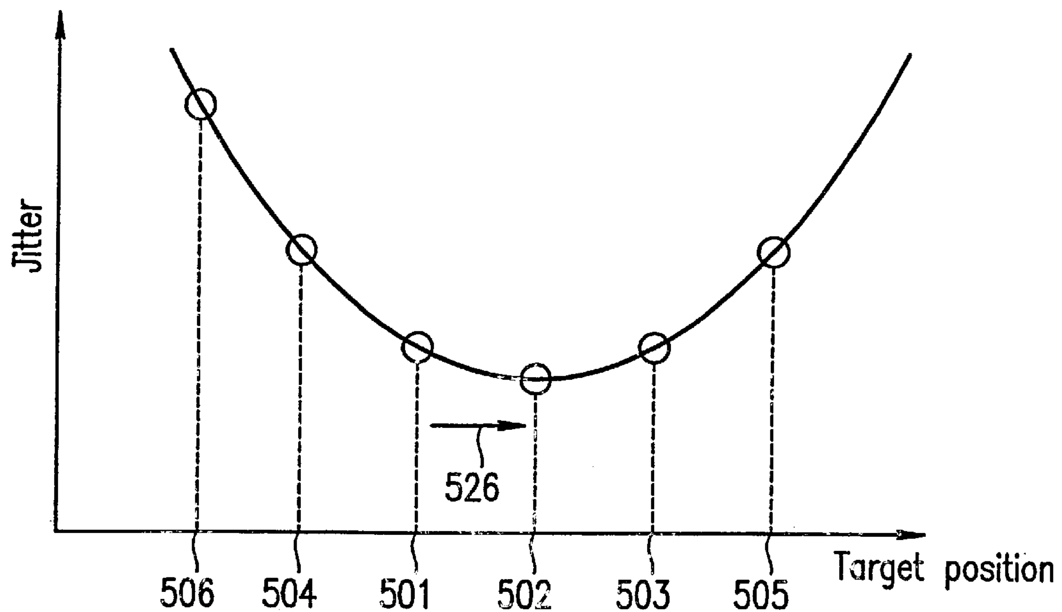
FIGS. 5A and 5B are graphs illustrating operations for searching for a target position in the first example.

As shown in FIG. 5A, the first target position searching section 1254 obtains a first jitter value at a first target position 501 and obtains a second jitter value at a second target position 502. The first control section 1256 compares the first jitter value and the second jitter value. Since the second jitter value is smaller than the first jitter value, the first control section 1256 sets a third target position 503 in a direction 526 in which the jitter value is presumed to be further decreased, and obtains a third jitter value at the third target position 503. The first control section compares the second jitter value and the third jitter value. Since the third jitter value is not smaller than the second jitter value, the first control section 1256 sets a fourth target position 504 in the opposite direction, and obtains a fourth jitter value at the fourth target position 504. In a similar manner, the first control section 1256 sets a fifth and subsequent target positions 505, 506, etc. The first control section 1256 moves to an unmeasured point at which the litter value is presumed to be smaller than that of the present point, and terminates the operation when the number of samples reaches a prescribed number. In this method, target positions which are present in positive and negative directions with respect to the position at which the jitter is substantially minimum can be obtained quickly and accurately. The optimum target position to obtained by performing regression analysis, function approximation and the like based on the relationship between the target positions and the jitter values.

The second target position searching section 1255 desirably searches for the optimum target position in the following manner.

Figure 5B:
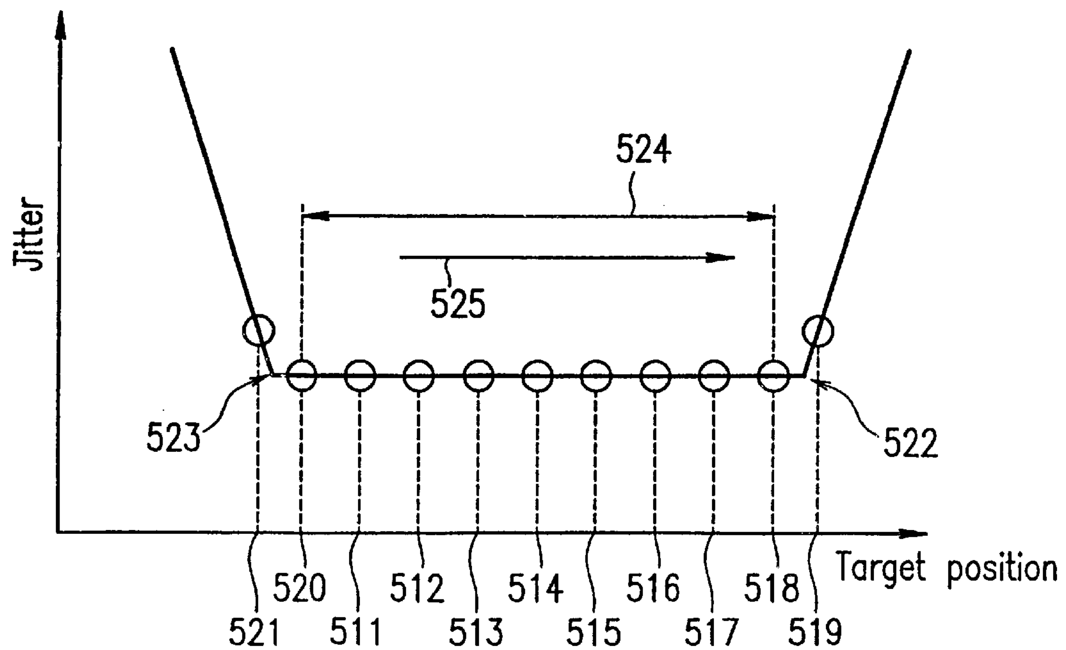

As shown in FIG. 5B, when the jitter characteristic determining section 1252 determines that the jitter characteristic exhibits a flat bottomed curve, the second target position searching section 1255 moves in a prescribed direction at narrower steps and obtains a flat target position range in which the jitter changes little.

The second target position searching section 1255 obtains a first jitter value at a first target position 511 and obtains a second jitter value at a second target position 512. The second control section 1255 moves the target position in a prescribed direction 525. Up to the target position 518 where the jitter value is a prescribed dispersion value or less, the target position is moved and the obtained jitter is evaluated in succession. When the jitter exceeds the prescribed dispersion value at a target position 519, the second control section 1258 determines that the target position has passed a shoulder portion 522 of the flat bottomed curve, and stops moving the target position in the direction 525 and moves the target position in the opposite direction. Similarly, when the jitter value exceeds the prescribed value at a target position 521, the second control section 1258 determines that the target position has passed a shoulder portion 523 of the flat bottomed curve. The second target position searching section 1255 obtains a flat target position range 524 and sets the center of the flat target position range 524 as the optimum target position.

When the jitter characteristic exhibits a flat bottomed curve, the jitter drastically increases outside the shoulders 522 and 523. When the target position is moved, the focus control is destabilized. Accordingly, when the jitter characteristic is determined to exhibit a flat bottomed curve, the range of moving the target position for searching for the optimum target position is preferably restricted. In the case where the titter characteristic is flat in a range equal to or greater than the prescribed range to guarantee a sufficient margin, the center point of the flat range is calculated and set as the optimum target position.

When the jitter characteristic exhibits an inverted parabolic curve and the jitter characteristic approximated with a function by the function approximation section 1257 is significantly away from the ideal jitter characteristic, the optimum target position which is obtained by function approximation may be significantly different from the target position at which the jitter is actually minimum. In this case, the approximate function measuring section 1259 obtains the approximation degree of the jitter characteristic obtained by the function approximation section 1257 with respect to the ideal jitter characteristic. When the approximation degree is equal to or greater than a prescribed value, the target position at which the jitter is minimum based on the actual measurement data obtained by the jitter measuring section 1251 is set as the optimum target position.

EXAMPLE 2

Figure 6A:
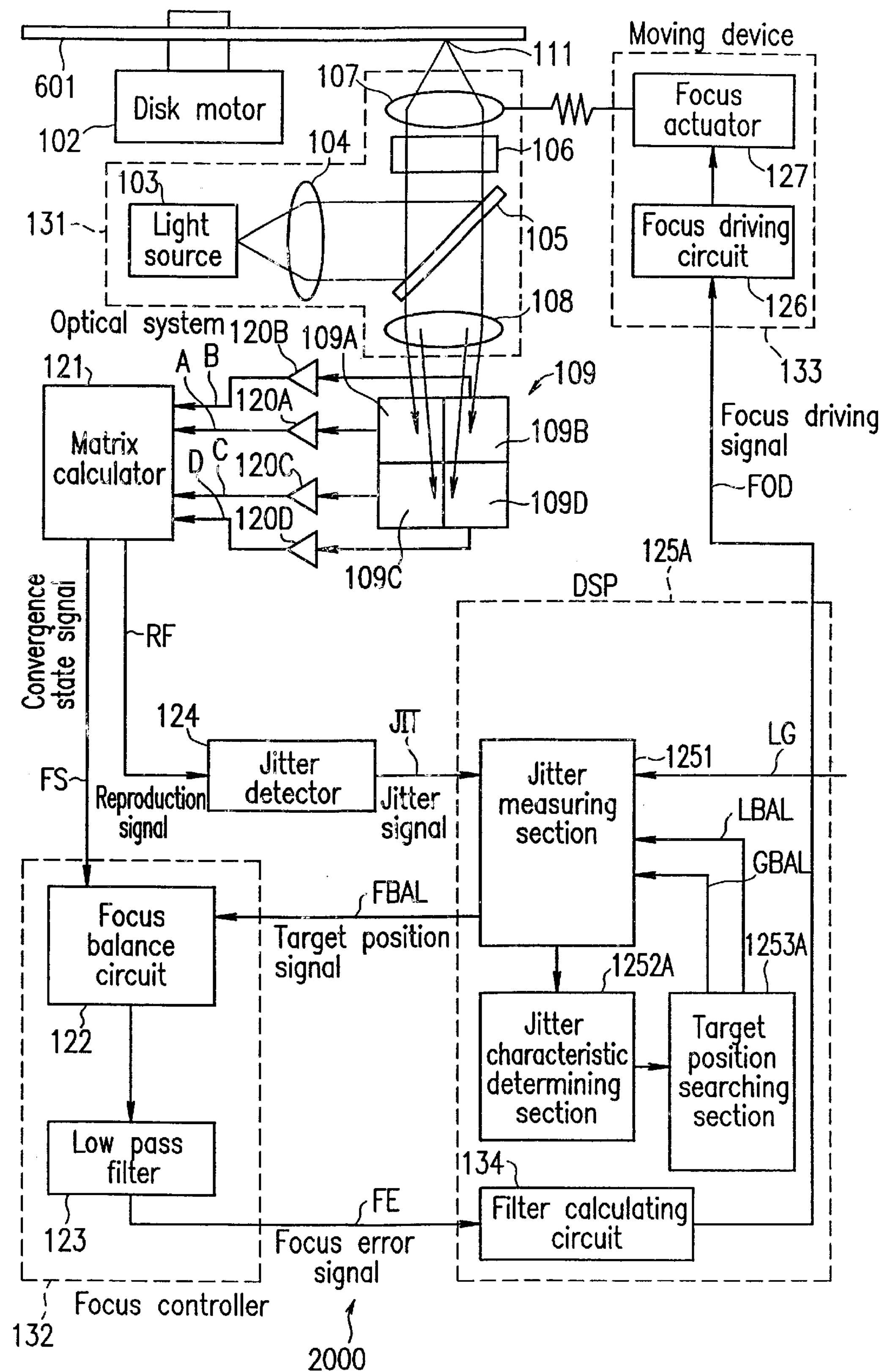
FIG. 6A is a view showing a structure of an optical disk apparatus in a second example according to the present invention.

FIG. 6A is a block diagram of an optical disk apparatus 2000 in a second example according to the present invention. Identical elements previously discussed with respect to FIG. 1 bear identical reference numerals and the descriptions thereof will be omitted.

The optical disk apparatus 2000 is different from the optical disk apparatus 1000 in the first example in that the optical disk apparatus 2000 uses a disk 601 having convex and concave guide tracks described below with reference to FIG. 6C and includes a DSP 125A instead of the DSP 125. The DSP 125A includes a jitter measuring section 1251, a jitter characteristic determining section 1252A, a target position searching section 1253A, and a filter calculating section 134.

FIG. 6D is a block diagram illustrating the DSP 125A in detail. The DSP 125A in different from the DSP 125 shown in FIG. 2B in the first example in that the jitter characteristic determining section 1252A includes a concave portion jitter characteristic determining section 1252G and a convex portion jitter characteristic determining section 1252L.

Figure 6C:
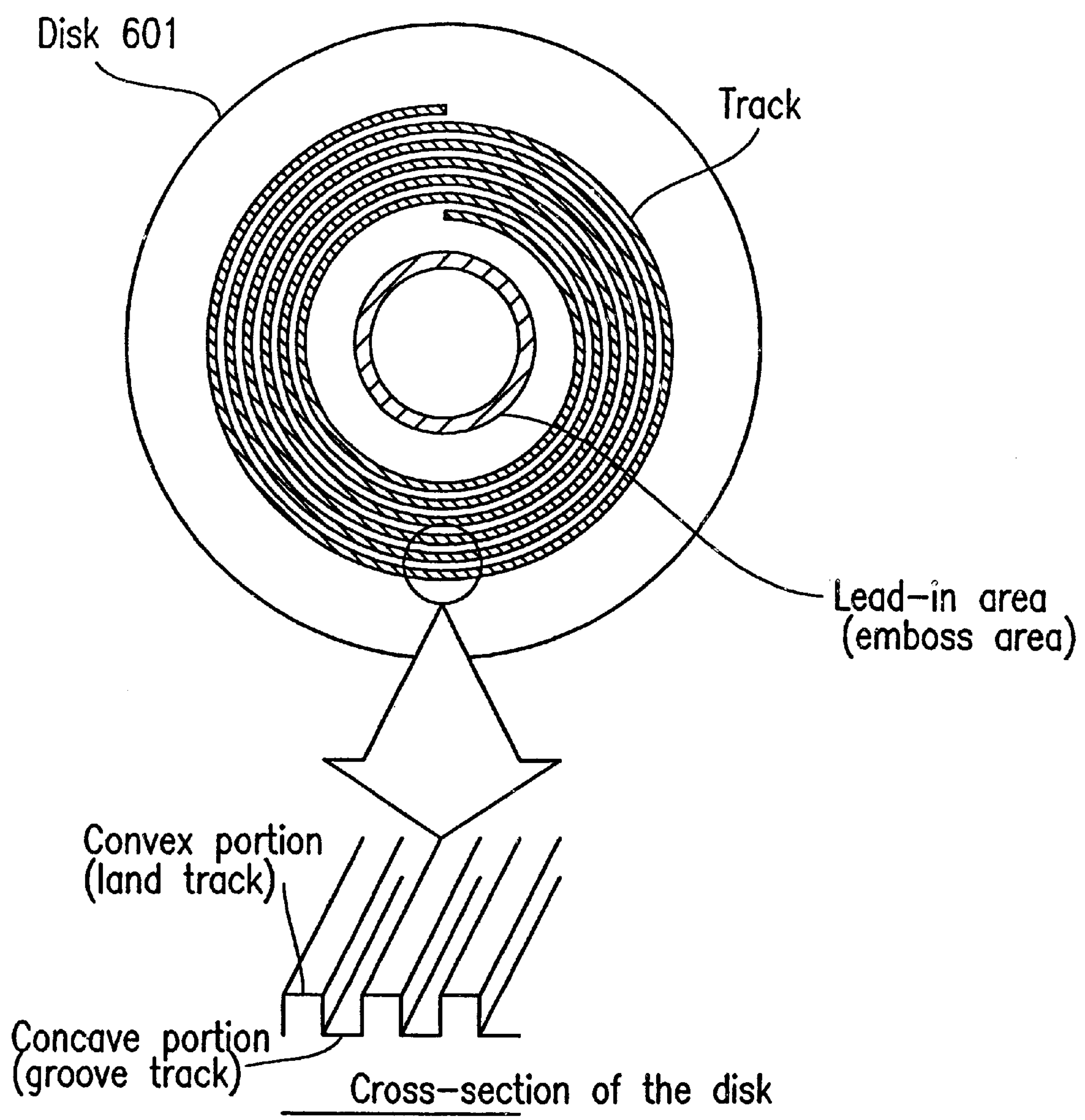
FIG. 6C is a schematic view of a disk used in the second example.

In the second example, the disk 601 has the convex and concave portions as shown in FIG. 6C. The convex portion is referred to as the land track and the concave portion is referred to as the groove track. The disk 601 has an embossed lead-in area having information pits formed therein. The lead-in area has information required for reproduction and recording, for example, capacity and the linear velocity of the disk 601 stored therein.

Figure 7A:
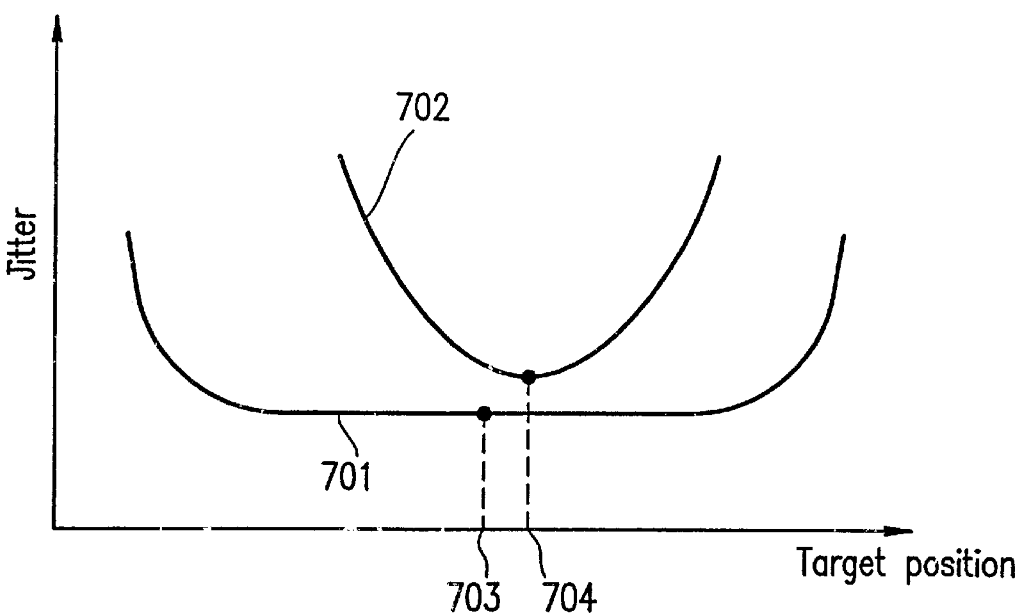
FIGS. 7A and 7B are graphs illustrating jitter characteristics of a convex portion and a concave portion of the disk with respect to respective target positions.
Figure 7B:
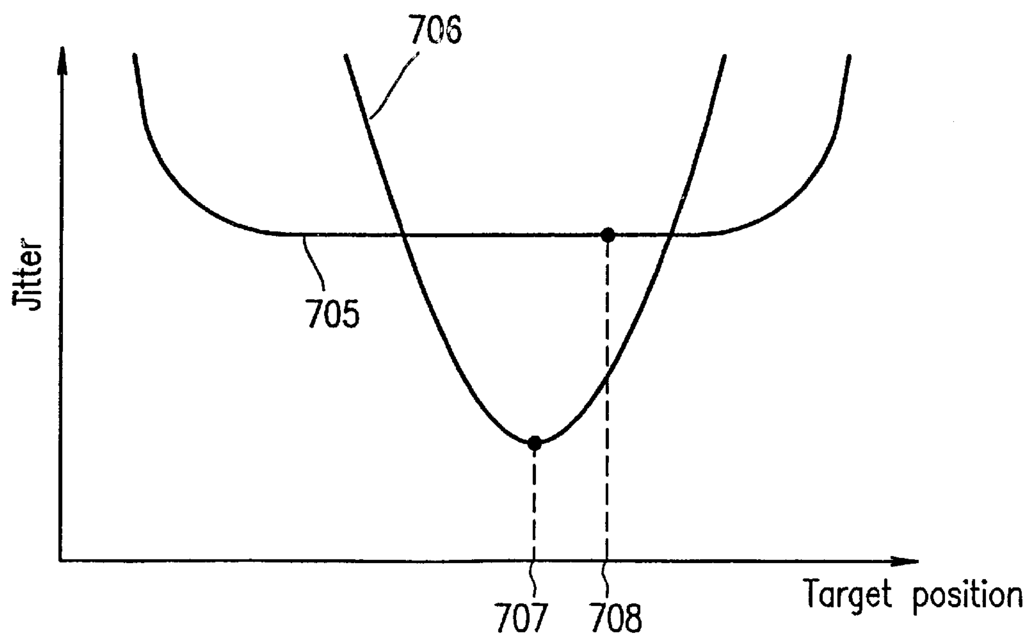

In FIG. 7A, an optimum target position 703 of a jitter characteristic 701 of the land track is different from an optimum target position 704 of a jitter characteristic 702 of the groove track. In FIG. 7B, an optimum target position 708 of a jitter characteristic 705 of the land track is different from an optimum target position 707 of a jitter characteristic 706 of the groove track. Such a difference occurs due to the profile of the light spot on the disk 601 or the relationship between the optical aberration and the shape of the groove. As a result, the jitter characteristic of one of the land track or groove track may exhibit an inverted parabolic curve and the jitter characteristic of the other track may exhibit a flat bottomed curve. In FIG. 7A, the jitter at the optimum target position 703 of the land track is smaller than the jitter at the optimum target position 704 of the groove track. In FIG. 7B, the jitter at the optimum target position 707 of the groove track is smaller than the jitter at the optimum target position 708 of the land track.

With reference to FIGS. 6A and 6B, a land/groove switch signal LG from a formatter circuit (not shown) is input to the jitter measuring section 1251, and the target position varying section 135 changes the target position separately for the groove track and the land track. Specifically, the jitter measuring section 1251 measures the jitter characteristic separately for the groove track and the land track. The concave portion jitter characteristic determining section 1252G measures the jitter of the groove track, and the convex portion jitter characteristic determining section 1252L measures the jitter of the land track.

With reference to FIGS. 6A, 6B, 8A and 8B, an operation of the optical disk apparatus 2000 will be When the disk 601 (FIG. 6C) is inserted into the optical disk apparatus 2000, the DSP 125A rotates the disk motor 102 to cause the light source 103 to emit light. Then, the DSP 125A sends a focus driving signal FOD to the focus actuator 127 to cause the converging lens 107 to be closer to or farther from the disk 601. At this point, the focus actuator 127 executes focus control based on a convergence state signal FS output by the matrix calculator 121 and executes tracking control using a tracking actuator (not shown). The DSP 125A searches for the position of a prescribed track and waits for a command at the position of the prescribed track. Upon a command from a host computer, information in a desired track is reproduced or information is recorded on a desired track.

During such start-up processing, the DSP 125A searches for an area having information stored already therein (for example, a DMA (disk management area) storing exchange area information) and thus adjusts the target position. The jitter measuring section 1251 searches for a leading position of the land track of the DMA and measures jitter signals JIT from the leading position to a terminating position of the land track. The average value of the jitter signals JIT is stored in the memory 136. since the optical disk 601 has spiral tracks, the light beam goes into the groove track adjacent to the land track. The jitter measuring section 1251 measures jitter signals JIT from a leading position to a terminating position of the groove track. The average value of the jitter signals JIT is stored in the memory 136. Then, the target position varying section 135 changes the target position signal FBAL output to the focus balance circuit 122 to change the target position by one step. The jitter measuring section 1251 returns to the leading position of the land track of the DMA and measures the jitter signal in the land and groove tracks at the target position after the change by one step. The obtained value is stored in the memory 136.

In this manner, the jitter of the signals recorded in the land and groove tracks are measured while changing target position by a prescribed step, until the target position is changed a prescribed number of times (for example, 5 times) (step S801). The concave portion jitter characteristic determining section 1252G and the convex portion jitter characteristic determining section 1252L respectively determine the jitter characteristics with respect to the target positions of the groove track and the land track (step S802). Specifically, it is determined whether the jitter characteristic (which is the relationship between the target position and the jitter signal JIT) exhibits a flat bottomed curve which is flat in the vicinity of a minimum point 802 like a jitter characteristic 801 in FIG. 8A or a sharp and inverted parabolic curve as like jitter characteristic 803 and thus allows a minimum point 804 to be easily determined.

The determination can be done in a manner similar to that in the first example.

Figure 8A:
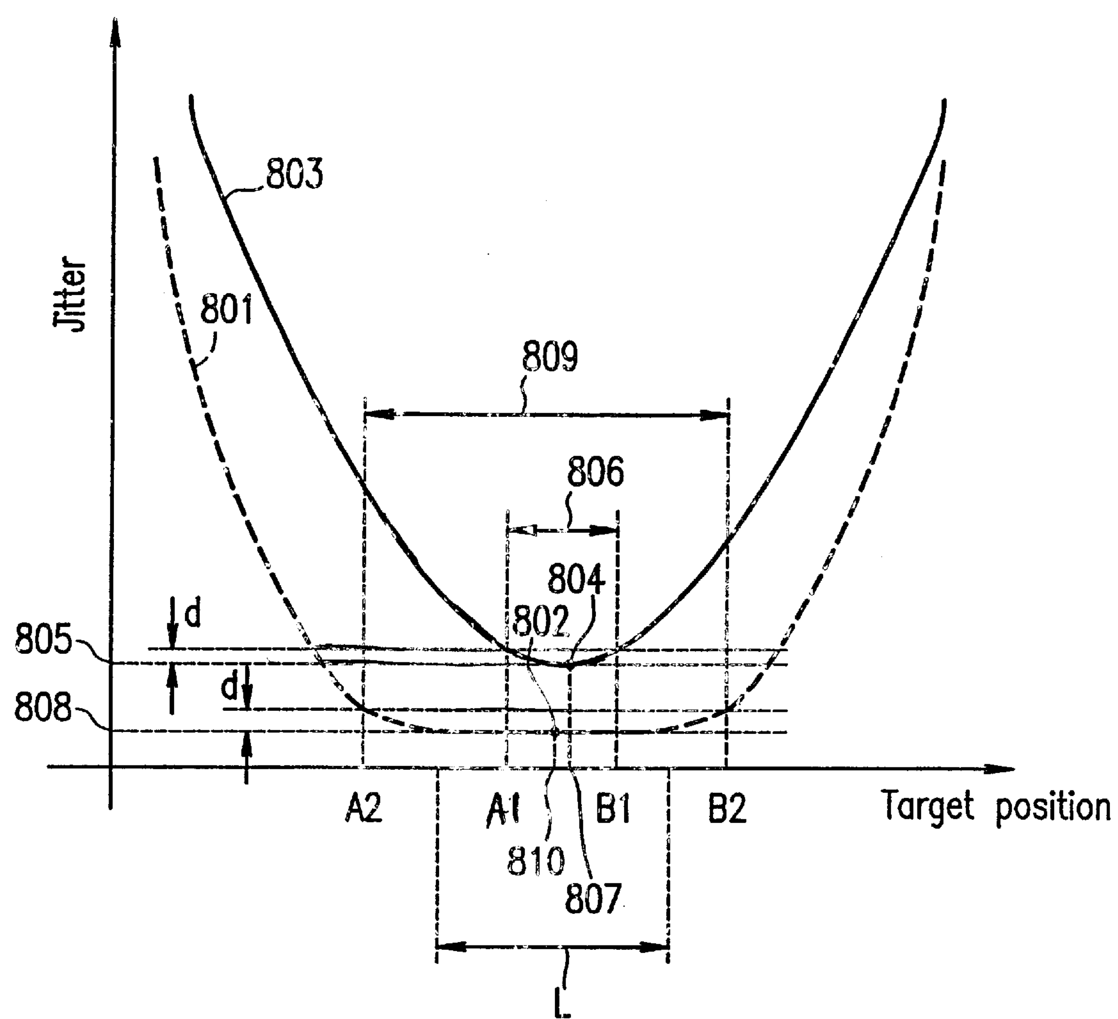
FIG. 8A is a graph illustrating an operation for searching for a target position in the second example.

The jitter measuring section 1251 changes the target position by a prescribed step. In FIG. 8A, a target position range 806, of the jitter characteristic 803, in which the jitter value fulfills the conditions of being a prescribed dispersion d or less from a minimum value 805, is a prescribed value L or less. In this case, the jitter characteristic is determined to be sharp, by which an optimum target position 807 at which the jitter is minimum can be uniquely determined. A target position range 809, of the jitter characteristic 801, in which the jitter value fulfills the conditions of being a prescribed dispersion d or less from minimum value 808, exceeds the prescribed value L. In this case, the jitter characteristic is determined to exhibit a flat bottomed curve, by which an optimum target position 810 at which the jitter is minimum cannot be uniquely determined.

When the jitter characteristics of both the land track and the groove track are determined to be sharp and allow the optimum target position to be easily determined, the first target position searching section 1254 performs function approximation of the characteristic of each of the tracks similarly to that in the first example (step S803), and obtains the minimum points of the respective functions. Thus, a convex portion optimum target position LBAL and a concave portion optimum target position GBAL are set (steps S804 and S805).

When either the jitter characteristic of the land track or the jitter characteristic of the groove track is determined to be sharp and allow the minimum point to be easily determined and the other jitter characteristic is determined to be flat, the following operation is performed. The target position varying section 135 changes the target position at narrower steps in the track having the flat jitter characteristics. The jitter measuring section 1251 measures the jitter relative to the target position again (step S806), and the jitter characteristic determining section 1252A determines the jitter characteristic again (step S807). When the jitter characteristic which was determined to be flat the previous time is determined to be sharp and allow the minimum point to be easily determined ("YES" in step S807), the function approximation-section 1257 performs function approximation of the jitter characteristics in the land and groove tracks (step S803). The first target position searching section 1254 obtains the minimum points of the respective functions to set the optimum target positions LBAL and GBAL (step S804 and S805). When the jitter characteristic is still determined to be flat and not allow the minimum point to be determined ("No" in step S807), the second target position searching section 1255 obtains a target position range in which the jitter changes little (as in steps S408 and S409 in FIG. 4) and sets the center point in the range as the optimum target position LBAL or GBAL (step S808).

When the jitter characteristics of both the land track and the groove track are determined to exhibit a flat bottomed curve, the second target position searching section 1255 obtains target position ranges, in which the jitter changes little, in the land track and the groove track, and sets the center points in the ranges as the convex portion optimum target position LBAL and the concave portion optimum target position GBAL (step S809).

In the second example, the jitter characteristic is determined separately in the land track and the groove track to find and set the optimum target positions for both of the tracks.

EXAMPLE 3

Figure 9A:
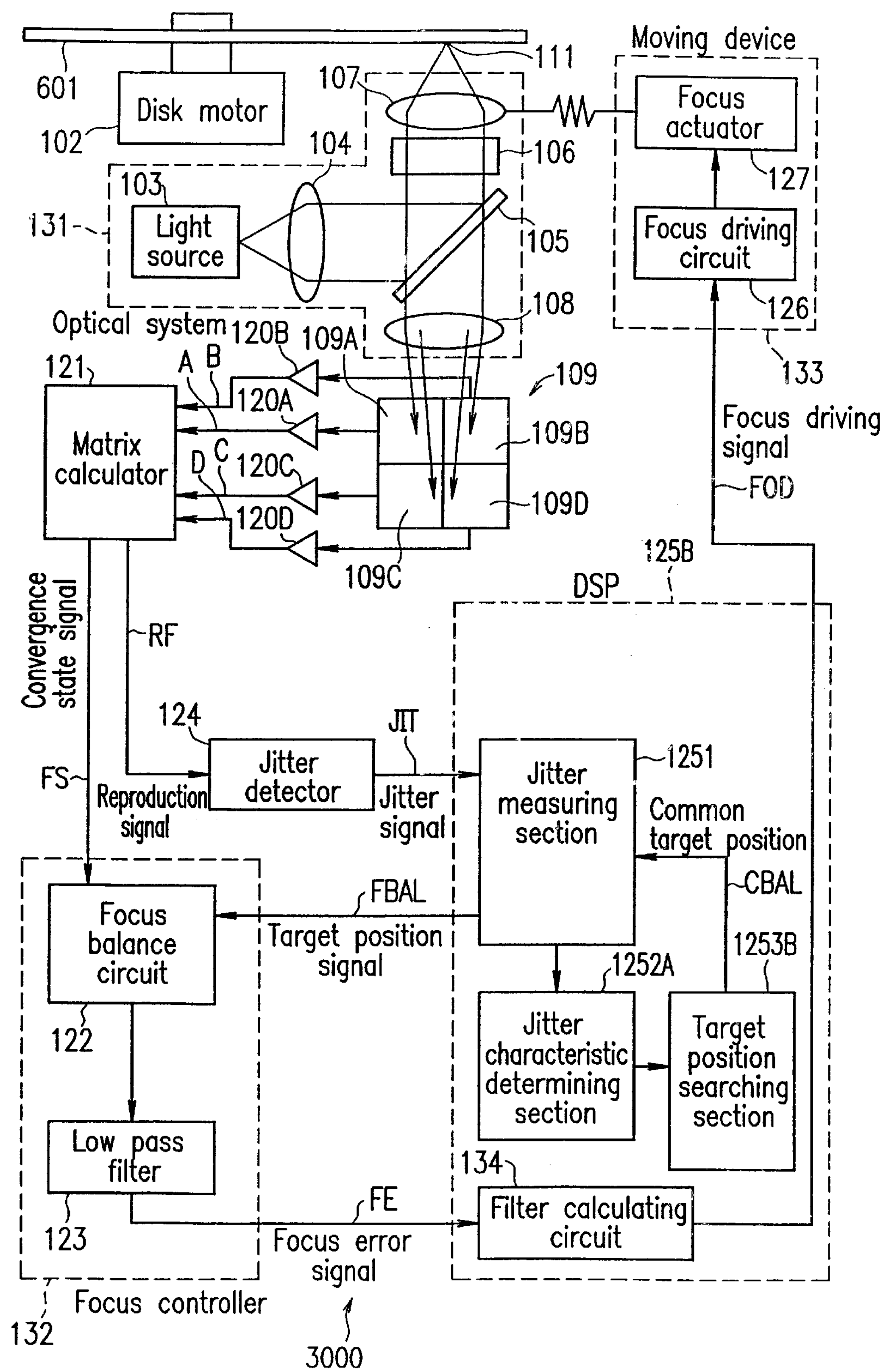
FIG. 9A is a view showing a structure of an optical disk apparatus in a third example according to the present invention.

FIG. 9A is a block diagram of an optical disk apparatus 3000 in a third example according to the present invention. Identical elements previously discussed with respect to FIG. 6A bear identical reference numerals and the descriptions thereof will be omitted.

The optical disk apparatus 3000 is different from the optical disk apparatus 2000 in the second example in that the optical disk apparatus 3000 includes a DSP 125B.

FIG. 9B is a block diagram illustrating the DSP 125B in detail. The DSP 125B is different from the DSP 125A shown in FIG. 9B in the second example in that the DSP 125B includes a target position searching section 1253B, The target position searching section 1253B includes a common target position calculating section 1253E, a concave portion target position searching section 1253C. and a convex portion target position searching section 1253D. The concave portion target position searching section 1253C and a convex portion target position searching section 1253D each include a first position target searching section 1254 and a second position target searching section 1255.

When the optimum target position is significantly different between the land track and the groove track, undulated jitter response occurs when the land track is switched to the groove track as shown in FIGS. 23A through 23D. The optical disk apparatus 3000 in the third example solves the problem that information in the sector immediately after switching cannot be reproduced.

When the jitter characteristics of both the land track and the groove track are determined to be sharp and allow the optimum target position to be easily determined by the convex portion jitter characteristic determining section 1252L and the concave portion jitter characteristic determining section 1252G, the following operation is performed. The convex portion optimum target position searching section 1253D and the concave portion optimum target position searching section 1253C perform function approximation of the jitter characteristics of the respective tracks to obtain the points of inflection of the respective functions. Then, the convex portion target position searching section 1253D and the concave portion target position searching section 1253C respectively obtain the convex portion optimum target position LBAL and the concave portion optimum target position GBAL based on the respective points of inflection. The common target position calculating section 1253B calculates a center point between the convex portion target position LBAL and the concave portion target position GBAL, and outputs a common target position CBAL as the optimum target position which is common to the land and groove tracks.

When the concave portion jitter characteristic determining section 1252G determines that the jitter characteristic of the groove track is sharp and the convex portion jitter characteristic determining section 1252L determines that the jitter characteristic of the land track exhibits a flat bottomed curve, the following operation is performed. The target position varying section 135 changes the target position in the land track at narrower steps, and the jitter measuring section 1251 measures again the jitter with respect to the target position. The convex portion jitter characteristic determining section 1252L determines again whether the jitter characteristic is sharp or not. When the convex portion jitter characteristic determining section 1252L determines that the jitter characteristic is sharp and allows the optimum target position to be easily determined, the convex portion target position searching section 1253D and the concave portion target position searching section 1253C perform function approximation of the jitter characteristics of the respective tracks, obtains the points of inflection of the respective functions, and then outputs the convex portion optimum target position LBAL and the concave portion optimum target position GBAL. The common target position calculating section 1253E sets a center point between the positions LBAL and GBAL as the optimum target position which is common to the land and groove tracks.

When the convex portion jitter characteristic determining section 1252L still determines that the jitter characteristic is flat, the second target position searching section 1255 of the convex portion target position searching section 1253D obtains a target position range in which the jitter changes little and sets a center point of the range as the convex portion optimum target position LBAL. The common target position calculating section 1253E sets a center point between the positions LBAL and GBAL as the optimum target position which is common to the land and groove tracks.

When the jitter characteristics of both the land track and the groove track are determined to exhibit a flat bottomed curve, the second target position searching sections 1255 of both the convex portion target position searching section 1253D and the concave portion target position searching section 1253E respectively obtain target position ranges in which the jitter changes little and set center points of the ranges as the optimum target positions LBAL and GBAL. The common target position calculating section 1253E sets a center point between the positions LBAL and GBAL as the optimum target position which is common to the land and groove tracks.

In the third example, a center point between the optimum target position of the land track and the optimum target position of the groove track is set as the common optimum target position CBAL. When one of the land and groove tracks has a jitter characteristic significantly lower than that of the other or a margin significantly smaller than that of the other, the optimum target position CBAL can be set in a different manner.

For example, when the difference between the jitter values of the land and groove tracks measured for searching for the optimum target position is equal to or greater than a prescribed value, or when the difference between the jitter values of target positions of the land and groove tracks which are distanced from the optimum target positions by a prescribed distance is equal to or greater than a prescribed value, the optimum target position of the land or groove track having the poorer jitter characteristic is sets the common optimum target position. For example, when the jitter of the optimum target position of the land track is 12% and that of the groove track is 8%, the difference exceeds a prescribed value of 2%. Accordingly, the optimum target position of the land track having the poorer jitter characteristic is set as the common optimum target position CBAL. In an another example, when the jitter of the target position of the land track distanced from the optimum target position by 1 $\mu$m is 15% and that of the groove track is 12%. the difference exceeds a prescribed value of 2%. Accordingly, the optimum target position of the land track having the poorer jitter characteristic is set as the common optimum target position CBAL.

When possible in terms of calculation or memory capacity, the difference between the optimum target positions of the land and groove tracks and the difference between the jitter values can be weighted, so that the common optimum target position is determined based an the average of the weighted value.

A flat characteristic has a larger margin in most cases. Accordingly, the optimum target position of the track which is determined to have a sharp jitter characteristic can be first obtained, and the position of the track which is determined to have a flat jitter characteristic at the same value of the value of that optimum target position can be set as the optimum target position. In this manner, the common optimum target position CBAL can be obtained quickly.

In the second and third examples, when the jitter characteristic with respect to the target position is determined to be sharp, the minimum point is obtained by function approximation. The present invention is not limited to this. The minimum point can alternatively be obtained by equally changing the target positions of two points having an equal jitter signal in a positive direction and a negative direction, instead of using function approximation.

Still alternatively, when storing disk information or the like in a partial area of the disk 601 (for example, the innermost area) in the form of emboss pits, the optimum target position in the emboss area, i.e., the ROM area is obtained by function approximation or the like. The obtained target position is set as an initial value for searching for the target position in recordable areas, i.e., the land and groove tracks. In this manner, defocus due to the dispersion in the initial state of the head or the like can be absorbed to further stabilize the system. When an error occurs during the determination of the minimum points or adjustment of the focus position in the land and groove tracks due to external disturbances or the like, the operation can be restarted with the initial value. Thus, the target position readjustment can be performed stably.

EXAMPLE 4

Figure 10:
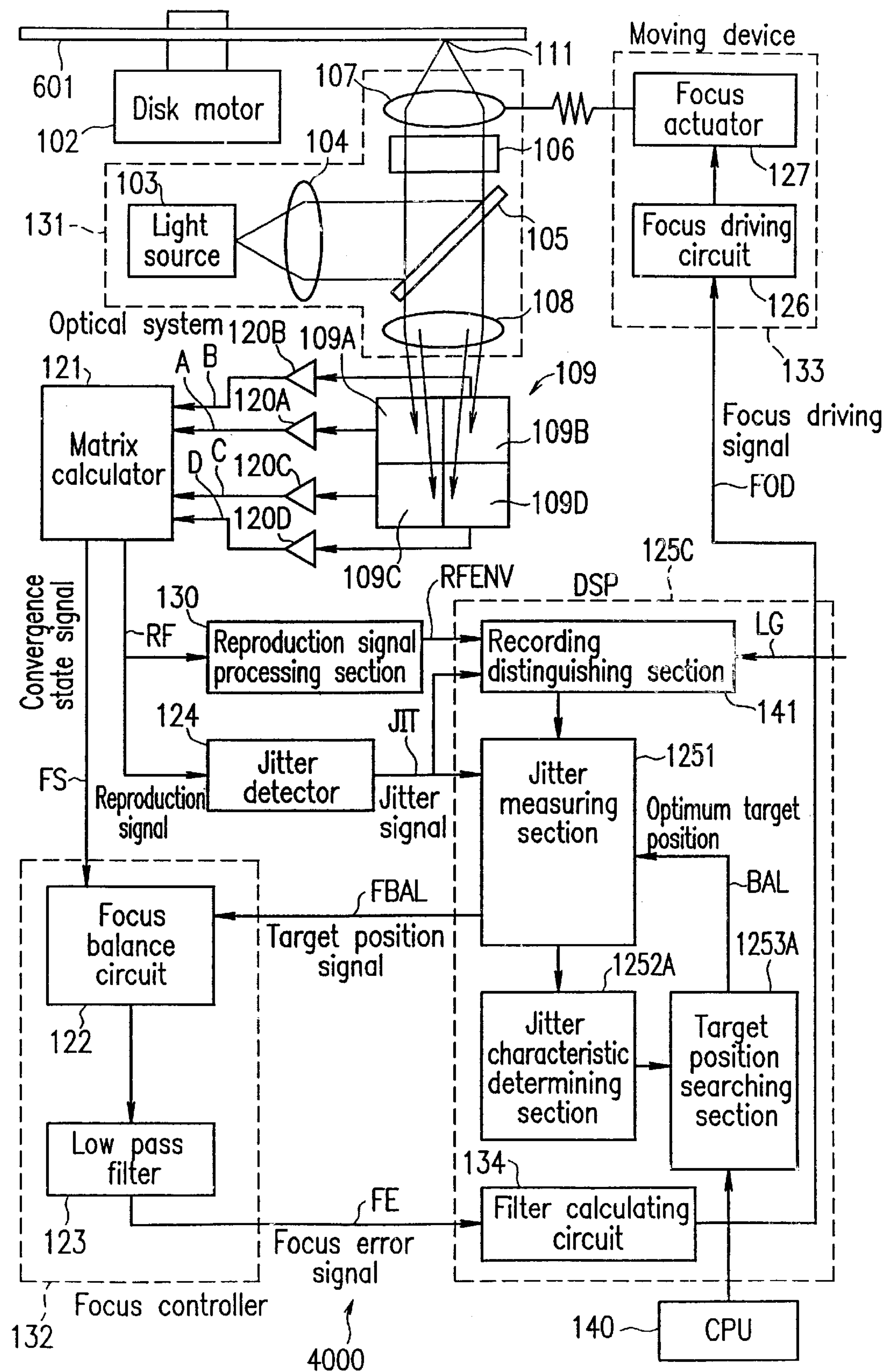
FIG. 10 is a view showing a structure of an optical disk apparatus in a fourth example according to the present invention.

FIG. 10 is a block diagram of an optical disk apparatus 4000 in a fourth example according to the present invention. Identical elements previously discussed with respect to FIG. 6A bear identical reference numerals and the descriptions thereof will be omitted.

The optical disk apparatus 4000 is different from the optical disk apparatus 2000 in the second example in that the optical disk apparatus 4000 includes a reproduction signal processing section 130 and a DSP 125C. The DSP 125C includes a recording distinguishing section 141, a jitter measuring section 1251, a jitter characteristic determining section 1252A, a target position searching section 1253A and a filter calculating section 134.

In the second example, the target position is adjusted by searching in an area having information already stored therein (for example, a DMA (disk management area) storing exchange area information). In the fourth example, the reproduction signal RF is input to the reproduction signal processing section 130 as well as the jitter detector 124. A reproduction signal amplitude measurement signal RFENV detected by the reproduction signal processing section 130 and a jitter signal JIT are input to the recording distinguishing section 141. Based on the reproduction signal amplitude measurement signal RFENV, the jitter signal JIT, and a land/groove switch signal LG, the recording distinguishing section 141 distinguishes a recorded area from a non-recorded area separately in the land track and the groove track.

The recording distinguishing section 141 detects a portion of the land and groove track having information recorded therein, i.e., a so-called recorded sector, and detects a recorded portion of a prescribed length (preferably, at least one rotation of each of the land track and the groove track). The jitter measuring section 1251 measures the jitter in the recorded portion detected by the recording distinguishing section 141.

As described in the second example, the shape of the jitter characteristic and the optimum target position are different between the land track and the groove track. Accordingly, the accurate determination of the shape of the jitter characteristic and the search for the optimum target position are necessary. When the jitter measuring section 1251 changes the target position separately in the land track and the groove track to obtain the relationship between each target position and the jitter for the purpose of measuring the jitter, the jitter measuring section 1251 changes the target position in the land track and the groove track so that the number of samples is the same or so that the information length and the number of sectors are the same in the land and groove tracks.

The optimum target position can be obtained by performing function approximation, or finding the center point of a prescribed target position range, based on the shape of the jitter characteristic, as described in the first and second examples.

After the optimum target position is obtained at the start-up of the optical disk apparatus 4000, actual information is reproduced. When information reproduction fails, target position readjustment is performed in the following manner.

Figure 11A:
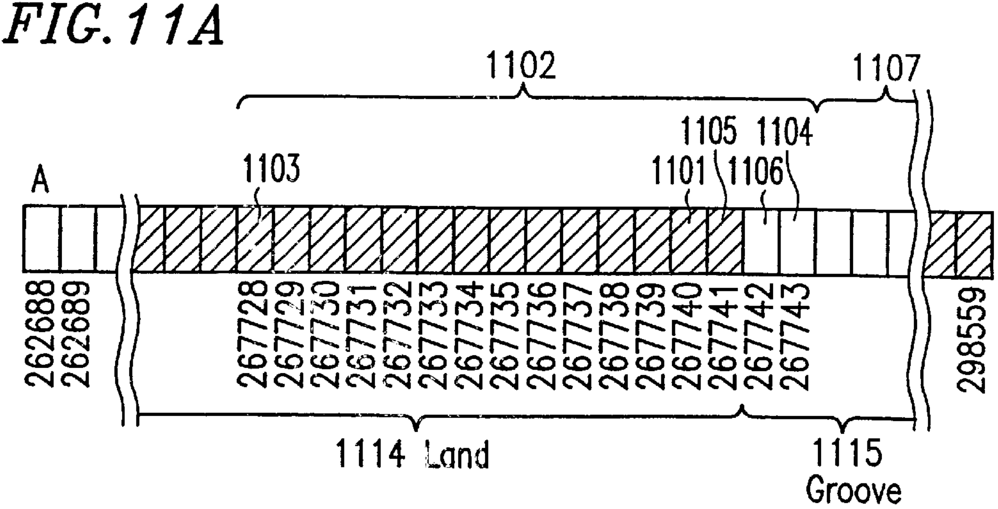
FIGS. 11A through 11C are views illustrating structures of information blocks of a DVD-RAM disk used in the fourth example.
Figure 11B:
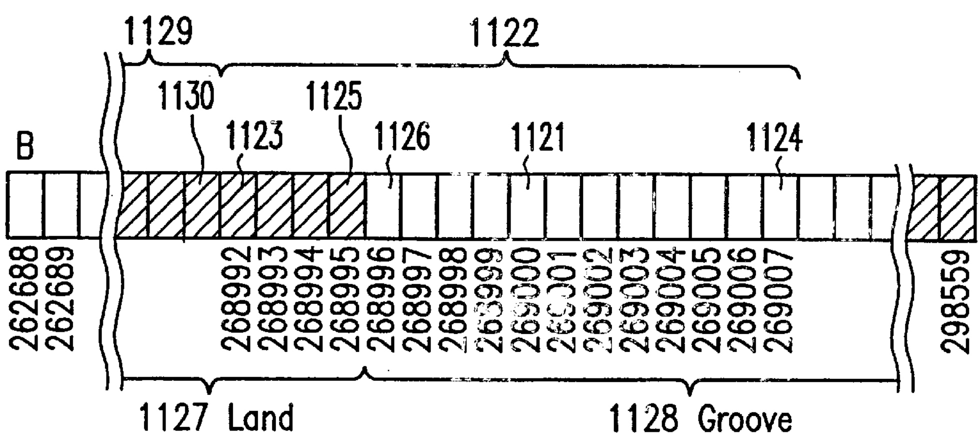
Figure 11C:
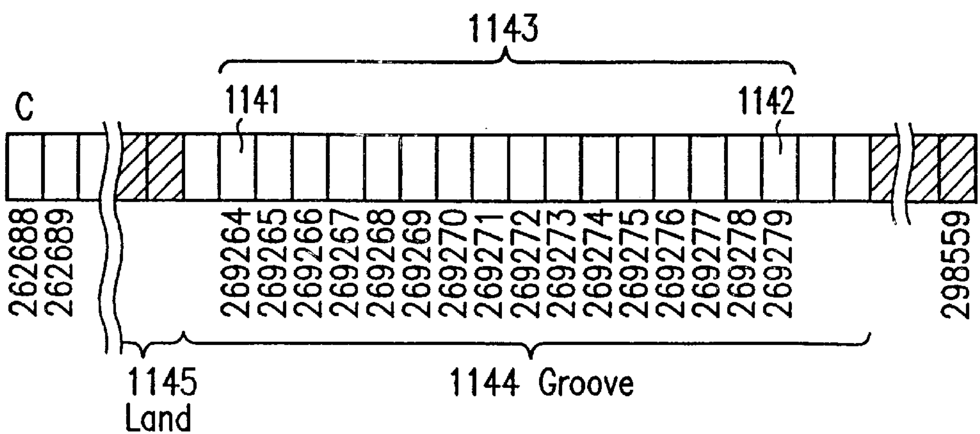

FIGS. 11A through 11C respectively show structures of information blocks of a DVD-RAM disk 601. With reference to FIGS. 10 and 11A, an operation performed when reading of information in a sector 1101 at address 267740 of the DVD-RAM disk 601 results in a failure will be described. FIG. 11A shows a structure of an information block 1102 including the sector 1101 at address 267740. As can be appreciated from FIG. 11A, the information block 1102 includes 16 sectors from a sector 1103 at address 267728 to a sector 1104 at address 267743. Fourteen sectors from the sector 1103 to a sector 1105 at address 267741 are included in a land 1114 and a sector 1106 at address 267742 and the sector 1104 at address 267743 (two sectors) are included in a groove 1115.

A CPU 140 informs the target position searching section 1253A of the land and groove structure of the information block 1102. Six sectors are required for adjusting the target position. The target position searching section 1253A determines that the land 1114 includes the number of sectors required for target position adjustment but the groove 1115 does not have a sufficient number of sectors. Then, the target position searching section 1253A adjusts the target position using an immediately subsequent information block 1107 (including 16 sectors from address 267744 to address 267760) as well as the information block 1102.

As shown in FIG. 11A, the information block 1107 including 19 sectors from the sector 1106 at address 267742 to a sector at address 267761 (not shown) is entirely included in the groove 1115.

The combination of the information blocks 1102 and 1107 includes 14 sectors in the land 1114 and 18 sectors in the groove 1115; namely, the number of sectors required for target position adjustment are provided for the land 1114 and for the groove 1115. Then, the CPU 140 instructs a moving mechanism (not shown) to move the light beam 111 to above the information blocks 1102 and 1107 of the DVD-RAM disk 601.

With reference to FIGS. 10 and 11B, an operation performed when reading of information in a sector 1121 at address 269000 of the DVD-RAM disk 601 results in a failure will be described. FIG. 11B shows a structure of an information block 1122 including the sector 1121 at address 269000. As can be appreciated from FIG. 11B, the information block 1122 includes 16 sectors from a sector 1123 at address 268992 to a sector 1124 at address 269007. Four sectors from the sector 1123 to a sector 1125 at address 268995 are included in a land 1127, and 12 sectors from a sector 1126 at address 268996 to the sector 1124 at address 269007 are included in a groove 1128.

The CPU 140 informs the target position searching section 1253A of the land and groove structure of the information block 1122. Six sectors are required for adjusting the target position. The target position searching section 1253A determines that the groove 1128 includes 12 sectors, which is sufficient for target position adjustment, but the land 1127 have only 4 sectors, which is not sufficient for target position adjustment. Then, the target position searching section 1253A adjusts the target position using an immediately preceding information block 1129 as well as the information block 1122.

As shown in FIG. 11B, the information block 1129 includes 19 sectors from a sector at address 268976 (not shown) to a sector 1130 at address 268991. Fifteen sectors are included in the land 1127, and one sector is included in the groove 1128. The combination of the information blocks 1122 and 1129. includes 19 sectors (4 sectors+15 sectors) in the land 1127 and 13 sectors (12 sectors+1 sector) in the groove 1128; namely, the number of sectors required for target position adjustment are provided for the land 1127 and for the groove 1128. Then, the CPU 140 instructs the moving mechanism (not shown) to move the light beam 111 to above the information blocks 1129 and 1122 of the DVD-RAM disk 601.

FIG. 11C shows a structure of an information block 1143 including 16 sectors from a sector 1141 at address 269264 to a sector 1142 at address 269279, which are all included in a groove 1144 . No sector is included in a land 1145. Since the information block 1143 includes no data recorded in the land 1145, target position readjustment does not need to be performed for the land 1145. The target position searching section 1253A performs target position readjustment using only the 16 sectors in the groove 1144. Advantageously in this case, target position readjustment can be performed with 6 or more sectors with high precision, and the time for readjustment for the land is not necessary. Similarly, for the information block having sectors all included in the land, readjustment for the groove is not performed.

As described above, in the fourth example, even when either one of the land or groove included in a desired information block for which the target position is to be readjusted has a very small area, the target position readjustment is performed using another information block in the vicinity of the desired information block as well as the desired information block itself, i.e., with substantially the same conditions for the land and the groove. In this manner, the number of sectors required for the target position readjustment are obtained regardless of the structure of the information block. Thus, the target position can be obtained with high precision.

EXAMPLE 5

An optical disk apparatus in a fifth example according to the present invention has substantially the same structure as that shown in FIG. 10.

Figure 12A:
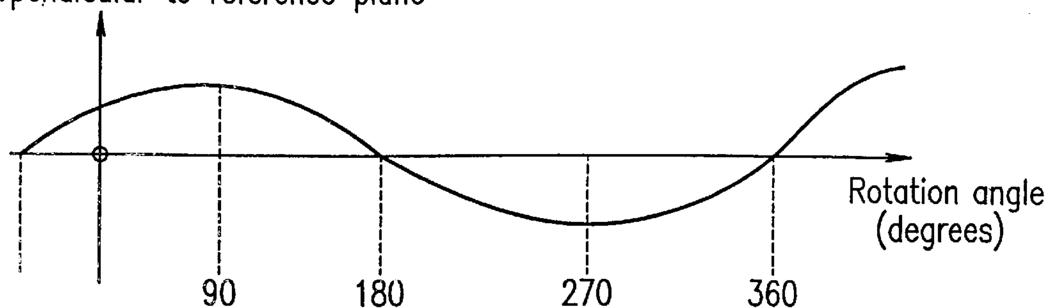
FIG. 12A is graph illustrating the relationship between the rotating angle and the deviation from the recorded layer perpendicular to the reference plane of the optical disk in a fifth example according to the preset invention.
Figure 12B:
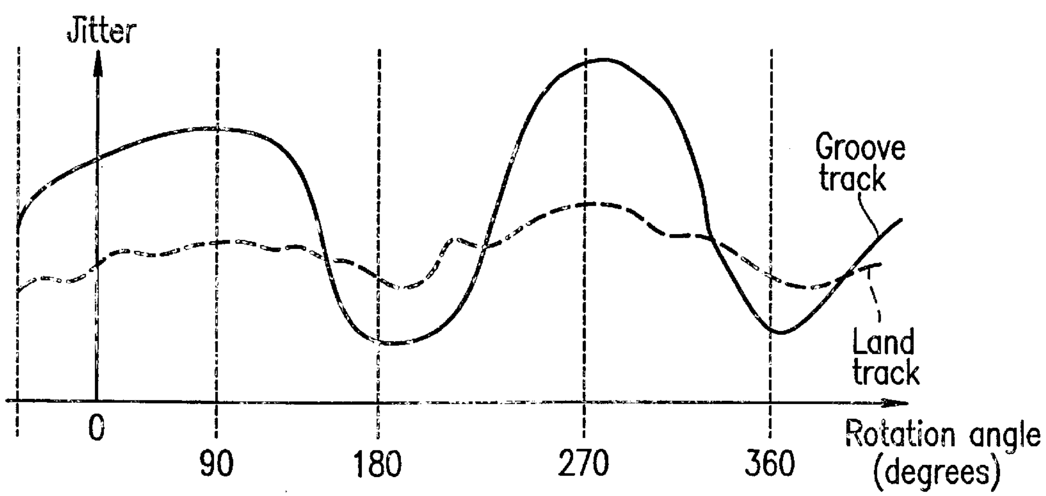
FIG. 12B is graph illustrating the relationship between the rotating angle of the optical disk and the jitter in the fifth example.
Figure 12C:
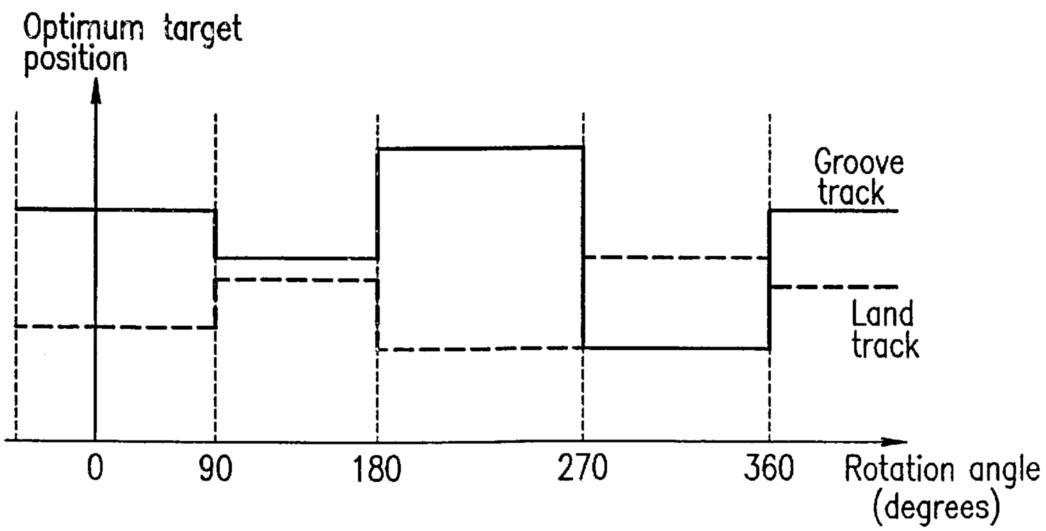
FIG. 12C is graph illustrating the relationship between the rotating angle of the optical disk and the optimum target position in the fifth example.

In the fourth example, it is proposed to detect and measure the jitter of at least one rotation of the disk. As shown in FIG. 12A, the deviation from the recorded layer perpendicular to the reference plane of the optical disk is large. The optical disk also has a tilt. Due to the mutual influence of the surface level fluctuation and the tilt, the change in the jitter during one rotation of the disk is not uniform as shown in FIG. 12B. The optimum target position is also changed. The optimum target position changes every 90 degrees as, for example, shown in FIG. 12C. Accordingly, the jitter measuring section 1251 measures the jitter by dividing one rotation of the track of the disk 601 by a prescribed angle (for example, every 90 degrees) using a frequency generator for rotation control obtained from the disk motor 102 and changing the target position for every portion of the track. In this manner, the optimum target position can be obtained for each portion of the track. The optimum target position for each portion of the track is set as follows. The present invention is not limited to this, and the manner of setting can be modified appropriately in accordance with the state of the optical disk.

(1) When information in sectors of only a part of one rotation of the disk needs to be reproduced, the target position corresponding to the rotation position (time period) of the sectors is set.

(2) When the optimum target position slightly changes during one rotation of the disk, the average of optimum target values of one rotation is output for each of the land and the groove.

(3) When the optimum target position significantly changes during one rotation of the disk, the optimum target position is low-pass-filtered at, for example, a time constant which causes no problem to the response of the focus control system.

As described above, in the fifth example, even when the target position changes during one rotation of the disk due to the surface level fluctuation of the disk or tilt, the generation of error in the target position can be reduced to further improve the reproduction performance.

EXAMPLE 6

Figure 13A:
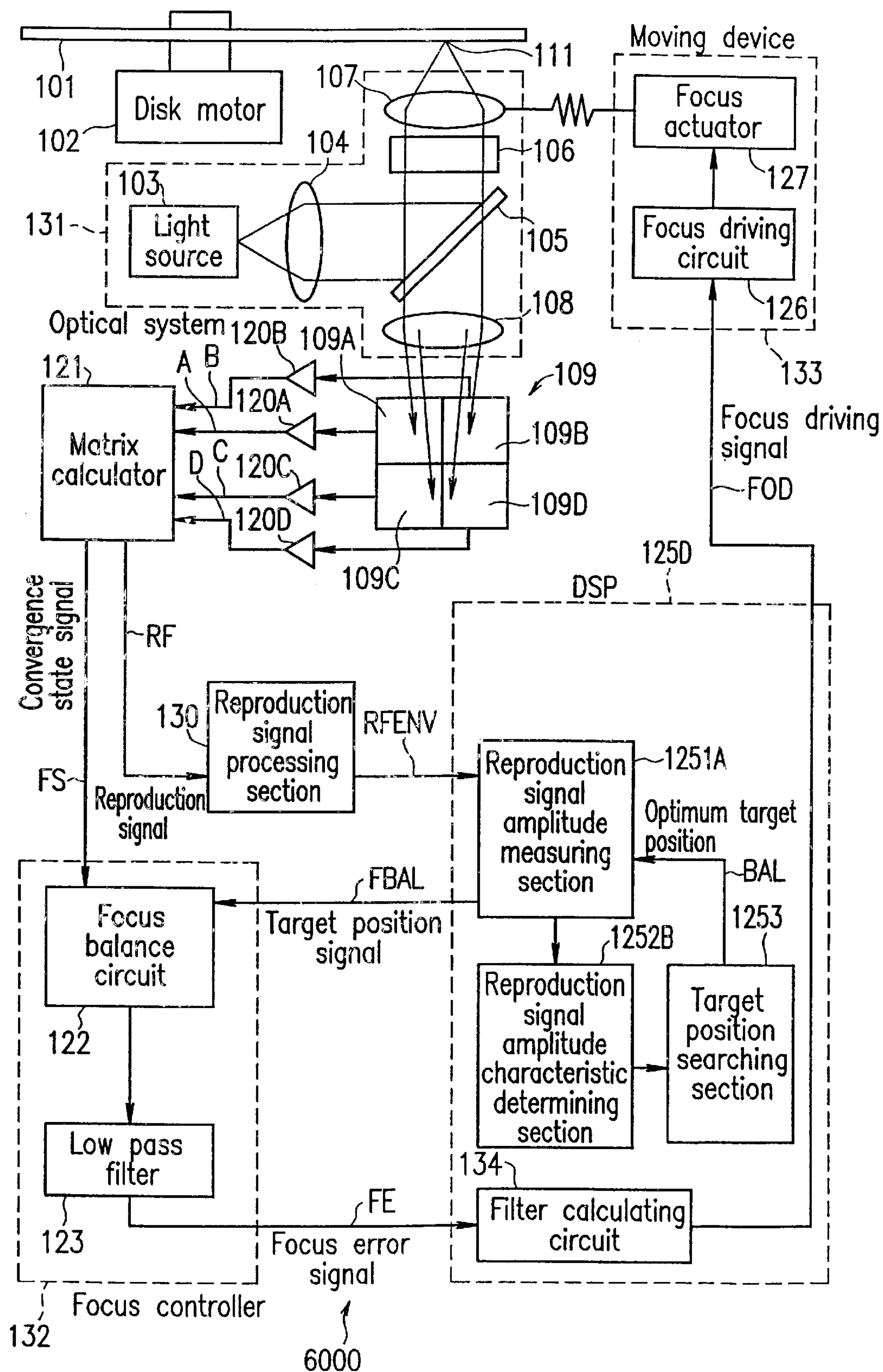
FIG. 13A is a view showing a structure of an optical disk apparatus in a sixth example according to the present invention.

FIG. 13A is a block diagram of an optical disk apparatus 6000 in a sixth example according to the present invention. FIG. 13B is a detailed block diagram of a DSP 125D of the optical disk apparatus 6000. Identical elements previously discussed with respect to FIG. 1 bear identical reference numerals and the descriptions thereof will be omitted.

The optical disk apparatus 6000 is different from the optical disk apparatus 1000 in the first example in that the optical disk apparatus 6000 includes a reproduction signal processing section 130 and a DSP 125D. The DSP 125D includes a reproduction signal amplitude measuring section 1251A, a reproduction signal amplitude characteristic determining section 1252B, a target position searching section 1253, and a filter calculating section 134. The reproduction signal amplitude measuring section 125D includes a memory 136A and a target position varying section 135A. The reproduction signal processing section 130 generates a reproduction signal amplitude measurement signal RFENV based on the reproduction signal RF. The reproduction signal amplitude measuring section 1251A measures the reproduction signal amplitude based on the reproduction signal amplitude measurement signal RFENV.

Figure 14A:
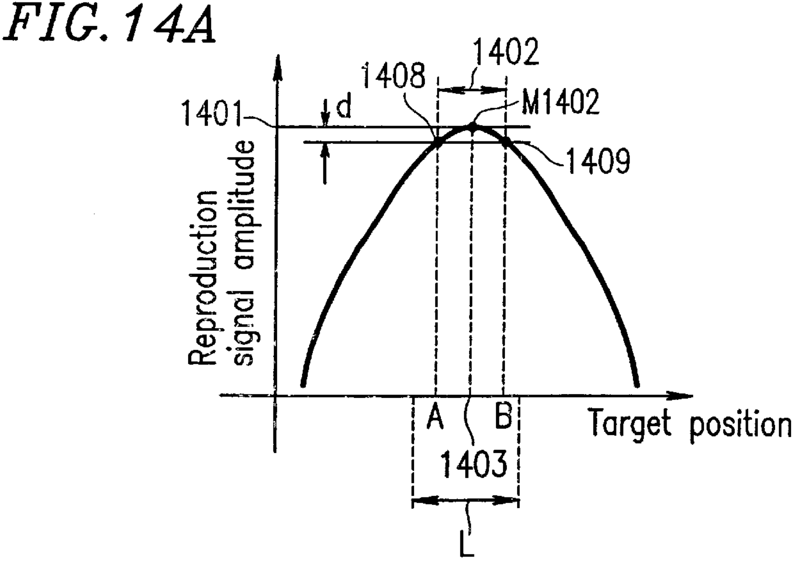
FIGS. 14A through 14C are graphs illustrating reproduction signal amplitude characteristics with respect to a target position in the sixth example.
Figure 14B:
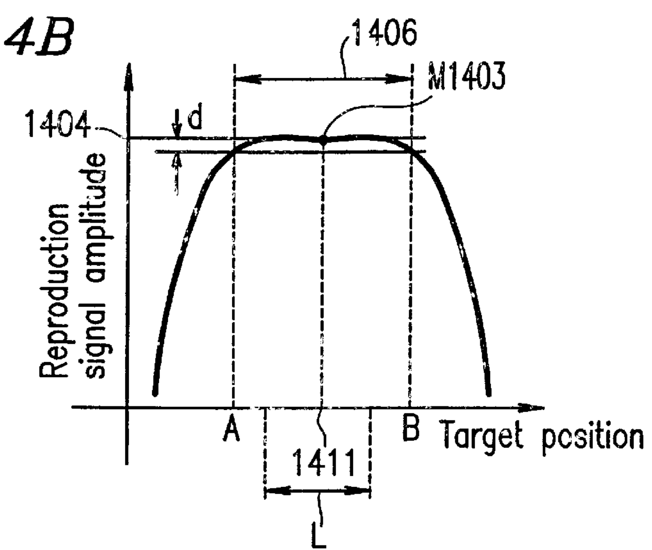
Figure 14C:
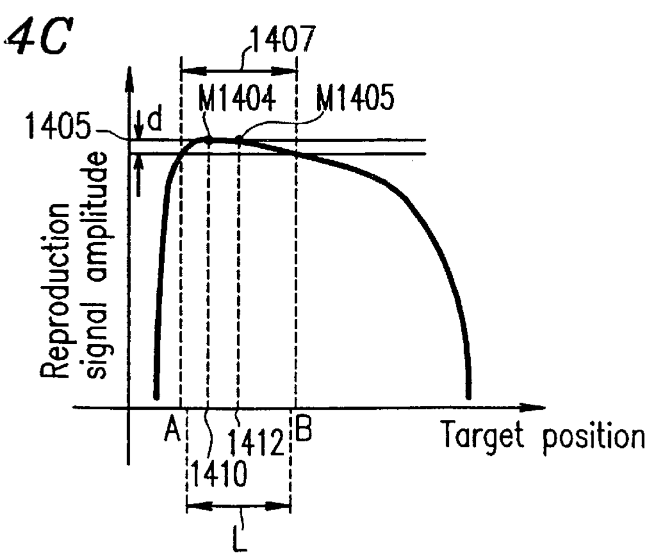
Figure 15:
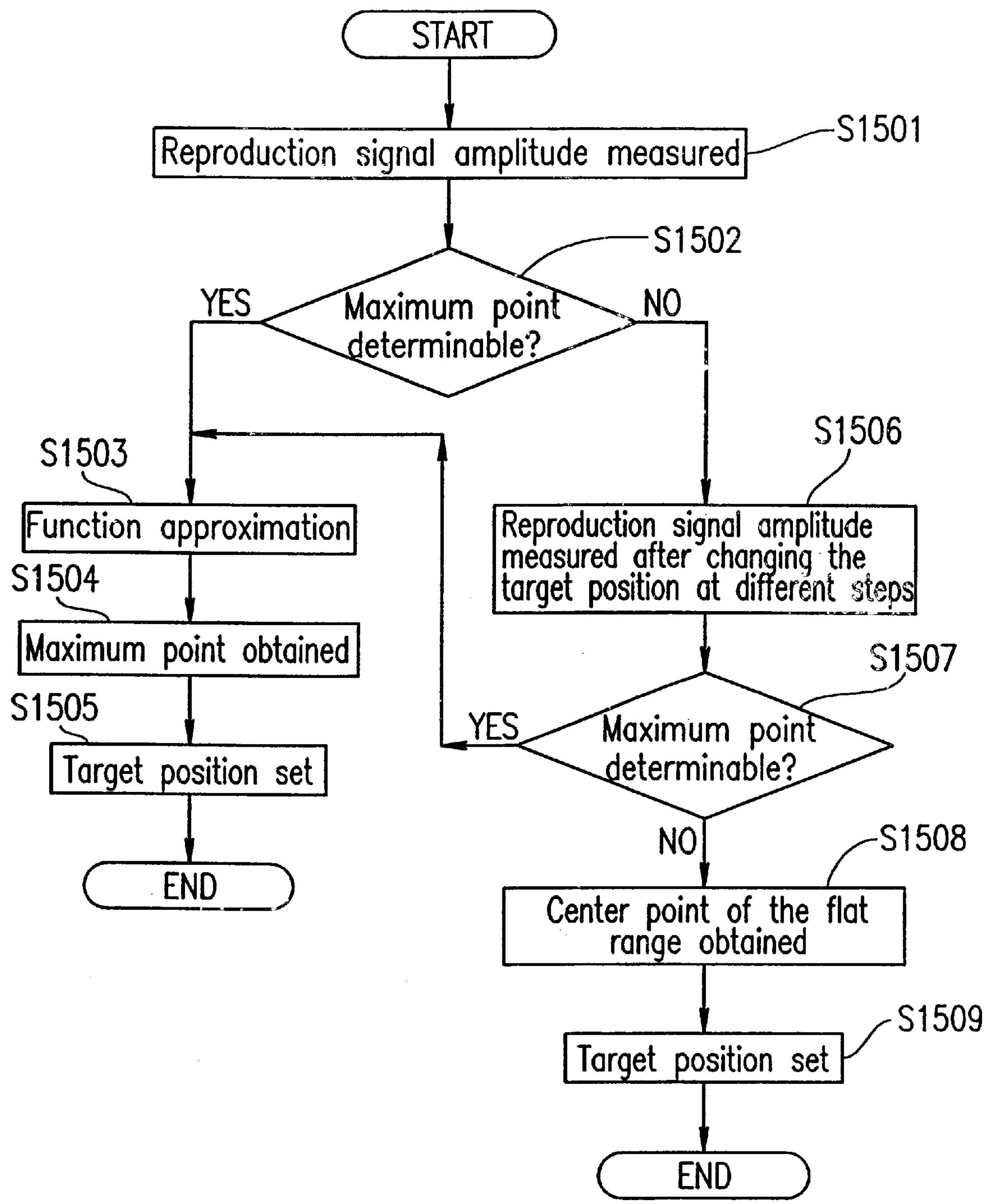
FIG. 15 is a flowchart illustrating an operation for searching for a target position in the sixth example.

FIGS. 14A through 14C show the relationship between the target position for focus control and the reproduction signal amplitude. FIG. 15 is a flowchart for illustrating an operation of the optical disk apparatus 6000.

With reference to FIG. 15 and also FIGS. 13A, 13B, and 14A through 14C, the operation of the optical disk apparatus 6000 will be described.

In step S1501, the target position varying section 135A of the reproduction signal amplitude measuring section 1251A outputs the target position signal FBAL to the focus balance circuit 122 to vary the target position for focus control. Specifically, the target position varying section 135A changes the target position by a prescribed distance. The reproduction signal amplitude measuring section 1251A measures each reproduction signal amplitude measurement signal RFENV at this point, and stores each target position and the reproduction signal amplitude for each target position in table form in a built-in memory 136A.

In step S1502, the reproduction signal amplitude characteristic determining section 1252B determines, based on the reproduction signal amplitude measurement data stored in a memory 136B, whether or not the optimum target position can be determined uniquely. Various methods of determination are conceivable. An exemplary method will be described.

In FIG. 14A, a target position range 1402, in which the reproduction signal amplitude value fulfills the conditions of being a prescribed dispersion d or less from a maximum value 1401, is a prescribed value L or less. In this case, the reproduction signal amplitude characteristic is determined to be sharp, by which the optimum target position 1403 at which the reproduction signal amplitude is maximum can be uniquely determined. In FIGS. 14B and 14C, target position ranges 1404 and 1405, in which the reproduction signal amplitude value fulfills the conditions of being a prescribed dispersion d or less from maximum values 1406 and 1407 respectively, exceeds the prescribed value L. In this case, the reproduction signal amplitude characteristic is determined to exhibit a flat topped curve, by which the optimum target position cannot be uniquely determined.

When the optimum target position can be uniquely determined due to the reproduction signal amplitude characteristic shown in FIG. 14A ("YES" in step S1502), the first target position searching section 1254 detects a center point M1402 between points 1408 and 1409 utilizing the reproduction signal amplitude characteristic of the parabolic curve (second-order function) to obtain the optimum target position 1403, which is to be found. In order to improve the precision, the function approximation section 1257 performs function approximation of the relationship of the reproduction signal amplitude Y relative to the target position X (step S1503). The first control section 1256 moves the target position in a direction in which the reproduction signal amplitude is increased to detect the maximum position of the approximate function (step S1504). Thus, the optimum target position 1403 can be obtained (step S1505).

When the relationship between the target position and the reproduction signal amplitude is flat in the vicinity of maximum point M1403 as shown in FIG. 14B, it is difficult to obtain the optimum target position with high precision even by using the above-mentioned method. When the precision is poor, an end of the flat portion may be undesirably set as the optimum target position. When maximum point M1404 is in the vicinity of the end of the flat portion as shown in FIG. 14C, an optimum target position 1410 is near the end of the flat portion (near point A). In this case, even when the target position is slightly dispersed, the reproduction signal amplitude is drastically reduced. Thus, focus control is destabilized. When the reproduction signal amplitude characteristics shown in FIGS. 14B and 14C are obtained, the reproduction signal amplitude characteristic determining section 1252B determines that the reproduction signal amplitude characteristic exhibits a flat topped curve, by which the optimum target position cannot be determined ("NO" in step S1502).

When it is determined that the maximum point cannot be determined, the reproduction signal amplitude measuring section 1251A measures the reproduction signal amplitude measurement signal RFENV in the vicinity of maximum point M1403 or M1404 with the target positions being changed at narrower steps by the target position varying section 235A (step S1506). Then, the reproduction signal amplitude characteristic determining section 1252B again determines whether or not the optimum target position can be determined in the same method as used in step S1502 (step S1507).

When it is determined that the optimum target position cannot be determined due to the flat shape of the reproduction signal amplitude characteristic ("No" in step S1507), the second target position searching section 1255 extracts the target position range 1406 or 1407 in which the reproduction signal amplitude does not drastically change, and obtains a target position 1411 or 1412 corresponding to a center point M1403 or M1405 in the range 1406 or 1407 as the optimum target position (step S1508 and S1509). Thus, the positive and negative defocus margins can be equal to each other, which realizes stable focus control.

The first target position searching section 1254 desirably searches for the optimum target position in the following manner.

Figure 16A:
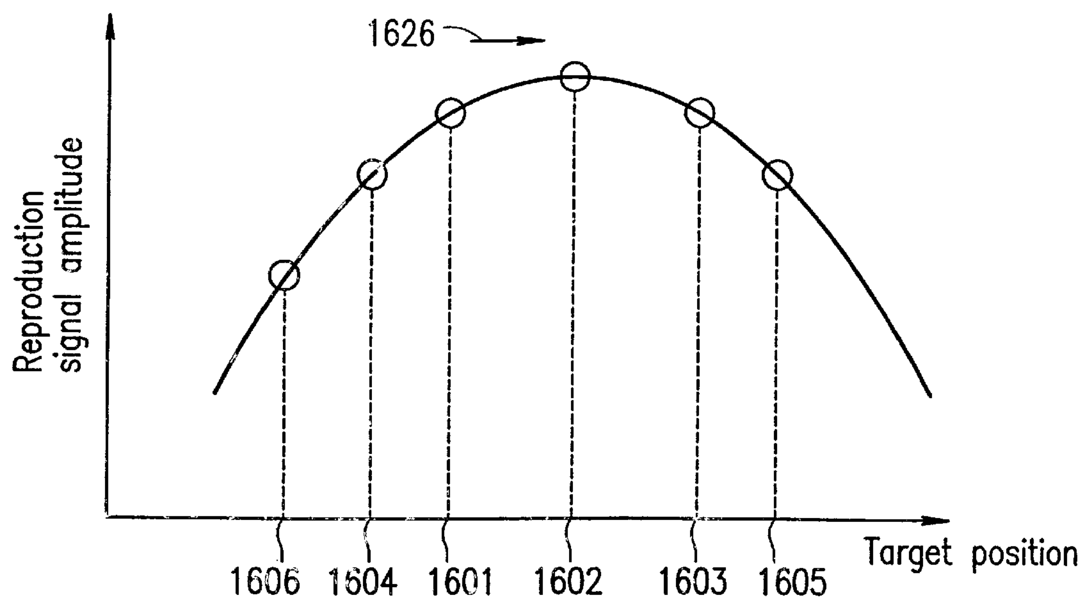
FIGS. 16A and 16B are graphs Illustrating operations for searching for other target positions in the sixth example.

As shown in FIG. 16A, the first target position searching section 1254 obtains a first reproduction signal amplitude value at a first target position 1601 and obtains a second reproduction signal amplitude value at a second target position 1602. The first control section 1256 compares the first reproduction signal amplitude value and the second reproduction signal amplitude value. Since the second reproduction signal amplitude value is larger than the first reproduction signal amplitude value, the first control section 1256 sets a third target position 1603 in a direction 1626 in which the reproduction signal amplitude value is presumed to be further increased, and obtains a third reproduction signal amplitude value at the third target position 1603. The first control section 1256 compares the second reproduction signal amplitude value and the third reproduction signal amplitude value. Since the third reproduction signal amplitude value is not larger than the second reproduction signal amplitude value, the first control section 1256 sets a fourth target position 1604 in the opposite direction, and obtains a fourth reproduction signal amplitude value at the fourth target position 1604. In a similar manner, the first control section 1256 sets a fifth and subsequent target positions 1605, 1606, etc. The first control section 1256 moves to an unmeasured point at which the reproduction signal amplitude value is presumed to be larger than that of the present point, and terminates the operation when the number of samples reaches a prescribed number. In this method, target positions which are present in positive and negative directions with respect to the position at which the reproduction signal amplitude is substantially maximum can be obtained quickly and accurately. The optimum target position is obtained by performing regression analysis, function approximation and the like based on the relationship between the target positions and the reproduction signal amplitude values.

The second target position searching section 1255 desirably searches for the optimum target position in the following manner.

Figure 16B:
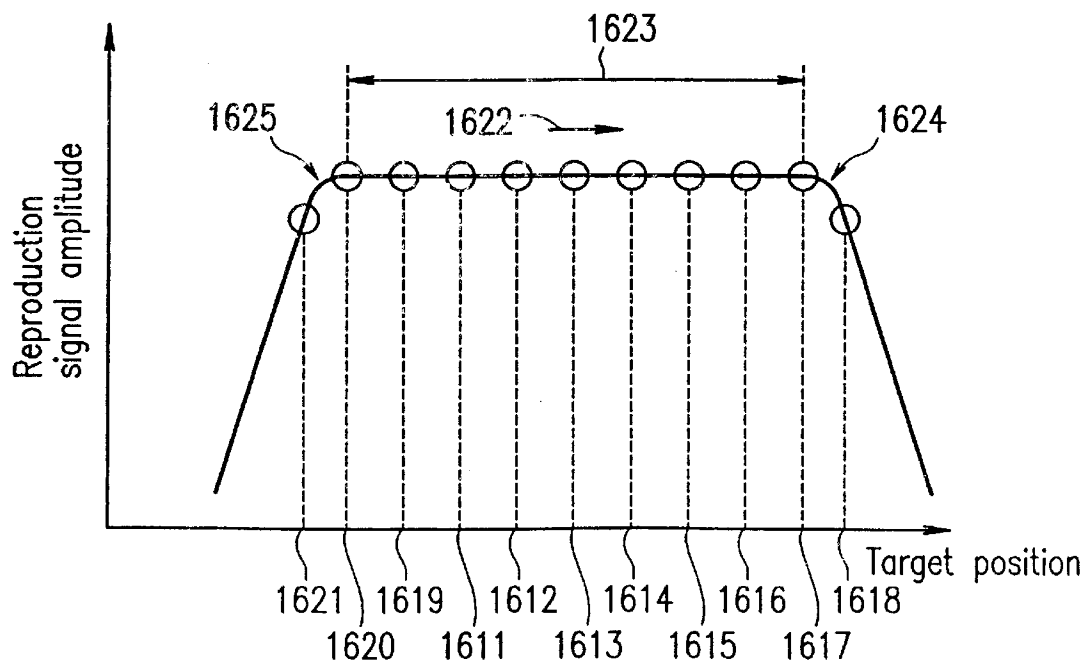

As shown in FIG. 16B, when the reproduction signal amplitude characteristic determining section 1252B determines that the reproduction signal amplitude characteristic exhibits a flat topped curve, the second target position searching section 1255 moves in a prescribed direction at narrower steps and obtains a flat target position range in which the reproduction signal amplitude changes little.

The second target position searching section 1255 obtains a first reproduction signal amplitude value at a first target position 1611 and obtains a second reproduction signal amplitude value at a second target position 1612. The second control section 1258 moves the target position in a prescribed direction 1622. Up to the target position 1617 where the reproduction signal amplitude value is a prescribed dispersion value or less, the target position is moved and the obtained reproduction signal amplitude is evaluated in repetition. When the reproduction signal amplitude becomes lower than the prescribed dispersion value at a target position 1618, the second control section 1258 determines that the target position has passed a shoulder portion 1624 of the flat topped curve, and stops moving the target position in the direction 1622 and moves the target position in the opposite direction. Similarly, when the reproduction signal amplitude value becomes lower than the prescribed value at a target position 1621, the second control section 1258 determines that the target position has passed a shoulder portion 1625 of the flat topped curve. The second target position searching section 1255 obtains a flat target position range 1623 and sets the center of the flat target position range 1623 as the optimum target position.

When the reproduction signal amplitude characteristic exhibits a flat topped curve, the reproduction signal amplitude drastically decreases outside the shoulders 1624 and 1625. When the target position is moved, the focus control is destabilized. Accordingly, when the reproduction signal amplitude characteristic is determined to exhibit a flat topped curve, the range of moving the target position for searching for the optimum target position is preferably restricted. In the case where the reproduction signal amplitude characteristic is flat in a range equal to or greater than the prescribed range to guarantee a sufficient margin, the center point of the flat range is calculated and set as the optimum target position.

When the reproduction signal amplitude characteristic exhibits a parabolic curve and the reproduction signal amplitude characteristic approximated with a function by the function approximation section 1257 is significantly away from the ideal reproduction signal amplitude characteristic, the optimum target position which is obtained by function approximation may be significantly different from the target position at which the reproduction signal amplitude is actually maximum. In this case, the approximate function measuring section 1259 obtains the approximation degree of the reproduction signal amplitude characteristic obtained by the function approximation section 1257 with respect to the ideal reproduction signal amplitude characteristic. When the approximation degree is equal to or greater than a prescribed value, the target position at which the reproduction signal amplitude is maximum based on the actual measurement data obtained by the reproduction signal amplitude measuring section 1259 is set as the optimum target position.

EXAMPLE 7

Figure 17A:
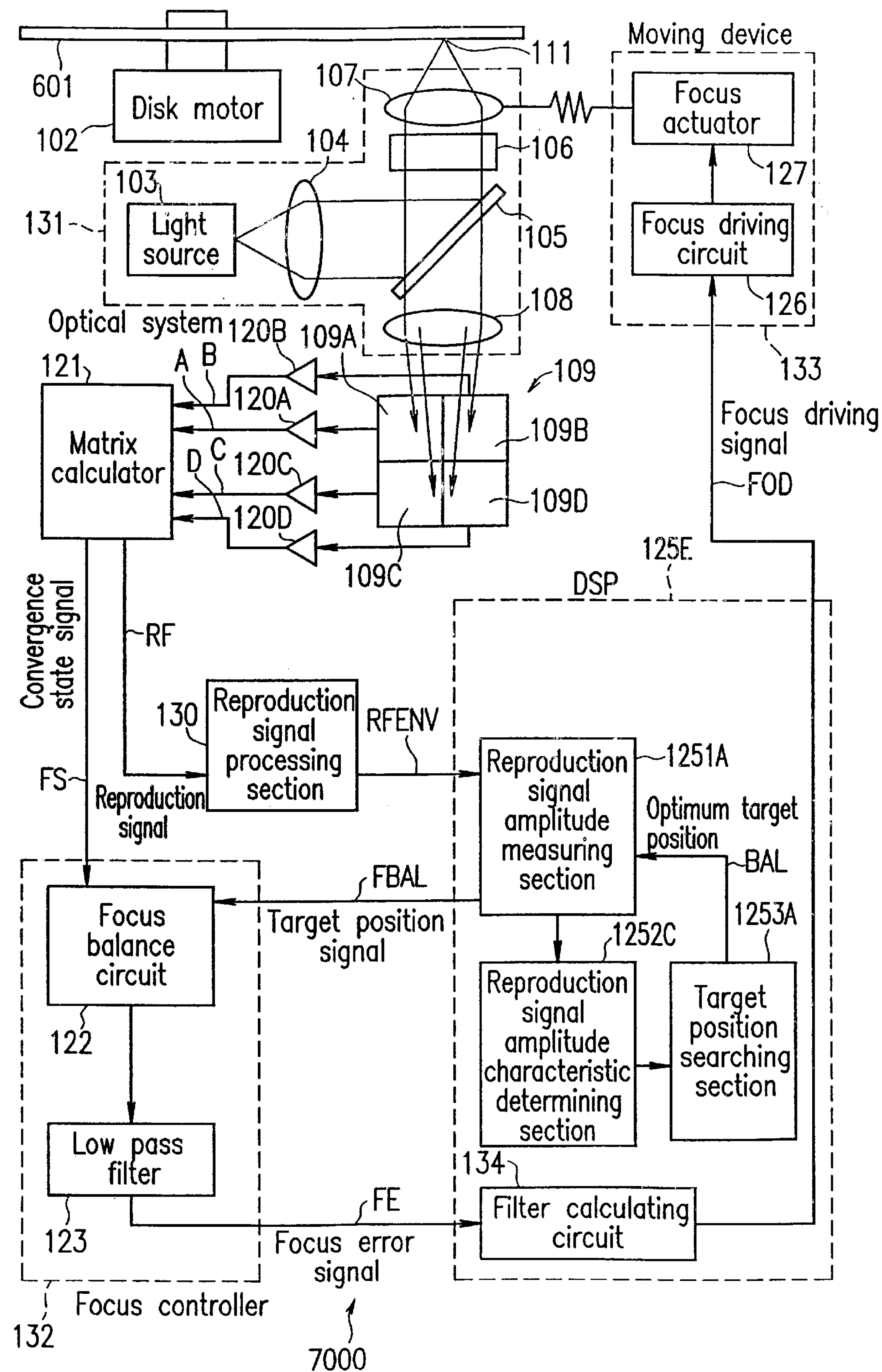
FIG. 17A is a view showing a structure of an optical disk apparatus in a seventh example according to the present invention.
Figure 17C:
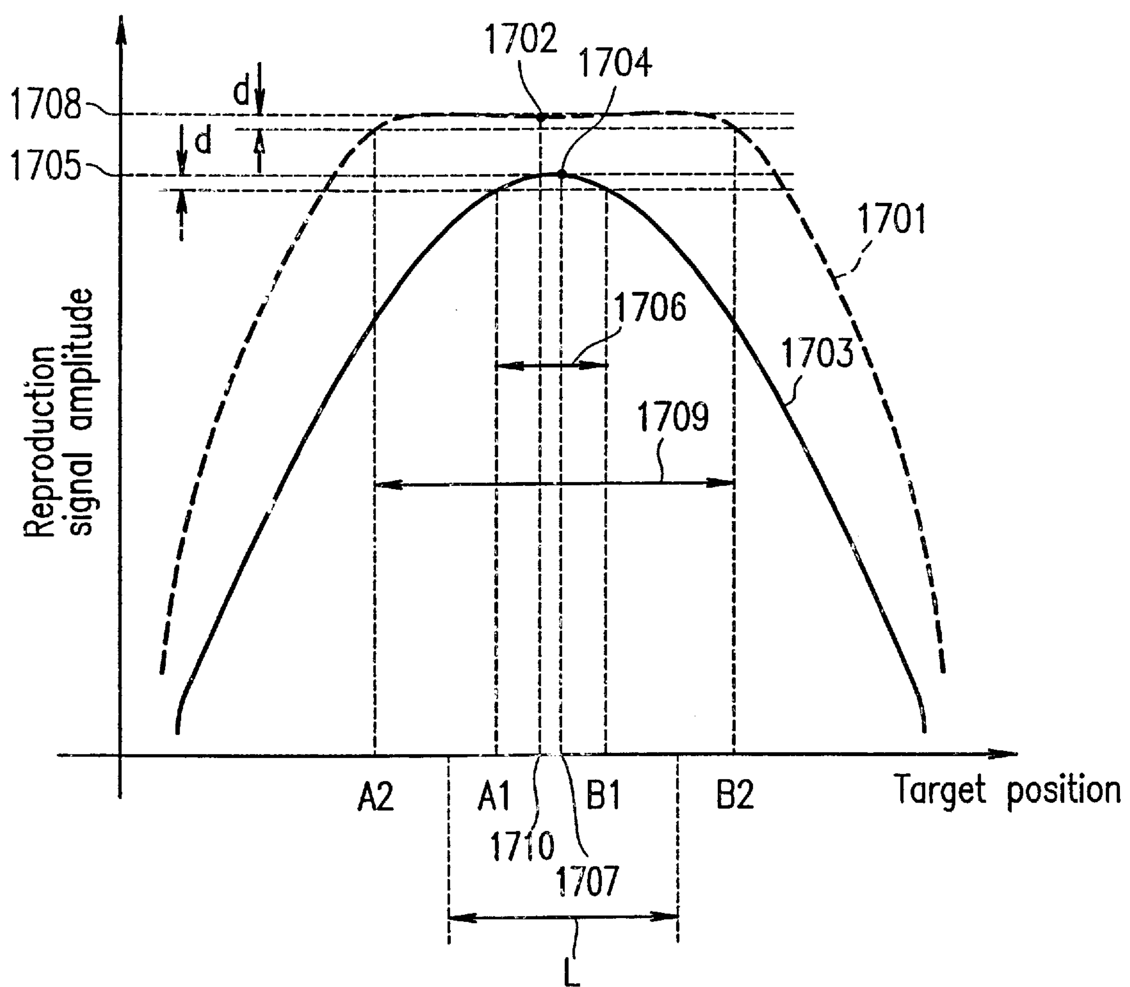
FIG. 17C is a graph illustrating an operation for searching for a target position in the seventh example.
Figure 17D:
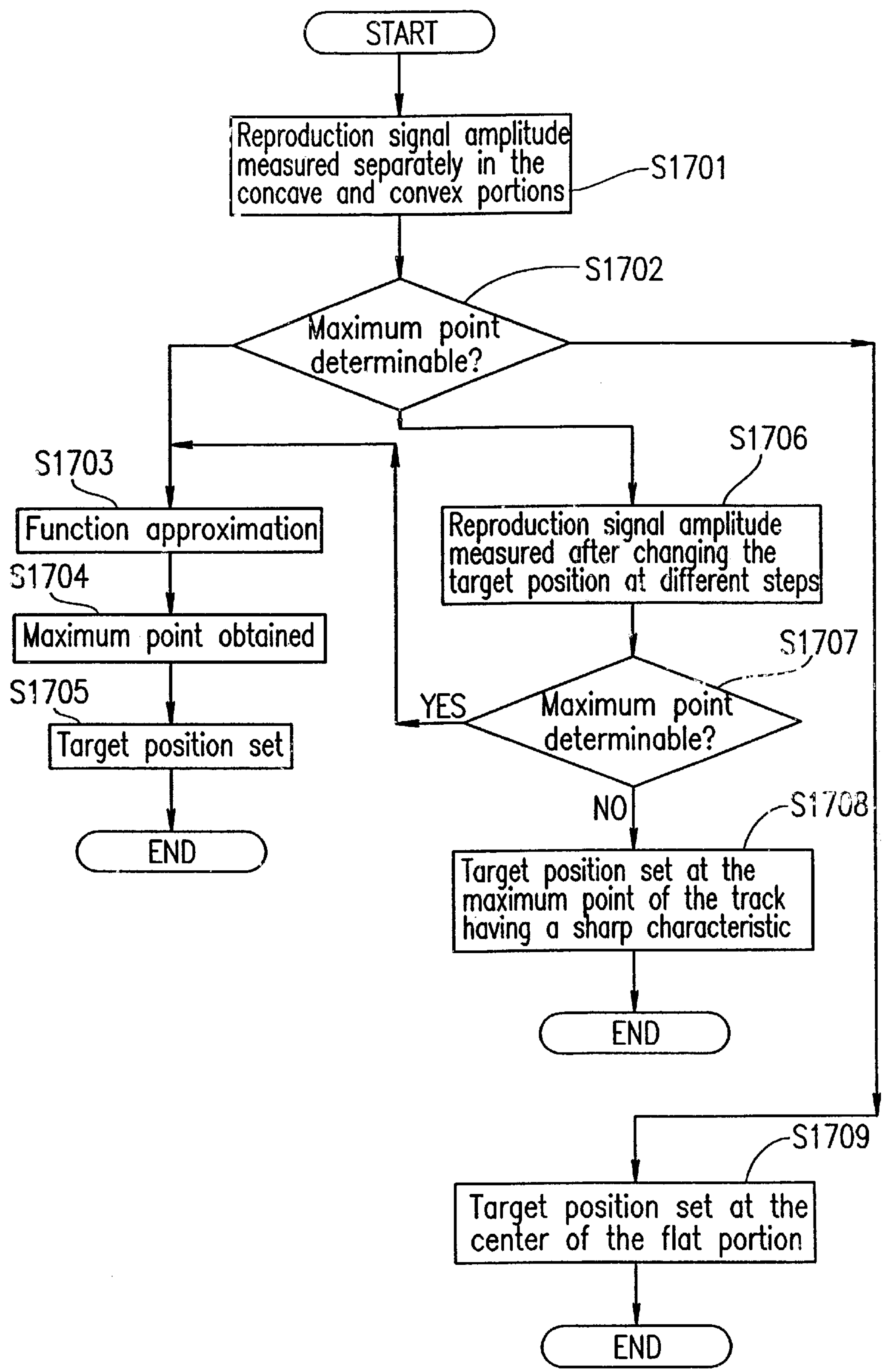
FIG. 17D is a flowchart illustrating an operation for searching for a target position in the seventh example.

FIG. 17A is a block diagram of an optical disk apparatus 7000 in a seventh example according to the present invention. Identical elements previously discussed with respect to the second example bear identical reference numerals and the descriptions thereof will be omitted.

The optical disk apparatus 7000 is different from the optical disk apparatus 2000 in the second example in that the optical disk apparatus 7000 includes a reproduction signal processing section 130 and a DSP 125E. FIG. 17B is a detailed block diagram of the DSP 125B. The DSP 125E includes a reproduction signal amplitude measuring section 1251A, a reproduction signal amplitude characteristic determining section 1252C, a target position searching section 1253A, and a filter calculating section 134.

The reproduction signal amplitude measuring section 1251A includes a memory 136A and a target position varying section 135A. The reproduction signal amplitude characteristic determining section 1252C includes a concave portion reproduction signal amplitude characteristic determining section 1252D and a convex portion reproduction signal amplitude characteristic determining section 1252E.

The optical disk apparatus 7000 uses a disk 601 having a convex guide track (land track) and a concave guide track (groove track) described in the second example with reference to FIG. 6C. Usually, the optimum target position of the land track and the optimum target position of the groove track are different from each other due to the profile of the light spot on the disk 601 or the relationship between the optical aberration and the shape of the groove. The target position varying section 135A changes the target position separately in the land track and the groove track. The reproduction signal amplitude measuring section 1251A measures the reproduction signal amplitude separately for the land track and the groove track. The concave portion reproduction signal amplitude characteristic determining section 1252D and the convex portion reproduction signal amplitude characteristic determining section 1252B determine the respective reproduction signal amplitude characteristics.

With reference to FIGS. 17A through 17D, an operation of the optical disk apparatus 7000 will be described.

When the disk 601 (FIG. 6C) is inserted into the optical disk apparatus 7000, the DSP 125E rotates the disk motor 102 to cause the light'source 103 to emit light. Then, the DSP 125E sends a focus driving signal FOD to the focus actuator 127 to cause the converging lens 107 to be closer to or farther from the disk 601. At this point, the focus controller 132 executes focus control based on a convergence state signal FS output by the matrix calculator 121 and executes tracking control using a tracking actuator (not shown). The DSP 125E searches for the position of a prescribed track and waits for a command at the position of the prescribed track. Upon a command from a host computer, information in a desired track is reproduced or information is recorded on a desired track.

During such start-up processing, the DSP 125E searches for an area having information stored already therein (for example, a DMA (disk management area) storing exchange area information) and thus adjusts the target position. The reproduction signal amplitude measuring section 1251A searches for a leading position of the land track of the DMA and measures reproduction signal amplitude measurement signals RFENV from the leading position to a terminating position of the land track. The average value of the reproduction signal amplitude measurement signals RFENV is stored in the memory 136A. Since the optical disk 601 has spiral tracks, the light beam goes into the groove track adjacent to the land track. The reproduction signal amplitude measuring section 1251A measures reproduction signal amplitude measurement signals RFENV from a leading position to a terminating position of the groove track. The average value of the reproduction signal amplitude measurement signals RFENV is stored in the memory 136A. Then, the target position varying section 135A changes the target position signal FBAL output to the focus balance. circuit 122 to change the target position by one step. The reproduction signal amplitude measuring section 1251A returns to the leading position of the land track of the DMA and measures the reproduction signal amplitude measurement signal in the land and groove tracks at the target position after the change by one step. The obtained value is stored in the memory 136A.

In this manner, the reproduction signal amplitude of the signals recorded in the land and groove tracks are measured while changing target position by a prescribed step, until the target position is changed a prescribed number of times (for example, 5 times) (step S1701). The concave portion reproduction signal amplitude characteristic determining section 1252D and the convex portion reproduction signal amplitude characteristic determining section 1252E respectively determine the reproduction signal amplitude characteristics with respect to the target positions of the groove track and the land track (step S1702). Specifically, it is determined whether the reproduction signal amplitude characteristic (which is the relationship between the target position and the reproduction signal amplitude measurement signal RFENV) exhibits a flat topped curve which is flat in the vicinity of maximum point 1702 like a reproduction signal amplitude characteristic 1701 in FIG. 17C or a sharp and parabolic curve like a reproduction signal amplitude characteristic 1703 and thus allows maximum point 1704 to be easily determined.

The determination can be done in a manner similar to that in the sixth example.

The reproduction signal amplitude measuring section 1251A changes the target position by a prescribed step. A target position range 1706, of the reproduction signal amplitude characteristic 1703, in which the reproduction signal amplitude value fulfills the conditions of being a prescribed dispersion d or less from a maximum value 1705, is a prescribed value L or less. In this case, the reproduction signal amplitude characteristic is determined to be sharp, by which an optimum target position 1707 at which the reproduction signal amplitude is maximum can be uniquely determined. A target position range 1709, of the reproduction signal amplitude characteristic 1701, in which the reproduction signal amplitude value fulfills the conditions of being a prescribed dispersion d or less from maximum value 1708, exceeds the prescribed value L. In this case, the reproduction signal amplitude characteristic is determined to exhibit a flat topped curve, by which an optimum target position 1707 at which the reproduction signal amplitude is maximum cannot be uniquely determined.

When the reproduction signal amplitude characteristics of both the land track and the groove track are determined to be sharp and allow the optimum target position to be easily determined, the first target position searching section 1254 performs function approximation of the characteristic of each of the tracks similarly to that in the first example (step S1703), and obtains the maximum points of the respective functions. Thus, a convex portion optimum target position LBAL and a concave portion optimum target position GBAL are set (steps S1704 and S1705).

When either the reproduction signal amplitude characteristic of the land track or the reproduction signal amplitude characteristic of the groove track is determined to be sharp and allow the maximum point to be easily determined and the other reproduction signal amplitude characteristic is determined to be flat, the following operation is performed. The target position varying section 135A changes the target position at narrower steps in the track having the flat reproduction signal amplitude characteristic. The reproduction signal amplitude measuring section 1251A measures the reproduction signal amplitude relative to the target position again (step S1706), and the reproduction signal amplitude characteristic determining section 1262C determines the reproduction signal amplitude characteristic again (step S1707). When the reproduction signal amplitude characteristic which was determined to be flat the previous time is determined to be sharp and allow the maximum point to be easily determined ("YES" in step S1707), the function approximation section 1257 performs function approximation of the reproduction signal amplitude characteristics in the land and groove tracks (step S1703). The first target position searching section 1254 obtains the maximum points of the respective functions to set the optimum target positions LBAL and GBAL (step S1704 and S1705). When the reproduction signal amplitude characteristic is still determined to be flat and not allow the maximum point to be determined ("NO" in step S1707), the first target position searching section 1254 obtains the optimum target position of the track determined to be sharp and sets the same position of the other track as the optimum target position. In this manner, the target position adjustment can be adjusted quickly and stably. Thus, stable focus control and signal reproduction are realized (step S1708).

When the optimum target position characteristics of both the land track and the groove track are determined to exhibit a flat topped curve, the second target position searching section 1255 obtains target position ranges, in which the optimum target position changes little, in the land track and the groove track, and sets the center points in the ranges as the convex portion optimum target position LBAL and the concave portion optimum target position GBAL (step S1709).

In the seventh example, when the reproduction signal amplitude characteristic with respect to the target position is determined to be sharp, the maximum point is obtained by function approximation. The present invention is not limited to this. The maximum point can alternatively be obtained by equally changing the target positions of two points having an equal reproduction signal amplitude, instead of using function approximation.

Still alternatively, when storing disk information or the like in a partial area of the disk 601 (for example, the innermost area) in the form of emboss pits, the optimum target position in the emboss area, i.e., the ROM area is obtained by function approximation. The obtained target position is set as an initial value for searching for the target position in recordable areas, i.e., the land and groove tracks. In this manner, defocus due to the dispersion in the initial state of the head or the like can be absorbed to further stabilize the system. When an error occurs during the determination of the maximum points of the land and groove tracks or adjustment of the focus position in the land and groove tracks due to external disturbances or the like, the operation can be restarted with the initial value. Thus, the target position readjustment can be performed stably.

In the sixth and seventh examples, the optimum target position for focus control is performed using the reproduction signal amplitude instead of jitter in a similar manner to in the first and second examples. Reproduction amplitude can also be used in the third, fourth and fifth examples.

As described above, the present invention provides stable target position control and reproduction signal performance by carrying out an optimum target position searching method based on the characteristic of the reproduction signal with respect to the target position and thus determining the optimum target position quickly with high precision.

Even when the jitter or reproduction signal amplitude characteristic with respect to the target position is significantly different between the land track (convex guiding track) and the groove track (concave guiding track) of, for example, a DVD-RAM disk due to the optical aberration, beam profile or the like, the optimum target position can be set.

Various other modifications will be apparent to and can be readily made by those skilled in the art without departing from the scope and spirit of this invention Accordingly, it is not intended that the scope of the claims appended hereto be limited to the description as set forth herein, but rather that the claims be broadly construed.

What is claimed is:

1. An optical disk apparatus, comprising:

a converging section for converging a light beam toward an information carrier;

a moving section for moving the light beam converged by the converging section in a direction perpendicular to a surface of the information carrier;

a light detector for detecting the light beam reflected by the information carrier;

a convergence state detecting section for generating a convergence state signal representing a convergence state of the light beam at a convergence point on the information carrier and outputting a reproduction signal from the information carrier, based on the output from the light detector;

a focus controller for driving the moving section to make the convergence state constant based on the convergence state signal and a prescribed target position;

a reproduction quality signal detector for detecting a reproduction quality signal representing a quality of the reproduction signal based on the reproduction signal;

a reproduction quality signal measuring section for changing the target position and measuring a value of the reproduction quality signal corresponding to each of the changed target positions;

a reproduction quality signal characteristic determining section for determining a characteristic of the reproduction quality signal based on the value of the reproduction quality signal corresponding to each of the changed target positions; and a target position searching section for searching for an optimum target position of the focus controller for optimizing the value of the reproduction quality signal based on a determination result of the reproduction quality signal characteristic determining section.

2. An optical disk apparatus according to claim 1, wherein:

the reproduction quality signal characteristic determining section determines, based on the value of the reproduction quality signal measured by the reproduction quality signal measuring section, whether or not the reproduction quality signal has a substantially maximum or minimum value in a prescribed range of the target positions; and the target position searching section includes:

a first target position searching section for searching for the optimum target position when the reproduction quality signal has one of a parabolic characteristic and an inverted parabolic characteristic having the substantially maximum or minimum value in the prescribed range, and a second target position searching section for searching for the optimum target position when the reproduction quality signal has a flat characteristic not having the substantially maximum or minimum value in the prescribed range.

3. An optical disk apparatus according to claim 2, wherein:

the first target position searching section includes a first control section for moving the target position in a direction in which a quality represented by the reproduction quality signal is presumed to be improved while searching for the optimum target position, and the second target position searching section includes a second control section for moving the target position in a prescribed direction.

4. An optical disk apparatus according to claim 2, wherein:

the first target position searching section includes a function approximation section for finding an approximate function for approximating the relationship between the target position and the reproduction quality signal, and determines the optimum target position based on the approximate function, and the second target position searching section determines the optimum target position by finding a center point in a portion of the prescribed range, in which a change in the value of the reproduction quality signal is restricted at a prescribed level or less.

5. An optical disc apparatus according to claim 4, wherein the second target position searching section restricts the portion to a prescribed area or less.

6. An optical disk apparatus according to claim 4, wherein:

the first target position searching section includes an approximate function determining section for obtaining an approximation degree between the approximate function obtained by the function approximation section and a prescribed shape of the characteristic of the reproduction quality signal, and when the approximation degree is a prescribed level or more, the first target position searching section obtains the target position at which the value of the reproduction quality signal measured by the reproduction quality signal measuring section is substantially maximum or minimum as the optimum target position, without using the approximate function.

7. An optical disk apparatus according to claim 2, wherein, when the reproduction quality signal characteristic determining section determines that the reproduction quality signal has a flat characteristic not having a substantially maximum or minimum value, the reproduction quality signal measuring section changes the target position with narrower steps and measures a value of the reproduction quality signal corresponding to each of the changed target positions.

8. An optical disk apparatus according to claim 1, wherein:

the information carrier includes a concave information track having a concave shape and a convex information track having a convex shape;

the reproduction quality signal characteristic determining section includes:

a concave portion reproduction quality signal characteristic determining section for determining the characteristic of the reproduction quality signal based on the value of the reproduction quality signal corresponding to each of the target positions changed in the concave information track, and a convex portion reproduction quality signal characteristic determining section for determining the characteristic of the reproduction quality signal based on the value of the reproduction quality signal corresponding to each of the target positions changed in the convex information track; and the target position searching section searches for a concave optimum target position at which the reproduction quality signal has an optimum value based on a determination result of the concave portion reproduction quality signal characteristic determining section, and also searches for a convex optimum target position at which the reproduction quality signal has an optimum value based on a determination result of the convex portion reproduction quality signal characteristic determining section.

9. An optical disk apparatus according to claim 8, wherein:

the concave portion reproduction quality signal characteristic determining section determines, based on the value of the reproduction quality signal in the concave information track measured by the reproduction quality signal measuring section, whether or not the reproduction quality signal in the concave portion has a substantially maximum or minimum value in a prescribed range of the target positions;

the convex portion reproduction quality signal characteristic determining section determines, based on the value of the reproduction quality signal in the convex information track measured by the reproduction quality signal measuring section, whether or not the reproduction quality signal in the convex portion has a substantially maximum or minimum value in a prescribed range of the target positions; and the target position searching section includes:

a first target position searching section for searching for the optimum target position when the reproduction quality signal has one of a parabolic characteristic and an inverted parabolic characteristic having the maximum or minimum value in the prescribed range, and a second target position searching section for searching for the optimum target position when the reproduction quality signal has a flat characteristic not having the maximum or minimum value in the prescribed range.

10. An optical disk apparatus according to claim 8, wherein:

the first target position searching section includes a first control section for moving the target position in a direction in which a quality represented by the reproduction quality signal is presumed to be improved while searching for the optimum target position, and the second target position searching section includes a second control section for moving the target position in a prescribed direction.

11. An optical disk apparatus according to claim 8, wherein:

the first target position searching section includes a function approximation section for finding an approximate function for approximating the relationship between the target position and the reproduction quality signal, and determines the optimum target position based on the approximate function, and the second target position searching section determines the optimum target position by finding a center point in a portion of the prescribed range, in which a change in the value of the reproduction quality signal is restricted at a prescribed level or less.

12. An optical disk apparatus according to claim 8, wherein the target position searching section includes:

a concave portion target position searching section for searching for a concave portion optimum target position at which the reproduction quality signal has an optimum value based on a determination result of the concave portion reproduction quality signal characteristic determining section, a convex portion target position searching section for searching for a convex portion optimum target position at which the reproduction quality signal has an optimum value based on a determination result of the convex portion reproduction quality signal characteristic determining section, and a common target position calculating section for calculating a common target position usable in the concave information track and the convex information track, based on the concave portion optimum target position and the convex portion optimum target position.

13. An optical disk apparatus according to claim 12, wherein the common target position calculating section calculates a center position between the concave portion optimum target position and the convex portion optimum target position as the common optimum target position.

14. An optical disk apparatus according to claim 12, wherein the common target position calculating section determines the common optimum target position based on a value of the reproduction quality signal corresponding to the concave portion optimum target position and a value of the reproduction quality signal corresponding to the convex portion optimum target position.

15. An optical disk apparatus according to claim 12, wherein, when either one of the concave portion reproduction quality signal characteristic determining section and the convex portion reproduction quality signal characteristic determining section determines that the reproduction quality signal has one of a parabolic characteristic and an inverted parabolic characteristic having a substantially maximum or minimum value in the prescribed range, the common target position calculating section determines the optimum target position found by the target position searching section corresponding to the reproduction quality signal characteristic determining section which determined that the reproduction quality signal has one of the parabolic characteristic and the inverted parabolic characteristic, as the common optimum target position.

16. An optical disk apparatus according to claim 12, wherein the common target position calculating section compares a first reproduction quality signal measured by the reproduction quality signal measuring section when the target position is moved from the concave portion optimum target position and a second reproduction quality signal measured by the reproduction quality signal measuring section when the target position to moved from the convex portion optimum target position, and when the first reproduction quality signal does not have a better characteristic than that of the second reproduction quality signal, the common target position calculating section determines the concave optimum target position as the common optimum target position; and when the first reproduction quality signal has a better characteristic than that of the second reproduction quality signal, the common target position calculating section determines the convex optimum target position as the common optimum target position.

17. An optical disk apparatus according to claim 1, wherein:

the reproduction quality signal includes jitter, the reproduction quality signal detector includes a jitter detector for detecting a jitter based on the reproduction signal, the reproduction quality signal measuring section includes a jitter measuring section for measuring a jitter value corresponding to each of the changed target positions, the reproduction quality signal characteristic determining section includes a jitter characteristic determining section for determining a characteristic of the jitter based on the jitter value, and the target position searching section searches for an optimum target position at which the jitter has a substantially minimum value based on a determination result of the jitter characteristic determining section.

18. An optical disk apparatus according to claim 17, wherein:

the jitter characteristic determining section determines, based on the jitter value measured by the jitter measuring section, whether or not the jitter has a substantially minimum value in a prescribed range of the target positions; and the target position searching section includes:

a first target position searching section for searching for the optimum target position when the jitter has an inverted parabolic characteristic having the minimum value in the prescribed range, and a second target position searching section for searching for the optimum target position when the jitter has a flat bottomed curve characteristic not having the minimum value in the prescribed range.

19. An optical disk apparatus according to claim 18, wherein:

the first target position searching section includes a first control section for moving the target position in a direction in which the jitter is presumed to be decreased while searching for the optimum target position, and the second target position searching section includes a second control section for moving the target position in a prescribed direction.

20. An optical disk apparatus according to claim 18, wherein:

the first target position searching section includes a function approximation section for finding an approximate function for approximating the relationship between the target position and the jitter value, and determines the optimum target position based on the approximate function, and the second target position searching section determines the optimum target position by finding a center point in a portion of the prescribed range, in which a change in the jitter value is restricted at a prescribed level or less.

21. An optical disk apparatus according to claim 20, wherein the second target position searching section restricts the portion to a prescribed area or less.

22. An optical disk apparatus according to claim 20, wherein, when the jitter characteristic determining section determines that the jitter has a flat bottomed curve characteristic not having a substantially minimum value, the jitter measuring section changes the target position with narrower steps and measures a jitter value corresponding to each of the changed target positions.

23. An optical disk apparatus according to claim 22, wherein:

the first target position searching section includes an approximate function determining section for obtaining an approximation degree between the approximate function obtained by the function approximation section and a prescribed shape of the characteristic of the jitter, and when the approximation degree is a prescribed level or more, the first target position searching section obtains the target position at which the jitter value measured by the jitter measuring section is substantially minimum as the optimum target position, without using the approximate function.

24. An optical disk apparatus according to claim 17, wherein:

the information carrier includes a concave information track having a concave shape and a convex information track having a convex shape;

the jitter characteristic determining section includes:

a concave portion jitter characteristic determining section for determining the characteristic of the jitter based on the jitter value corresponding to each of the target positions changed in the concave information track, and a convex portion jitter characteristic determining section for determining the characteristic of the jitter based on the jitter value corresponding to each of the target positions changed in the convex information track; and the target position searching section searches for a concave optimum target position at which the jitter has an optimum value based on a determination result of the concave portion jitter characteristic determining section, and also searches for a convex optimum target position at which the jitter has an optimum value based on a determination result of the convex portion jitter characteristic determining section.

25. An optical disk apparatus according to claim 24, wherein:

the concave portion jitter characteristic determining section determines, based on the jitter value in the concave information track measured by the jitter measuring section, whether or not the jitter in the concave portion has a substantially minimum value in a prescribed range of the target positions;

the convex portion jitter characteristic determining section determines, based on the jitter value in the convex information track measured by the jitter measuring section, whether or not the jitter in the convex portion has a substantially minimum value in a prescribed range of the target positions; and the target position searching section includes:

a first target position searching section for searching for the optimum target position when the jitter has an inverted parabolic characteristic having the minimum value in the prescribed range, and a second target position searching section for searching for the optimum target position when the jitter has a flat bottomed curve characteristic not having the minimum value in the prescribed range.

26. An optical disk apparatus according to claim 24, wherein:

the first target position searching section includes a first control section for moving the target position in a direction in which the jitter is presumed to be decreased while searching for the optimum target position, and the second target position searching section includes a second control section for moving the target position in a prescribed direction.

27. An optical disk apparatus according to claim 24, wherein:

the first target position searching section includes a function approximation section for finding an approximate function for approximating the relationship between the target position and the jitter, and determines the optimum target position based on the approximate function, and the second target position searching section determines the optimum target position by finding a center point in a portion of the prescribed range, in which a change in the jitter value is restricted at a prescribed level or less.

28. An optical disk apparatus according to claim 24, wherein the target position searching section includes:

a concave portion target position searching section for searching for a concave portion optimum target position at which the jitter has an optimum value based on a determination result of the concave portion jitter characteristic determining section, a convex portion target position searching section for searching for a convex portion optimum target position at which the jitter has an optimum value based on a determination result of the convex portion jitter characteristic determining section, and a common target position calculating section for calculating a common target position usable in the concave information track and the convex information track, based on the concave portion optimum target position and the convex portion optimum target position.

29. An optical disk apparatus according to claim 1, wherein:

the reproduction quality signal includes a reproduction signal amplitude measurement signal, the reproduction quality signal detector includes a reproduction signal processing section for detecting a reproduction signal amplitude based on the reproduction signal, the reproduction quality signal measuring section includes a reproduction signal amplitude measuring section for measuring a reproduction signal amplitude value corresponding to each of the changed target positions, the reproduction quality signal characteristic determining section includes a reproduction signal amplitude determining section for determining a characteristic of the reproduction signal amplitude based on the reproduction signal amplitude value, and the target position searching section searches for an optimum target position at which the reproduction signal amplitude has a maximum value based on a determination result of the reproduction signal amplitude characteristic determining section.

30. An optical disk apparatus according to claim 29, wherein:

the reproduction signal amplitude characteristic determining section determines, based on the reproduction signal amplitude measured by the reproduction signal amplitude measuring section, whether or not the reproduction signal amplitude has a substantially maximum value in a prescribed range of the target positions; and the target position searching section includes:

a first target position searching section for searching for the optimum target position when the reproduction signal amplitude has a parabolic characteristic having the maximum value in the prescribed range, and a second target position searching section for searching for the optimum target position when the reproduction signal amplitude has a flat topped curve characteristic not having the maximum value in the prescribed range.

31. An optical disk apparatus according to claim 30, wherein:

the first target position searching section includes a first control section for moving the target position in a direction in which the reproduction signal amplitude is presumed to be increased while searching for the optimum target position, and the second target position searching section includes a second control section for moving the target position in a prescribed direction.

32. An optical disk apparatus according to claim 30, wherein:

the first target position searching section includes a function approximation section for finding an approximate function for approximating the relationship between the target position and the reproduction signal amplitude value, and determines the optimum target position based on the approximate function, and the second target position searching section determines the optimum target position by finding a center point in a portion of the prescribed range, in which a change in the reproduction signal amplitude value is restricted at a prescribed level or less.

33. An optical disk apparatus according to claim 32, wherein the second target position searching section restricts the portion to a prescribed area or less.

34. An optical disk apparatus according to claim 32, wherein, when the reproduction signal amplitude characteristic determining section determines that the reproduction signal amplitude has a flat topped curve characteristic not having a substantially maximum value, the measuring section changes the target position with narrower steps and measures a reproduction signal amplitude value corresponding to each of the changed target positions.

35. An optical disk apparatus according to claim 30, wherein:

the first target position searching section includes an approximate function determining section for obtaining an approximation degree between the approximate function obtained by the function approximation section and a prescribed shape of the characteristic of the reproduction signal amplitude, and when the approximation degree is a prescribed level or more, the first target position searching section obtains the target position at which the reproduction signal amplitude value measured by the reproduction signal amplitude measuring section is substantially maximum as the optimum target position, without using the approximate function.

36. An optical disk apparatus according to claim 29, wherein:

the information carrier includes a concave information track having a concave shape and a convex information track having a convex shape;

the reproduction signal amplitude characteristic determining section includes:

a concave portion reproduction signal amplitude characteristic determining section for determining the characteristic of the reproduction signal amplitude based on the reproduction signal amplitude value corresponding to each of the target positions changed in the concave information track, and a convex portion reproduction signal amplitude characteristic determining section for determining the characteristic of the reproduction signal amplitude based on the reproduction signal amplitude value corresponding to each of the target positions changed in the convex information track; and the target position searching section searches for a concave optimum target position at which the reproduction signal amplitude has an optimum value based on a determination result of the concave portion reproduction signal amplitude characteristic determining section, and also searches for a convex optimum target position at which the reproduction signal amplitude has an optimum value based on a determination result of the convex portion reproduction signal amplitude characteristic determining section.

37. An optical disk apparatus according to claim 36, wherein:

the concave portion reproduction signal amplitude characteristic determining section determine, based on the reproduction signal amplitude value in the concave information track measured by the reproduction signal amplitude measuring section, whether or not the reproduction signal amplitude in the concave portion has a substantially maximum value in a prescribed range of the target positions;

the convex portion reproduction signal amplitude characteristic determining section determines, based on the reproduction signal amplitude value in the convex information track measured by the reproduction signal amplitude measuring section, whether or not the reproduction signal amplitude in the convex portion has a substantially maximum value in a prescribed range of the target positions; and the target position searching section includes:

a first target position searching section for searching for the optimum target position when the reproduction signal amplitude has a parabolic characteristic having the maximum value in the prescribed range, and a second target position searching section for searching for the optimum target position when the reproduction signal amplitude has a flat topped curve characteristic not having the maximum value in the prescribed range.

38. An optical disk apparatus according to claim 36, wherein:

the first target position searching section includes a first control section for moving the target position in a direction in which the reproduction signal amplitude is presumed to be increased while searching for the optimum target position, and the second target position searching section includes a second control section for moving the target position in a prescribed direction.

39. An optical disk apparatus according to claim 36, wherein:

the first target position searching section includes a function approximation section for finding an approximate function for approximating the relationship between the target position and the reproduction signal amplitude, and determines the optimum target position based on the approximate function, and the second target position searching section determines the optimum target position by finding a center point in a portion of the prescribed range, in which a change in the reproduction signal amplitude value is restricted at a prescribed level or less.

40. An optical disk apparatus according to claim 36, wherein the target position searching section includes:

a concave portion target position searching section for searching for a concave portion optimum target position at which the reproduction signal amplitude has an optimum value based on a determination result of the concave portion reproduction signal amplitude characteristic determining section, a convex portion target position searching section for searching for a convex portion optimum target position at which the reproduction signal amplitude has an optimum value based on a determination result of the convex portion reproduction signal amplitude characteristic determining section, and a common target position calculating section for calculating a common target position usable in the concave information track and the convex information track, based on the concave portion optimum target position and the convex portion optimum target position.

41. An optical disk apparatus according to claim 1, further comprising a recording distinguishing section for distinguishing whether or not information is recorded on the information carrier based on the reproduction quality signal detected by the reproduction quality signal detector, wherein the reproduction quality signal measuring section changes the target position based on a distinguishment result of the recording distinguishing section.

42. An optical disk apparatus according to claim 41, wherein, when the recording distinguishing section distinguishes that the information is recorded on the information carrier, the reproduction quality signal measuring section changes the target position.

43. An optical disk apparatus according to claim 41, wherein:

the information carrier includes a concave information track having a concave shape and a convex information track having a convex shape;

the reproduction quality signal measuring section changes the target position in the concave information track a first number of times, the first number corresponding to a first sample number which represents the number of samples of the reproduction quality signal measured in the concave information track, and changes the target position in the convex information track a second number of times, the second number corresponding to a second sample number which represents the number of samples of the reproduction quality signal measured in the convex information track, and the first sample number and the second sample number are substantially equal to each other.

44. An optical disk apparatus according to claim 41, wherein:

the information carrier includes a concave information track having a concave shape and a convex information track having a convex shape;

the reproduction quality signal measuring section changes the target position in the concave information track a first number of times, the first number corresponding to a first sector number which represents the number of sectors of the reproduction quality signal measured in the concave information track, and changes the target position in the convex information track a second number of times, the second number corresponding to a second sector number which represents the number of sectors of the reproduction quality signal measured in the convex information track, and the first sector number and the second sector number are substantially equal to each other.

45. An optical disk apparatus according to claim 41, wherein, when reproduction of desired information results in failure, the reproduction quality signal measuring section changes the target position in the vicinity of the information track on which the desired information which was not reproduced is recorded.

46. An optical disk apparatus according to claim 1, wherein:

the information carrier includes a first division section and a second division section obtained by dividing one rotation of track, the reproduction quality signal measuring section changes the target position in the first division section, measures a value of a first division section reproduction quality signal corresponding to each of the target positions changed in the first division section, changes the target position in the second division section, and measure a value of a second division section reproduction quality signal corresponding to each of the target positions in the second division section, the reproduction quality signal characteristic determining section determines a characteristic of the first reproduction quality signal based on the value of the first division section reproduction quality signal, and determines a characteristic of the second reproduction quality signal based on the value of the second division section reproduction quality signal, and the target position searching section searches for a first optimum target position at which the first reproduction quality signal has an optimum value based on a determination result of the characteristic of the first reproduction quality signal obtained by the reproduction quality signal characteristic determining section, and searches for a second optimum target position at which the second reproduction quality signal has an optimum value based on a determination result of the characteristic of the second reproduction quality signal obtained by the reproduction quality signal characteristic determining section.

47. An optical disk apparatus according to claim 46, wherein the target position searching section determines the optimum target position based on an average value of the first optimum target position and the second optimum target position.

48. An optical disk apparatus according to claim 46, wherein the reproduction quality signal measuring section smoothes the first optimum target position and the second optimum target position with a prescribed time constant and outputs the smoothing result to the focus controller.

* * * * *

UNITED STATES PATENT AND TRADEMARK OFFICE

CERTIFICATE OF CORRECTION

PATENT NO. : 6,430,119 B1

DATED : August 6, 2002
INVENTOR(S) : Yuu Okada, Katsuya Watanabe, Tetsuya Shihara, Akihiko Nishioka and Koujiro Okamoto It is certified that error appears in the above-identified patent and that said Letters Patent is hereby corrected as shown below:

Column 39,
Line 37, “to” should be -- is --.
Line 55, a new sub-paragraph should start after “signal,”.

Column 44,
Line 7, “determine” should be -- determines --.

Signed and Sealed this

Nineteenth Day of November, 2002

*Attest:*

JAMES E. ROGAN

*Attesting Officer*

*Director of the United States Patent and Trademark Office*